(12) United States Patent
Ye et al.

(10) Patent No.: US 12,196,920 B2
(45) Date of Patent: Jan. 14, 2025

(54) OPTICAL IMAGING SYSTEM

(71) Applicant: ZHEJIANG SUNNY OPTICS CO., LTD., Zhejiang (CN)

(72) Inventors: Lihui Ye, Zhejiang (CN); Ming Li, Zhejiang (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 950 days.

(21) Appl. No.: 17/264,303

(22) PCT Filed: Apr. 25, 2019

(86) PCT No.: PCT/CN2019/084360
§ 371 (c)(1),
(2) Date: Oct. 12, 2021

(87) PCT Pub. No.: WO2020/024631
PCT Pub. Date: Feb. 6, 2020

(65) Prior Publication Data
US 2022/0026681 A1  Jan. 27, 2022

(30) Foreign Application Priority Data
Aug. 3, 2018 (CN) .......................... 201810878358.2

(51) Int. Cl.
G02B 13/00 (2006.01)
G02B 9/64 (2006.01)
G02B 27/00 (2006.01)

(52) U.S. Cl.
CPC ........... G02B 13/0045 (2013.01); G02B 9/64 (2013.01); G02B 27/0025 (2013.01)

(58) Field of Classification Search
CPC ... G02B 13/0045; G02B 9/64; G02B 27/0025
(Continued)

(56) References Cited

U.S. PATENT DOCUMENTS
2016/0124191 A1  5/2016  Hashimoto

FOREIGN PATENT DOCUMENTS
CN 202067014 U 12/2011
CN 203595858 U 5/2014
(Continued)

OTHER PUBLICATIONS
The search report of family CN application No. 2018108783582 issue on Aug. 3, 2018.
(Continued)

Primary Examiner — Wyatt A Stoffa
Assistant Examiner — Grant A Gagnon
(74) Attorney, Agent, or Firm — Samson G. Yu

(57) ABSTRACT

An optical imaging system includes sequentially from an object side to an image side along an optical axis: a first lens, a second lens, a third lens, a fourth lens, a fifth lens, a sixth lens and a seventh lens. The first lens has a refractive power. The second lens has a refractive power, an object-side surface of the second lens is a concave surface, and an image-side surface of the second lens is a convex surface. The third lens has a refractive power. The fourth lens has a negative refractive power. The fifth lens has a positive refractive power, and an object-side surface of the fifth lens is a convex surface. The sixth lens has a negative refractive power. The seventh lens has a refractive power. 44°≤HFOV<55°, HFOV being a half of a maximum field of view of the optical imaging system.

12 Claims, 50 Drawing Sheets

(58) Field of Classification Search
USPC .......................................................... 359/708
See application file for complete search history.

(56) References Cited

FOREIGN PATENT DOCUMENTS

| | | |
|---|---|---|
| CN | 104950424 A | 9/2015 |
| CN | 105278074 A | 1/2016 |
| CN | 106597642 A | 4/2017 |
| CN | 107015347 A | 8/2017 |
| CN | 107436480 A | 12/2017 |
| CN | 206946079 U | 1/2018 |
| CN | 108051898 A | 5/2018 |
| CN | 108196353 A | 6/2018 |
| CN | 108254887 A | 7/2018 |
| CN | 108732727 A | 11/2018 |

OTHER PUBLICATIONS

The search report of family CN application issue on Jul. 4, 2018.

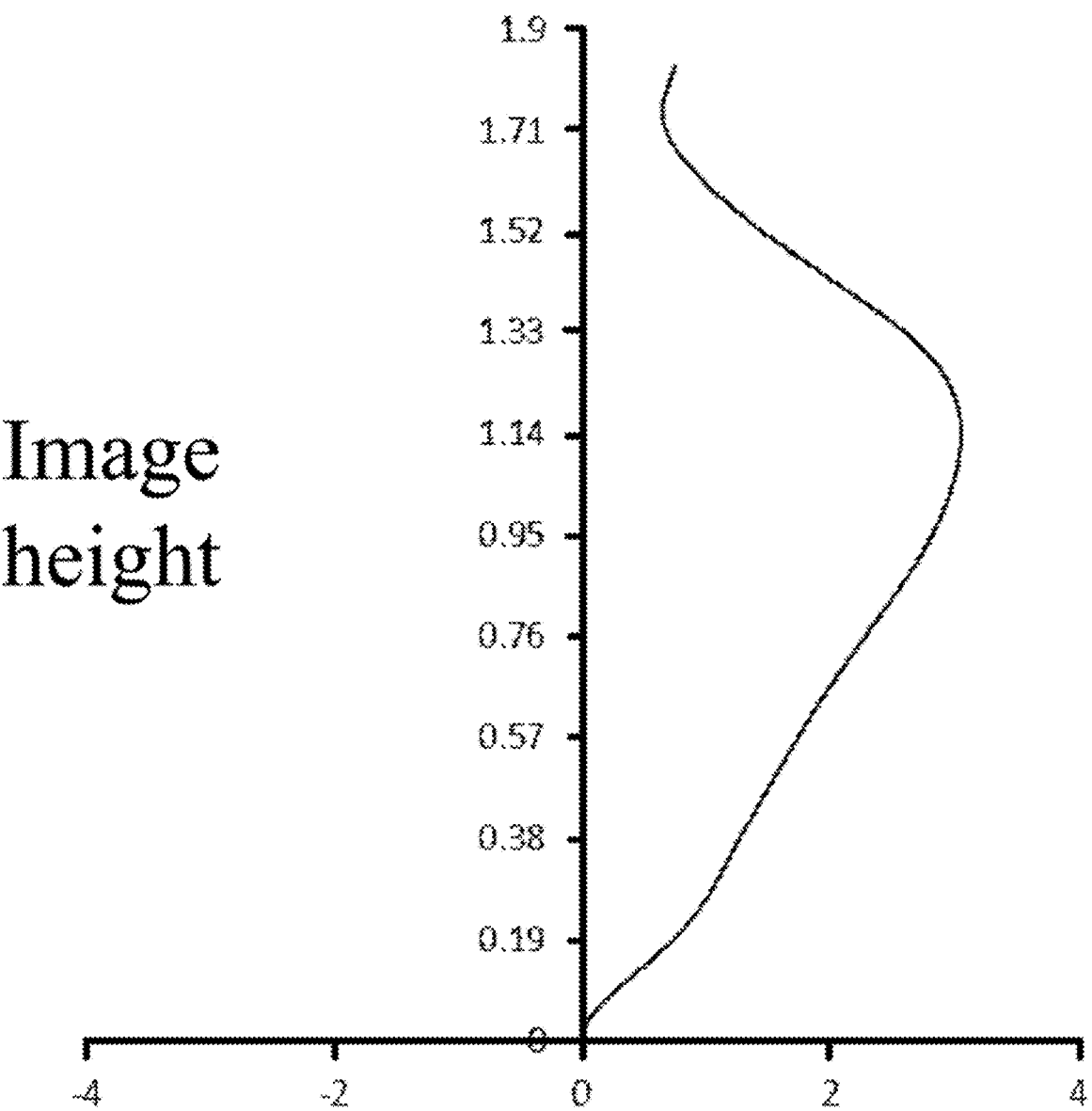

OPTICAL IMAGING SYSTEM

CROSS-REFERENCE TO RELATED APPLICATIONS

The present disclosure claims priority to Chinese Patent Application No. 201810878358.2, submitted to the State Intellectual Property Office (SIPO) on Aug. 3, 2018, the contents of which are hereby incorporated by reference in their entirety.

TECHNICAL FIELD

The disclosure relates to the field of optics, and particularly to an optical imaging system.

BACKGROUND

In recent years, along with the rapid development of portable electronic products with photographing functions, requirements on miniature optical systems have also increased.

At present, a photosensitive element of a common imaging lens is usually a Charge-Coupled Device (CCD) or a Complementary Metal-Oxide Semiconductor (CMOS). Along with the performance improvement and size reduction of CCD and CMOS elements, higher requirements have been made to the imaging quality and miniaturization of matched imaging lenses. Along with the increase of requirements on the imaging quality of miniature imaging lenses, imaging lenses have been gradually developed to large aperture, large field of view and high resolution.

Therefore, an optical imaging system that is small in size and high in imaging quality is a present pre-research direction.

SUMMARY

According to an aspect of the disclosure, an optical imaging system is provided, which includes sequentially from an object side to an image side along an optical axis: a first lens, a second lens, a third lens, a fourth lens, a fifth lens, a sixth lens and a seventh lens, wherein the first lens has a refractive power; the second lens has a refractive power, an object-side surface of the second lens is a concave surface, and an image-side surface of the second lens is a convex surface; the third lens has a refractive power; the fourth lens has a negative refractive power; the fifth lens has a positive refractive power, and an object-side surface of the fifth lens is a convex surface; the sixth lens has a negative refractive power; the seventh lens has a refractive power; and 44°≤HFOV<55°, HFOV is a half of a maximum field of view of the optical imaging system.

Optionally, an effective focal length of the fifth lens is f5, an effective focal length of the sixth lens is f6, and −1.5<f5/f6<0.

Optionally, an effective focal length of the fourth lens is f4, an effective focal length of the optical imaging system is f, and −3.5<f4/f<−0.5.

Optionally, an effective focal length of a combination formed by the first lens, the second lens and the third lens is f123, an effective focal length of the seventh lens is f7, and −0.5<f123/f7<3.

Optionally, a radius of curvature of an image-side surface of the first lens is R2, a radius of curvature of an image-side surface of the third lens is R6, and 0<|R2−R6|/|R2+R6|<1.

Optionally, a radius of curvature of an object-side surface of the sixth lens is R11, a radius of curvature of an image-side surface of the sixth lens is R12, and 0.4<R11/R12<1.

Optionally, a radius of curvature of an image-side surface of the fifth lens is R10, a radius of curvature of an object-side surface of the seventh lens is R13, and −1<R13/R10<−0.5.

Optionally, a maximum value and a minimum value in center thicknesses of the first lens to the sixth lens are CTmax and CTmin respectively, and 1<CTmax/(3×CTmin)<2.

Optionally, a center thicknesses of the fourth lens, a center thicknesses of the fifth lens and a center thicknesses of the sixth lens on the optical axis are CT4, CT5 and CT6 respectively, and 1<CT5/(CT6+CT4)<3.

Optionally, an on-axis distance from an intersection point of an image-side surface of the fifth lens and the optical axis to an effective radius vertex of the image-side surface of the fifth lens is SAG52, a center thickness of the fifth lens on the optical axis is CT5, and 0.5≤|SAG52/CT5|<0.8.

Optionally, a half of a diagonal length of an effective pixel region on an imaging surface of the optical imaging system is ImgH, an on-axis distance from an intersection point of an image-side surface of the seventh lens and the optical axis to an effective radius vertex of the image-side surface of the seventh lens is SAG72, and 0.5<ImgH/|SAG72×10|<2.

Optionally, a maximum effective radius of the object-side surface of the second lens is DT21, a maximum effective radius of an object-side surface of the seventh lens is DT71, and 0.3≤DT21/DT71<0.7.

According to another aspect of the disclosure, an optical imaging system is provided, which includes sequentially from an object side to an image side along an optical axis: a first lens, a second lens, a third lens, a fourth lens, a fifth lens, a sixth lens and a seventh lens, wherein the first lens has a refractive power; the second lens has a refractive power, an object-side surface of the second lens is a concave surface, and an image-side surface of the second lens is a convex surface; the third lens has a refractive power; the fourth lens has a negative refractive power; the fifth lens has a positive refractive power, and an object-side surface of the fifth lens is a convex surface; the sixth lens has a negative refractive power; and the seventh lens has a refractive power.

Optionally, HFOV is a half of a maximum field of view of the optical imaging system, and 44°≤HFOV<55°.

Optionally, an effective focal length of the fifth lens is f5, an effective focal length of the sixth lens is f6, and −1.5<f5/f6<0.

Optionally, an effective focal length of the fourth lens is f4, an effective focal length of the optical imaging system is f, and −3.5<f4/f<−0.5.

Optionally, an effective focal length of a combination formed by the first lens, the second lens and the third lens is f123, an effective focal length of the seventh lens is f7, and −0.5<f123/f7<3.

Optionally, a radius of curvature of an image-side surface of the first lens is R2, a radius of curvature of an image-side surface of the third lens is R6, and 0<|R2−R6|/|R2+R6|<1.

Optionally, a radius of curvature of an object-side surface of the sixth lens is R11, a radius of curvature of an image-side surface of the sixth lens is R12, and 0.4<R11/R12<1.

Optionally, a radius of curvature of an image-side surface of the fifth lens is R10, a radius of curvature of an object-side surface of the seventh lens is R13, and −1<R13/R10<−0.5.

Optionally, a maximum value and a minimum value in center thicknesses of the first lens to the sixth lens are CTmax and CTmin respectively, and 1<CTmax/(3×CTmin) <2.

Optionally, a center thicknesses of the fourth lens, a center thicknesses of the fifth lens and a center thicknesses of the sixth lens on the optical axis are CT4, CT5 and CT6 respectively, and 1<CT5/(CT6+CT4)<3.

Optionally, an on-axis distance from an intersection point of an image-side surface of the fifth lens and the optical axis to an effective radius vertex of the image-side surface of the fifth lens is SAG52, a center thickness of the fifth lens on the optical axis is CT5, and 0.5≤|SAG52/CT5|<0.8.

Optionally, a half of a diagonal length of an effective pixel region on an imaging surface of the optical imaging system is ImgH, an on-axis distance from an intersection point of an image-side surface of the seventh lens and the optical axis to an effective radius vertex of the image-side surface of the seventh lens is SAG72, and 0.5<ImgH/|SAG72×10|<2.

Optionally, a maximum effective radius of the object-side surface of the second lens is DT21, a maximum effective radius of an object-side surface of the seventh lens is DT71, and 0.3≤DT21/DT71<0.7.

BRIEF DESCRIPTION OF THE DRAWINGS

The drawings forming part of the disclosure in the specification are adopted to provide a further understanding to the disclosure. Schematic embodiments of the disclosure and descriptions thereof are adopted to explain the disclosure and not intended to form improper limits to the disclosure. In the drawings:

FIG. 2A to FIG. 2D show a longitudinal aberration curve, an astigmatic curve, a distortion curve and a lateral color curve of an optical imaging system of embodiment 1 respectively;

DETAILED DESCRIPTION OF THE EMBODIMENTS

Figure 1:
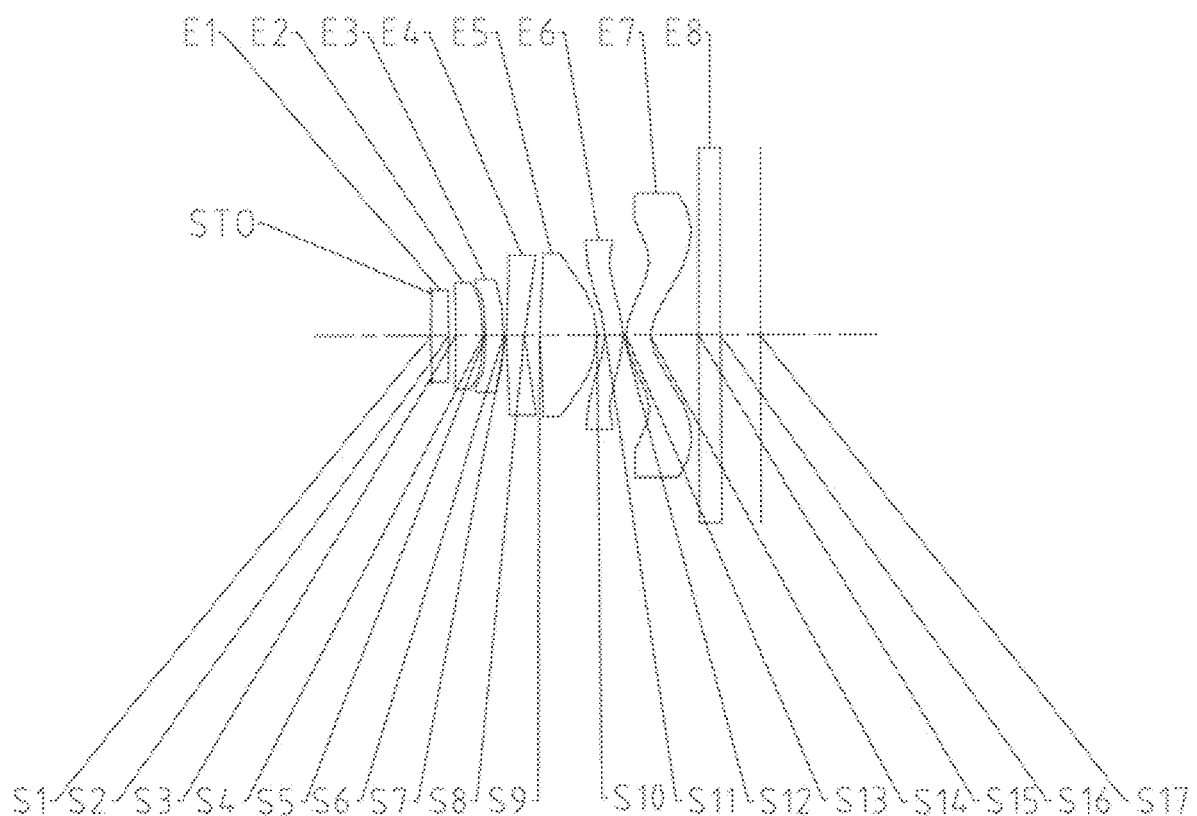
FIG. 1 is a structure diagram of an optical imaging system of embodiment 1 of the disclosure.

It is to be pointed out that the following detailed descriptions are exemplary and made to further describe the disclosure. Unless otherwise specified, all technical and scientific terms used herein have the same meanings usually understood by those of ordinary skill in the art of the disclosure.

It is to be noted that terms used herein are only adopted to describe specific implementation modes and not intended to limit exemplary implementation modes according to the disclosure. For example, singular forms, used herein, are also intended to include plural forms, unless otherwise clearly pointed out. In addition, it is also to be understood that terms "contain" and/or "include" used in the specification refer/refers to existence of features, steps, operations, apparatuses, components and/or combinations thereof.

Unless otherwise defined, all terms (including technical terms and scientific terms) used in the disclosure have the same meanings usually understood by those of ordinary skill in the art of the disclosure. It is also to be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts.

As introduced in the Background, in the conventional art, higher requirements are made to the imaging quality and miniaturization of an imaging system. For improving the imaging quality of the imaging system and/or further meeting the miniaturization requirement, the disclosure discloses an optical imaging system.

In some embodiments of the disclosure, an optical imaging system is provided. As shown in FIG. 1, FIG. 3, FIG. 5, FIG. 7, FIG. 9, FIG. 11, FIG. 13, FIG. 15, FIG. 17 and FIG. 19, the optical imaging system includes sequentially in a direction from an object side to an image side along an optical axis: a first lens E1, a second lens E2, a third lens E3, a fourth lens E4, a fifth lens E5, a sixth lens E6 and a seventh lens E7.

The first lens E1 has a refractive power. The second lens E2 has a refractive power, an object-side surface S3 of the second lens E2 is a concave surface, and an image-side surface S4 of the second lens E2 is a convex surface. The third lens E3 has a refractive power. The fourth lens E4 has a negative refractive power. The fifth lens E5 has a positive refractive power, and an object-side surface S9 of the fifth lens E5 is a convex surface. The sixth lens has a negative refractive power. The seventh lens has a refractive power. 44°≤HFOV<55°, HFOV is a half of a maximum field of view of the optical imaging system.

In the optical imaging system, positive and negative refractive power allocation and luminous flux of each lens in the system are reasonably controlled to effectively balance a low-order aberration of the optical imaging system to achieve relatively high imaging quality of the optical imaging system. In addition, HFOV is controlled to be more than or equal to 44° and less than 55°, namely a full field of view is controlled, to effectively control an imaging range of the optical imaging system to further ensure relatively high imaging quality of the optical imaging system.

In an embodiment of the disclosure, an effective focal length of the fifth lens is f5, an effective focal length of the sixth lens is f6, and −1.5<f5/f6<0. In the embodiment, the effective focal lengths of the fifth lens and the effective focal lengths of the sixth lens are reasonably allocated to control the refractive power of a rear section of the optical imaging system in a relatively small range, so that a deflection angle of light is reduced, and the sensitivity of the optical imaging system is further reduced.

For increasing a focal length of the optical imaging system and simultaneously balancing a curvature of field of the optical imaging system, in an embodiment of the disclosure, the negative refractive power of the fourth lens is controlled in a reasonable range. Specifically, an effective focal length of the fourth lens is f4, an effective focal length of the optical imaging system is f, and −3.5<f4/f<−0.5.

In another embodiment of the disclosure, an effective focal length of a combination formed by the first lens, the second lens and the third lens is f123, an effective focal length of the seventh lens is f7, and −0.5<f123/f7<3. In the embodiment, a ratio of the effective focal length of the combination formed by the first lens, the second lens and the third lens to the effective focal length of the seventh lens is controlled in this range, so that a distortion in a paraxial range of an image plane is effectively corrected, and the imaging quality of the system is improved.

For ensuring that the optical imaging system has a larger aperture to improve the overall brightness of the optical imaging system, in an embodiment of the disclosure, a radius of curvature of an image-side surface of the first lens is R2, a radius of curvature of an image-side surface of the third lens is R6, and 0<|R2−R6|/|R2+R6|<1.

In another embodiment of the disclosure, a radius of curvature of an object-side surface of the sixth lens is R11, a radius of curvature of an image-side surface of the sixth lens is R12, and 0.4<R11/R12<1. A bending direction of the sixth lens is controlled to further effectively control the curvature of field of the optical imaging system, so that the imaging quality of the optical imaging system is improved.

For correcting a chromatic aberration of the optical imaging system and balancing various aberrations, in an embodiment of the disclosure, a radius of curvature of an image-side surface of the fifth lens and a radius curvature of an image-side surface of the seventh lens are controlled. Specifically, a radius of curvature of an image-side surface of the fifth lens is R10, a radius of curvature of an object-side surface of the seventh lens is R13, and −1<R13/R10<−0.5.

In another embodiment of the disclosure, a maximum value and a minimum value in center thicknesses of the first lens to the sixth lens are CTmax and CTmin respectively, namely, in the center thickness of the first lens, the center thickness of the second lens, the center thickness of the third lens, the center thickness of the fourth lens, the center thickness of the fifth lens and the center thickness of the sixth lens, the maximum value is CTmax, the minimum value is CTmin, and 1<CTmax/(3×CTmin)<2. In the embodiment, the maximum value and the minimum value of the center thicknesses of the first lens to sixth lens in the optical imaging system are effectively controlled, namely a maximum center thickness and a minimum center thickness are controlled, so that an edge thickness and center thickness of each lens are relatively balanced and stable, the space utilization rate is increased, difficulties in manufacturing and assembling of the lenses are reduced, miniaturization of the optical imaging system is ensured, and meanwhile, the aberration correction capability of the optical imaging system is enhanced.

For ensuring uniform size distribution of the lens, effectively reducing the size of the optical imaging system, avoiding the optical imaging system being excessively large, simultaneously reducing the difficulties in assembling of the lenses and achieving a relatively high space utilization rate of the system, the center thickness of the fourth lens on the optical axis, the center thickness of the fifth lens on the optical axis and the center thickness of the sixth lens on the optical axis is controlled in a certain range. Specifically, in an embodiment of the disclosure, the center thicknesses of the fourth lens, the center thicknesses of the fifth lens and the center thicknesses of the sixth lens on the optical axis are CT4, CT5 and CT6 respectively, and 1<CT5/(CT6+CT4)<3.

For achieving a relatively high refraction capability of the fifth lens for an off-axis field of view to facilitate reduction of the overall length of a camera lens, simultaneously reducing the aberration of the optical imaging system and improving the resolution of the optical imaging system, in an embodiment of the disclosure, an on-axis distance from an intersection point of an image-side surface of the fifth lens and the optical axis to an effective radius vertex of the image-side surface of the fifth lens is SAG52, a center thickness of the fifth lens on the optical axis is CT5, and 0.5≤|SAG52/CT5|<0.8.

For effectively reducing the overall size of the optical imaging system to further implement miniaturization of optical imaging system, in an embodiment of the disclosure, a half of a diagonal length of an effective pixel region on an imaging surface of the optical imaging system is ImgH, an on-axis distance from an intersection point of an image-side surface of the seventh lens and the optical axis to an effective radius vertex of the image-side surface of the seventh lens is SAG72, and 0.5<ImgH/|SAG72×10|<2.

For conveniently assembling the optical imaging system of the disclosure and simultaneously ensuring that the optical imaging system meets a structural characteristic of small size, in an embodiment of the disclosure, a maximum effective radius of the object-side surface of the second lens is DT21, a maximum effective radius of an object-side surface of the seventh lens is DT71, and 0.3≤DT21/DT71<0.7.

In some embodiments of the disclosure, as shown in FIG. 1, FIG. 3, FIG. 5, FIG. 7, FIG. 9, FIG. 11, FIG. 13, FIG. 15, FIG. 17 and FIG. 19, the optical imaging system further includes an optical filter E8. The optical filter E8 is on the side, far away from the sixth lens E6, of the seventh lens E7. The optical filter E8 can filter stray light to further improve the imaging quality of the optical imaging system.

In some other embodiments of the disclosure, an optical imaging system is provided. As shown in FIG. 1, FIG. 3, FIG. 5, FIG. 7, FIG. 9, FIG. 11, FIG. 13, FIG. 15, FIG. 17 and FIG. 19, the optical imaging system includes sequentially in a direction from an object side to an image side along an optical axis: a first lens E1, a second lens E2, a third lens E3, a fourth lens E4, a fifth lens E5, a sixth lens E6 and a seventh lens E7.

The first lens E1 has a refractive power. The second lens E2 has a refractive power, an object-side surface S3 of the second lens E2 is a concave surface, and an image-side surface S4 of the second lens E2 is a convex surface. The third lens E3 has a refractive power. The fourth lens E4 has a negative refractive power. The fifth lens E5 has a positive refractive power, and an object-side surface S9 of the fifth lens E5 is a convex surface. The sixth lens has a negative refractive power. The seventh lens has a refractive power.

In the optical imaging system, the positive and the negative refractive power allocation and luminous flux of each lens in the system are reasonably controlled to effectively balance a low-order aberration of the optical imaging system to achieve relatively high imaging quality of an imaging system of the optical imaging system.

For effectively controlling an imaging range of the optical imaging system and improving the imaging quality of the optical imaging system, in an embodiment of the disclosure, 44°≤HFOV<55°, namely HFOV is controlled to be more than or equal to 44° and less than 55°.

In an embodiment of the disclosure, an effective focal length of the fifth lens is f5, an effective focal length of the sixth lens is f6, and −1.5<f5/f6<0. In the embodiment, the effective focal length of the fifth lens and the effective focal length of the sixth lens are reasonably allocated to control the refractive power of a rear section of the optical imaging system in a relatively small range, so that a deflection angle of light is reduced, and the sensitivity of the optical imaging system is further reduced.

For increasing a focal length of the optical imaging system and simultaneously balancing a curvature of field of the optical imaging system, in an embodiment of the disclosure, the negative refractive power of the fourth lens is controlled in a reasonable range. Specifically, an effective focal length of the fourth lens is f4, an effective focal length of the optical imaging system is f, and −3.5<f4/f<−0.5.

In another embodiment of the disclosure, an effective focal length of a combination formed by the first lens, the second lens and the third lens is f123, an effective focal length of the seventh lens is f7, and −0.5<f123/f7<3. In the embodiment, a ratio of the effective focal length of the combination formed by the first lens, the second lens and the third lens to the effective focal length of the seventh lens is controlled in this range, so that a distortion in a paraxial range of an image plane is effectively corrected, and the imaging quality of the system is improved.

For ensuring that the optical imaging system has a larger aperture to improve the overall brightness of the optical imaging system, in an embodiment of the disclosure, a radius of curvature of an image-side surface of the first lens is R2, a radius of curvature of an image-side surface of the third lens is R6, and 0<|R2−R6|/|R2+R6|<1.

In another embodiment of the disclosure, a radius of curvature of an object-side surface of the sixth lens is R11, a radius of curvature of an image-side surface of the sixth lens is R12, and 0.4<R11/R12<1. A bending direction of the sixth lens is controlled to further effectively control the curvature of field of the optical imaging system, so that the imaging quality of the optical imaging system is improved.

For correcting a chromatic aberration of the optical imaging system and balancing various aberrations, in an embodiment of the disclosure, a radius of curvature of an image-side surface of the fifth lens and a radius curvature of an image-side surface of the seventh lens are controlled. Specifically, a radius of curvature of an image-side surface of the fifth lens is R10, a radius of curvature of an object-side surface of the seventh lens is R13, and −1<R13/R10<−0.5.

In another embodiment of the disclosure, a maximum value and a minimum value in center thicknesses of the first lens to the sixth lens are CTmax and CTmin respectively, namely, in the center thickness of the first lens, the center thickness of the second lens, the center thickness of the third lens, the center thickness of the fourth lens, the center thickness of the fifth lens and the center thickness of the sixth lens, the maximum value is CTmax, the minimum value is CTmin, and 1<CTmax/(3×CTmin)<2. In the embodiment, the maximum value and the minimum value of the center thicknesses of the first lens to sixth lens in the optical imaging system are effectively controlled, namely a maximum center thickness and a minimum center thickness are controlled, so that an edge thickness and center thickness of each lens are relatively balanced and stable, the space utilization rate is increased, difficulties in manufacturing and assembling of the lens are reduced, miniaturization of the optical imaging system is ensured, and meanwhile, the aberration correction capability of the optical imaging system is enhanced.

For ensuring uniform size distribution of the lens, effectively reducing the size of the optical imaging system, avoiding the optical imaging system being excessively large, simultaneously reducing the difficulties in assembling of the lenses and achieving a relatively high space utilization rate of the system, a center thickness of the fourth lens on the optical axis, a center thickness of the fifth lens on the optical axis and a center thickness of the sixth lens on the optical axis is controlled in a certain range. Specifically, in an embodiment of the disclosure, the center thicknesses of the fourth lens, the fifth lens and the sixth lens on the optical axis are CT4, CT5 and CT6 respectively, and 1<CT5/(CT6+CT4)<3.

For achieving a relatively high refraction capability of the fifth lens for an off-axis field of view to facilitate reduction of the overall length of a camera lens, simultaneously reducing the aberration of the optical imaging system and improving the resolving power of the optical imaging system, in an embodiment of the disclosure, an on-axis distance from an intersection point of the image-side surface of the fifth lens and the optical axis to an effective radius vertex of the image-side surface of the fifth lens is SAG52, the center thickness of the fifth lens on the optical axis is CT5, and 0.5≤|SAG52/CT5|<0.8.

For effectively reducing the overall size of the optical imaging system to further implement miniaturization of optical imaging system, in an embodiment of the disclosure, a half of a diagonal length of an effective pixel region on an imaging surface of the optical imaging system is ImgH, an on-axis distance from an intersection point of an image-side surface of the seventh lens and the optical axis to an effective radius vertex of the image-side surface of the seventh lens is SAG72, and 0.5<ImgH/|SAG72×10|<2.

For conveniently assembling the optical imaging system of the disclosure and simultaneously ensuring that the optical imaging system meets a structural characteristic of small size, in an embodiment of the disclosure, a maximum effective radius of the object-side surface of the second lens is DT21, a maximum effective radius of an object-side surface of the seventh lens is DT71, and 0.3≤DT21/DT71<0.7.

In some embodiments of the disclosure, as shown in FIG. 1, FIG. 3, FIG. 5, FIG. 7, FIG. 9, FIG. 11, FIG. 13, FIG. 15, FIG. 17 and FIG. 19, the optical imaging system further includes an optical filter E8. The optical filter E8 is on the side, far away from the sixth lens E6, of the seventh lens E7. The optical filter E8 can filter stray light to further improve the imaging quality of the optical imaging system.

In the disclosure, a paraxial region refers to a region nearby an optical axis. If a surface of a lens is a convex surface and a position of the convex surface is not defined, it is indicated that at least a paraxial region of the surface of the lens is a convex surface; and if a surface of a lens is a concave surface and a position of the concave surface is not defined, it is indicated that at least a paraxial region of the surface of the lens is a concave surface. A surface, closest to an object, in each lens element is called an object-side surface, and a surface, closest to an imaging surface, in each lens element is called an image-side surface.

For enabling those skilled in the art to understand the technical solutions and technical effects of the disclosure more clearly, detailed descriptions will be made below in combination with specific embodiments.

Embodiment 1

As shown in FIG. 1, the optical imaging system includes sequentially in a direction from an object side to an image side along an optical axis: a diaphragm STO, a first lens E1, a second lens E2, a third lens E3, a fourth lens E4, a fifth lens E5, a sixth lens E6, a seventh lens E7, an optical filter E8 and an imaging surface S17.

The first lens has a positive refractive power, an object-side surface of the first lens is a convex surface as well as an aspherical surface, and an image-side surface is a convex surface as well as a spherical surface. The second lens has a positive refractive power, an object-side surface of the second lens is a concave surface as well as a spherical surface, and an image-side surface is a convex surface as well as an aspherical surface. The third lens has a positive refractive power, an object-side surface of the third lens is a concave surface as well as an aspherical surface, and an image-side surface is a convex surface as well as an aspherical surface. The fourth lens has a negative refractive power, an object-side surface of the fourth lens is a convex surface as well as an aspherical surface, and an image-side surface is a concave surface as well as an aspherical surface. The fifth lens has a positive refractive power, an object-side surface of the fifth lens is a convex surface as well as an aspherical surface, and an image-side surface is a convex surface as well as an aspherical surface. The sixth lens has a negative refractive power, an object-side surface of the sixth lens is a concave surface as well as an aspherical surface, and an image-side surface is a convex surface as well as an aspherical surface. The seventh lens has a negative refractive power, an object-side surface of the seventh lens is a convex surface as well as an aspherical surface, and an image-side surface is a concave surface as well as an aspherical surface.

The optical imaging system further includes the optical filter including an object-side surface S15 and an image-side surface S16. Light from an object sequentially penetrates through each of surfaces S1 to S16 and is finally imaged on the imaging surface S17.

Table 1 shows a surface type, radius of curvature, thickness, material and cone coefficient of each lens of the optical imaging system of embodiment 1. Units of the radius of curvature and the thickness are mm.

TABLE 1

| Surface number | Surface types | Radius of curvature (mm) | Thickness(mm) | Refractive index | Abbe number | Conic coefficient |
|---|---|---|---|---|---|---|
| OBJ | Spherical | Infinity | Infinity | — | — | — |
| STO | Spherical | Infinity | 0.0007 | — | — | — |
| S1 | Aspheric | 9.2117 | 0.1800 | 1.55 | 64.1 | −99.0000 |
| S2 | Spherical | −10.5960 | 0.0673 | — | — | — |
| S3 | Spherical | −10.1280 | 0.2769 | 1.55 | 64.1 | — |
| S4 | Aspheric | −1.3110 | 0.0215 | — | — | −7.1814 |
| S5 | Aspheric | −2.3057 | 0.1800 | 1.65 | 23.5 | 10.0504 |
| S6 | Aspheric | −2.3314 | 0.0250 | — | — | 9.6131 |
| S7 | Aspheric | 7.8598 | 0.1800 | 1.65 | 23.5 | 22.0417 |
| S8 | Aspheric | 1.3195 | 0.1497 | — | — | −8.4859 |
| S9 | Aspheric | 14.3545 | 0.5729 | 1.55 | 64.1 | 63.0524 |
| S10 | Aspheric | −0.8080 | 0.0800 | — | — | −1.3383 |
| S11 | Aspheric | −0.5882 | 0.1800 | 1.65 | 23.5 | −5.9309 |
| S12 | Aspheric | −0.7397 | 0.0250 | — | — | −8.3731 |
| S13 | Aspheric | 0.5289 | 0.2403 | 1.55 | 64.1 | −2.3596 |
| S14 | Aspheric | 0.3959 | 0.4755 | — | — | −1.7599 |
| S15 | Spherical | Infinity | 0.2205 | 1.52 | 64.2 | — |
| S16 | Spherical | Infinity | 0.3972 | — | — | — |
| S17 | Spherical | Infinity | — | — | — | — |

In the embodiment, the surface type x of each aspherical lens may be defined by use of, but not limited to, the following aspherical surface formula:

$$x = \frac{ch^2}{1+\sqrt{1-(k+1)c^2h^2}} + \sum A_i h^i, \quad (1)$$

Here, x is the sag—the axis-component of the displacement of the surface from the aspheric vertex, when the surface is at a height h from the optical axis; c is a paraxial curvature of the aspheric surface, c=1/R (namely, the paraxial curvature c is a reciprocal of the radius of curvature R in Table 1); k is the conic coefficient (given in Table 1); and Ai is the correction coefficient of the $i^{th}$ order of aspheric surface. Table 2 shows high-order coefficients $A_4$, $A_6$, $A_8$, $A_{10}$, $A_{12}$, $A_{14}$, $A_{16}$ and $A_{20}$ applied to the aspherical mirror surfaces S1, S3, S5, S7 and S8 in embodiment 1.

TABLE 2

| Surface number | $A_4$ | $A_6$ | $A_8$ | $A_{10}$ | $A_{12}$ |
|---|---|---|---|---|---|
| S1 | 2.5677E−02 | −2.1579E+00 | 5.7252E+01 | −8.1109E+02 | 6.5246E+03 |
| S4 | 1.7348E+00 | −3.4466E+01 | 4.2751E+02 | −3.5064E+03 | 1.7705E+04 |
| S5 | 1.4816E+00 | −2.8856E+01 | 2.8976E+02 | −1.7297E+03 | 4.6121E+03 |
| S6 | 2.8026E−01 | −4.8346E+00 | 3.5662E+01 | −1.3928E+02 | 3.4035E+02 |
| S7 | −6.4036E−03 | 7.9994E−02 | −1.4571E+01 | 1.4364E+02 | −5.8734E+02 |
| S8 | −5.0583E−03 | 1.0013E+00 | −1.4132E+01 | 7.4510E+01 | −2.1238E+02 |
| S9 | 2.7235E−01 | −3.1849E+00 | 2.4512E+01 | −1.2314E+02 | 3.9886E+02 |
| S10 | 3.8185E−01 | −4.7965E+00 | 1.8242E+01 | −1.5820E+01 | −1.0062E+02 |
| S11 | 3.7360E−01 | −3.5390E+00 | 2.2523E+01 | −7.7605E+01 | 1.5926E+02 |
| S12 | −1.7902E−01 | 3.1013E+00 | −1.3064E+01 | 3.1929E+01 | −4.8748E+01 |
| S13 | −1.7225E−01 | −1.3815E+00 | 3.9256E+00 | −8.9391E+00 | 1.6288E+01 |
| S14 | −6.5539E−01 | 5.4248E−01 | −5.6424E−01 | 1.0713E+00 | −1.5718E+00 |

| Surface number | $A_{14}$ | $A_{16}$ | $A_{18}$ | $A_{20}$ |
|---|---|---|---|---|
| S1 | −2.9656E+04 | 7.0485E+04 | −6.7709E+04 | 0.0000E+00 |
| S4 | −5.3441E+04 | 8.6566E+04 | −5.6900E+04 | 0.0000E+00 |
| S5 | 1.9081E+03 | −3.8642E+04 | 5.9632E+04 | 0.0000E+00 |
| S6 | −5.0609E+02 | 2.5489E+02 | 1.6588E+02 | 0.0000E+00 |
| S7 | 1.2405E+03 | −1.3494E+03 | 5.9528E+02 | 0.0000E+00 |
| S8 | 3.4589E+02 | −3.0523E+02 | 1.1253E+02 | 0.0000E+00 |
| S9 | −8.1237E+02 | 1.0035E+03 | −6.8914E+02 | 2.0258E+02 |
| S10 | 3.8160E+02 | −5.8018E+02 | 4.2119E+02 | −1.1989E+02 |
| S11 | −1.9313E+02 | 1.2784E+02 | −3.5855E+01 | 0.0000E+00 |
| S12 | 4.6750E+01 | −2.5664E+01 | 6.0658E+00 | 0.0000E+00 |
| S13 | −2.0176E+01 | 1.5166E+01 | −6.1276E+00 | 1.0133E+00 |
| S14 | 1.3486E+00 | −6.6336E−01 | 1.7524E−01 | −1.9347E−02 |

In embodiment 1, an effective focal length of the first lens is f1=9.05 mm, an effective focal length of the second lens is f2=2.73 mm, an effective focal length of the third lens is f3=185.27 mm, an effective focal length of the fourth lens is f4=−2.48 mm, an effective focal length of the fifth lens is f5=1.42 mm, an effective focal length of the sixth lens is f6=−8.32 mm, and an effective focal length of the seventh lens is f7=−7.96 mm. An effective focal length of the optical imaging system is f=1.83, TTL=3.27 mm, HFOV=45.1°, and ImgH=1.86 mm, where TTL is a distance from a center of the object-side surface S1 of the first lens E1 to the imaging surface S17 on the optical axis, and ImgH is a half of a diagonal length of an effective pixel region on the imaging surface S17, specifically referring to Table 21.

The optical imaging system meets:
f5/f6=−0.17, f4/f=−1.35, f123/f7=−0.28, |R2−R6|/R2+R6|=0.64, R11/R12=0.80, R13/R10=−0.65, CTmax/(3×CT-min)=1.06, CT5/(CT6+CT4)=1.59, |SAG52/CT5|=0.64, ImgH/|SAG72×10|=0.68, and DT21/DT71=0.41, specifically referring to Table 22.

Figure 2A:
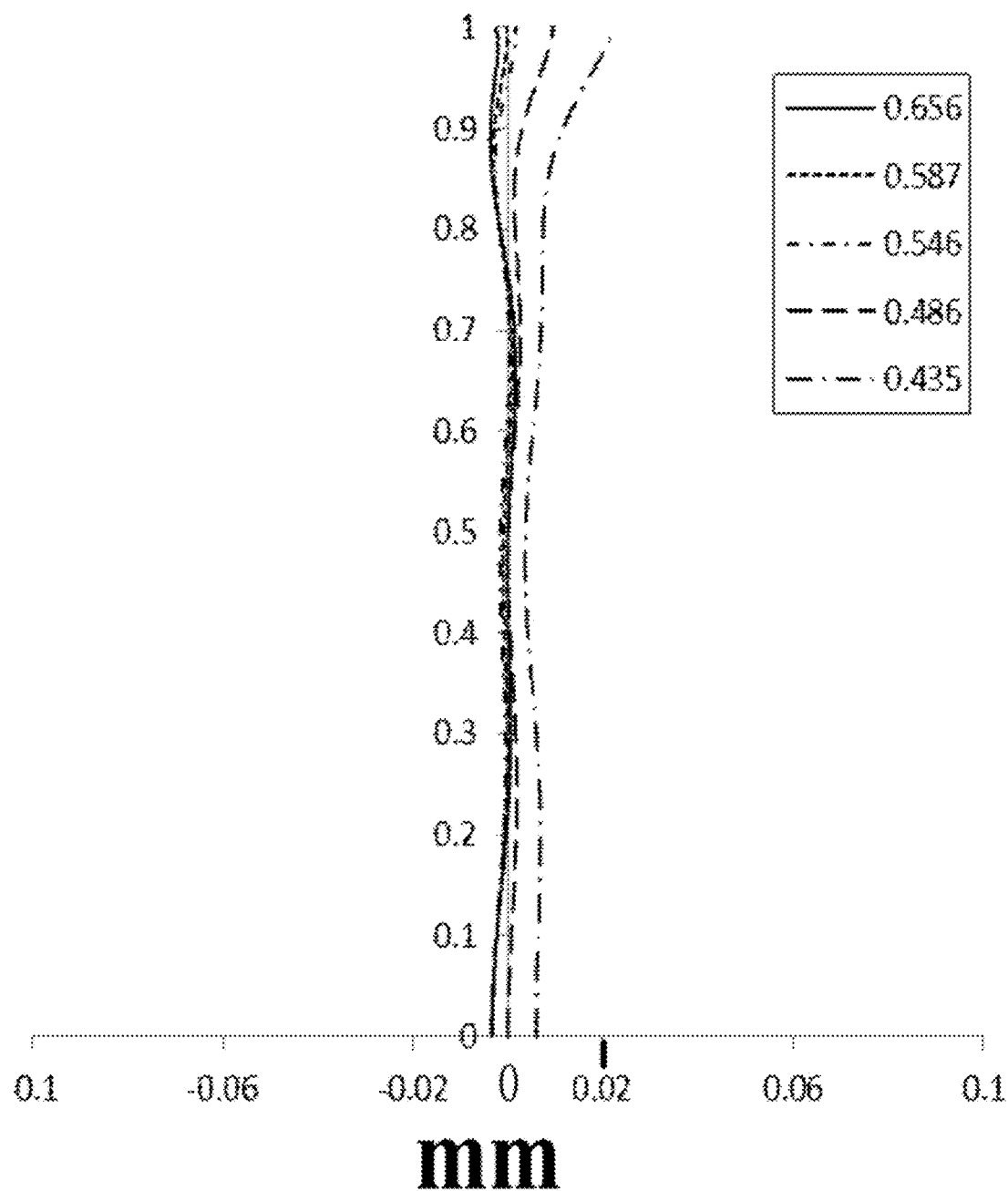
Figure 2B:
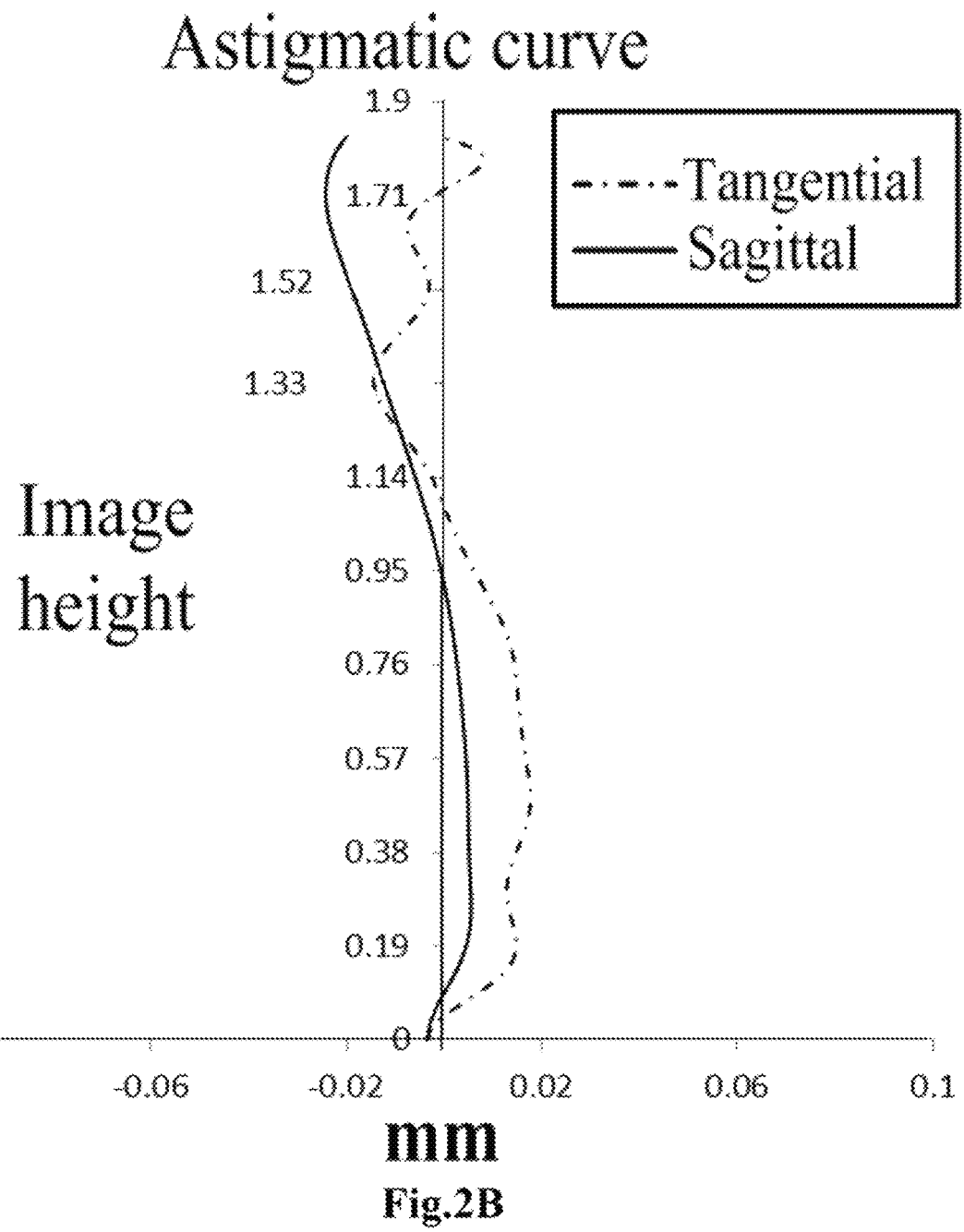
Figure 2D:
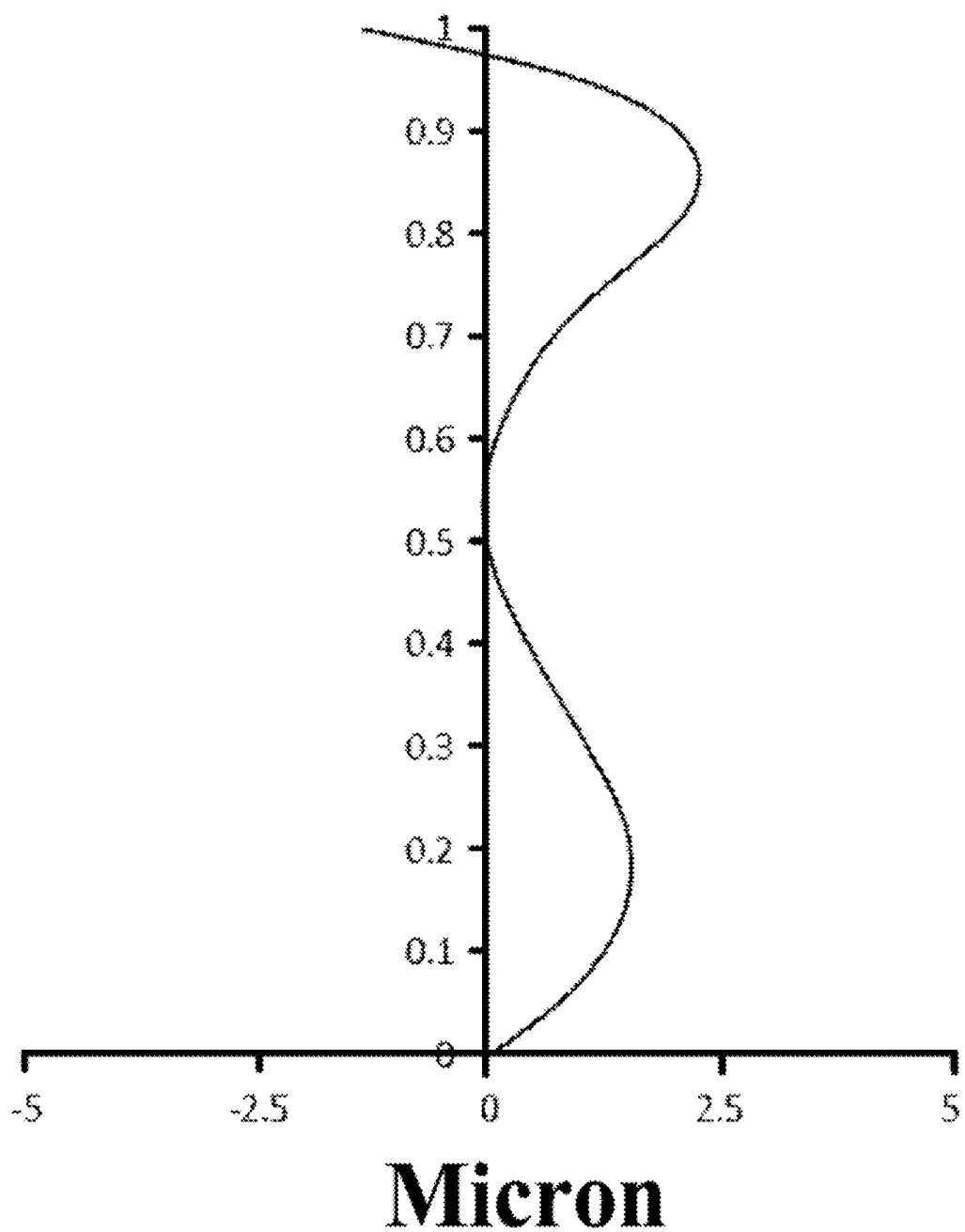

In addition, FIG. 2A shows a longitudinal aberration curve of the optical imaging system of embodiment 1, which indicates deviation of a convergence focal point after light with different wavelengths passes through the system. FIG. 2B shows an astigmatic curve of the optical imaging system of embodiment 1, which indicates a tangential image plane curvature and a sagittal image plane curvature. FIG. 2C shows a distortion curve of the optical imaging system of embodiment 1, which indicates a distortion value under different viewing angles. FIG. 2D shows a lateral color curve of the optical imaging system of embodiment 1, which indicates deviation of different image heights on the imaging surface after the light passes through the system. According to FIG. 2A to FIG. 2D, it can be seen that the optical imaging system provided in embodiment 1 can achieve high imaging quality.

Embodiment 2

Figure 3:
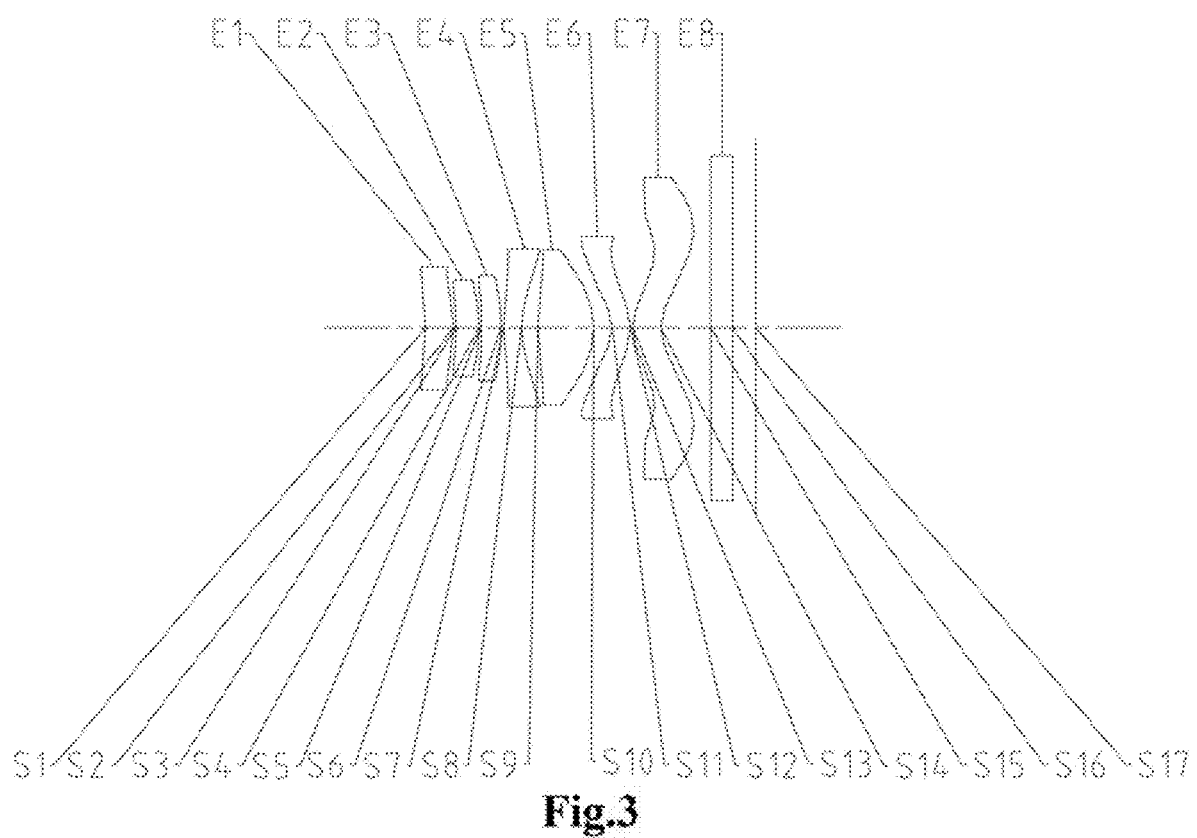
FIG. 3 is a structure diagram of an optical imaging system of embodiment 2 of the disclosure.

As shown in FIG. 3, the optical imaging system includes sequentially in a direction from an object side to an image side along an optical axis: a first lens E1, a second lens E2, a third lens E3, a fourth lens E4, a fifth lens E5, a sixth lens E6, a seventh lens E7, an optical filter E8 and an imaging surface S17.

The first lens has a positive refractive power, an object-side surface of the first lens is a concave surface as well as an aspherical surface, and an image-side surface is a convex surface as well as a spherical surface. The second lens has a positive refractive power, an object-side surface of the second lens is a concave surface as well as a spherical surface, and an image-side surface is a convex surface as well as an aspherical surface. The third lens has a positive refractive power, an object-side surface of the third lens is a concave surface as well as an aspherical surface, and an image-side surface is a convex surface as well as an aspherical surface. The fourth lens has a negative refractive power, an object-side surface of the fourth lens is a convex surface as well as an aspherical surface, and an image-side surface is a concave surface as well as an aspherical surface. The fifth lens has a positive refractive power, an object-side surface of the fifth lens is a convex surface as well as an aspherical surface, and an image-side surface is a convex surface as well as an aspherical surface. The sixth lens has a negative refractive power, an object-side surface of the sixth lens is a concave surface as well as an aspherical surface, and an image-side surface is a convex surface as well as an aspherical surface. The seventh lens has a negative refractive power, an object-side surface of the seventh lens is a convex surface as well as an aspherical surface, and an image-side surface is a concave surface as well as an aspherical surface.

The optical imaging system further includes an optical filter including an object-side surface S15 and an image-side surface S16. Light from an object sequentially penetrates through each of the surfaces S1 to S16 and is finally imaged on the imaging surface S17.

Table 3 shows a surface type, radius of curvature, thickness, material and cone coefficient of each lens of the optical imaging system of embodiment 2. Units of the radius of curvature and the thickness are mm.

TABLE 3

| Surface number | Surface types | Radius of curvature (mm) | Thickness(mm) | Materials Refractive index | Abbe number | Conic coefficient |
|---|---|---|---|---|---|---|
| OBJ | Spherical | Infinity | Infinity | — | — | — |
| S1 | Aspheric | −5.5194 | 0.2866 | 1.55 | 64.1 | 54.6290 |
| S2 | Spherical | −2.0644 | 0.0250 | — | — | — |
| S3 | Spherical | −3.4426 | 0.2350 | 1.55 | 64.1 | — |
| S4(STO) | Aspheric | −1.6788 | 0.0212 | — | — | −7.8572 |
| S5 | Aspheric | −25.7229 | 0.2001 | 1.65 | 23.5 | 99.0000 |
| S6 | Aspheric | −2.7140 | 0.0250 | — | — | 11.4361 |
| S7 | Aspheric | 3.4540 | 0.1800 | 1.65 | 23.5 | −14.6900 |
| S8 | Aspheric | 0.9286 | 0.1656 | — | — | −7.1613 |
| S9 | Aspheric | 4.2398 | 0.5680 | 1.55 | 64.1 | −50.6417 |
| S10 | Aspheric | −0.8745 | 0.1868 | — | — | −1.3227 |
| S11 | Aspheric | −0.3765 | 0.1800 | 1.65 | 23.5 | −3.4941 |
| S12 | Aspheric | −0.6056 | 0.0250 | — | — | −5.0659 |
| S13 | Aspheric | 0.5094 | 0.2827 | 1.55 | 64.1 | −3.1273 |
| S14 | Aspheric | 0.5094 | 0.5031 | — | — | −1.7332 |
| S15 | Spherical | Infinity | 0.2205 | 1.52 | 64.2 | — |
| S16 | Spherical | Infinity | 0.2372 | — | — | — |
| S17 | Spherical | Infinity | — | — | — | — |

In the embodiment, a calculation formula for a surface type x of each aspherical lens is the same as that in embodiment 1. Table 4 shows high-order coefficients $A_4$, $A_6$, $A_8$, $A_{10}$, $A_{12}$, $A_{14}$, $A_{16}$ and $A_{20}$ applied to the aspherical mirror surfaces S1, S3, S5, S7 and S8 in embodiment 2.

TABLE 4

| Surface number | $A_4$ | $A_6$ | $A_8$ | $A_{10}$ | $A_{12}$ |
|---|---|---|---|---|---|
| S1 | −4.5341E−02 | 5.1906E−01 | −4.4297E+00 | 2.4642E+01 | −8.7143E+01 |
| S4 | 1.7759E+00 | −3.0290E+01 | 2.8860E+02 | −2.0533E+03 | 1.0702E+04 |
| S5 | 1.6185E+00 | −2.8549E+01 | 2.2235E+02 | −1.3372E+03 | 5.9998E+03 |
| S6 | 1.2641E+00 | −1.8509E+01 | 1.1862E+02 | −4.9372E+02 | 1.7886E+03 |
| S7 | 4.4695E−01 | −1.1877E+02 | 8.1976E+01 | −2.3290E+02 | 1.8620E+02 |
| S8 | 2.3036E−02 | 4.8770E−01 | −6.0939E−01 | 2.6547E+01 | −1.3906E+02 |
| S9 | 9.6826E−02 | −1.0089E+00 | 1.0147E+01 | −6.9301E+01 | 2.9101E+02 |
| S10 | −6.0275E−02 | −4.1739E−01 | 2.1581E+00 | 1.1506E+01 | −1.2850E+02 |
| S11 | 3.9535E−01 | −5.8276E+00 | 4.8673E+01 | 2.0861E+02 | 5.1576E+02 |
| S12 | 3.0345E−02 | −9.1868E−01 | 1.0483E+01 | −3.8196E+01 | 7.2765E+01 |
| S13 | −2.6051E−01 | −1.8205E−01 | −1.2587E+01 | 6.0904E+00 | −1.1482E+01 |
| S14 | −6.2964E−01 | 3.2429E−01 | 3.2480E−01 | −7.5580E−01 | 5.7919E−01 |

| Surface number | $A_{14}$ | $A_{16}$ | $A_{18}$ | $A_{20}$ |
|---|---|---|---|---|
| S1 | 1.8940E+02 | −2.2897E+02 | 1.1990E+02 | 0.0000E+00 |
| S4 | −3.6974E+04 | 7.2229E+04 | −5.9447E+04 | 0.0000E+00 |
| S5 | −1.7225E+04 | 2.4754E+04 | −1.1562E+04 | 0.0000E+00 |
| S6 | −5.3139E+03 | 9.3121E+03 | −6.6400E+03 | 0.0000E+00 |
| S7 | 4.8602E+02 | −1.2117E+03 | 7.9379E+02 | 0.0000E+00 |
| S8 | 3.3734E+02 | −4.0875E+02 | 1.9873E+02 | 0.0000E+00 |

TABLE 4-continued

| | | | | |
|---|---|---|---|---|
| S9 | −7.4412E+02 | 1.1293E+03 | −9.3062E+02 | 3.1926E+02 |
| S10 | 4.5294E+02 | −7.8052E+02 | 6.6816E+02 | −2.2736E+02 |
| S11 | −7.4024E+02 | 5.7470E+02 | −1.8799E+02 | 0.0000E+00 |
| S12 | −7.5755E+01 | 4.0466E+01 | −8.6533E+00 | 0.0000E+00 |
| S13 | 1.1685E+01 | −6.6654E+00 | 2.0053E+00 | −2.4834E−01 |
| S14 | −1.8524E−01 | −7.3937E−03 | 2.0247E−02 | −3.7418E−03 |

In embodiment 2, an effective focal length of the first lens is f1=5.86 mm, an effective focal length of the second lens is f2=5.73 mm, an effective focal length of the third lens is f3=4.68 mm, an effective focal length of the fourth lens is f4=−2.02 mm, an effective focal length of the fifth lens is f5=1.38 mm, an effective focal length of the sixth lens is f6=−2.23 mm, and an effective focal length of the seventh lens is f7=4.75 mm. An effective focal length of the optical imaging system is f=1.83 mm, TTL=3.34 mm, HFOV=45.1°, and ImgH=1.86 mm, where TTL is a distance from a center of the object-side surface S1 of the first lens E1 to the imaging surface S17 on the optical axis, and ImgH is a half of a diagonal length of an effective pixel region on the imaging surface S17, specifically referring to Table 21.

The optical imaging system meets:
f5/f6=−0.62, f4/f=−1.10, f123/f7=0.39, |R2−R6|/R2+R6|=0.14, R11/R12=0.62, R13/R10=−0.58, CTmax/(3×CTmin)=1.05, CT5/(CT6+CT4)=1.58, |SAG52/CT5|=0.59, ImgH/|SAG72×10|=1.78, and DT21/DT71=0.33, specifically referring to Table 22.

Figure 4A:
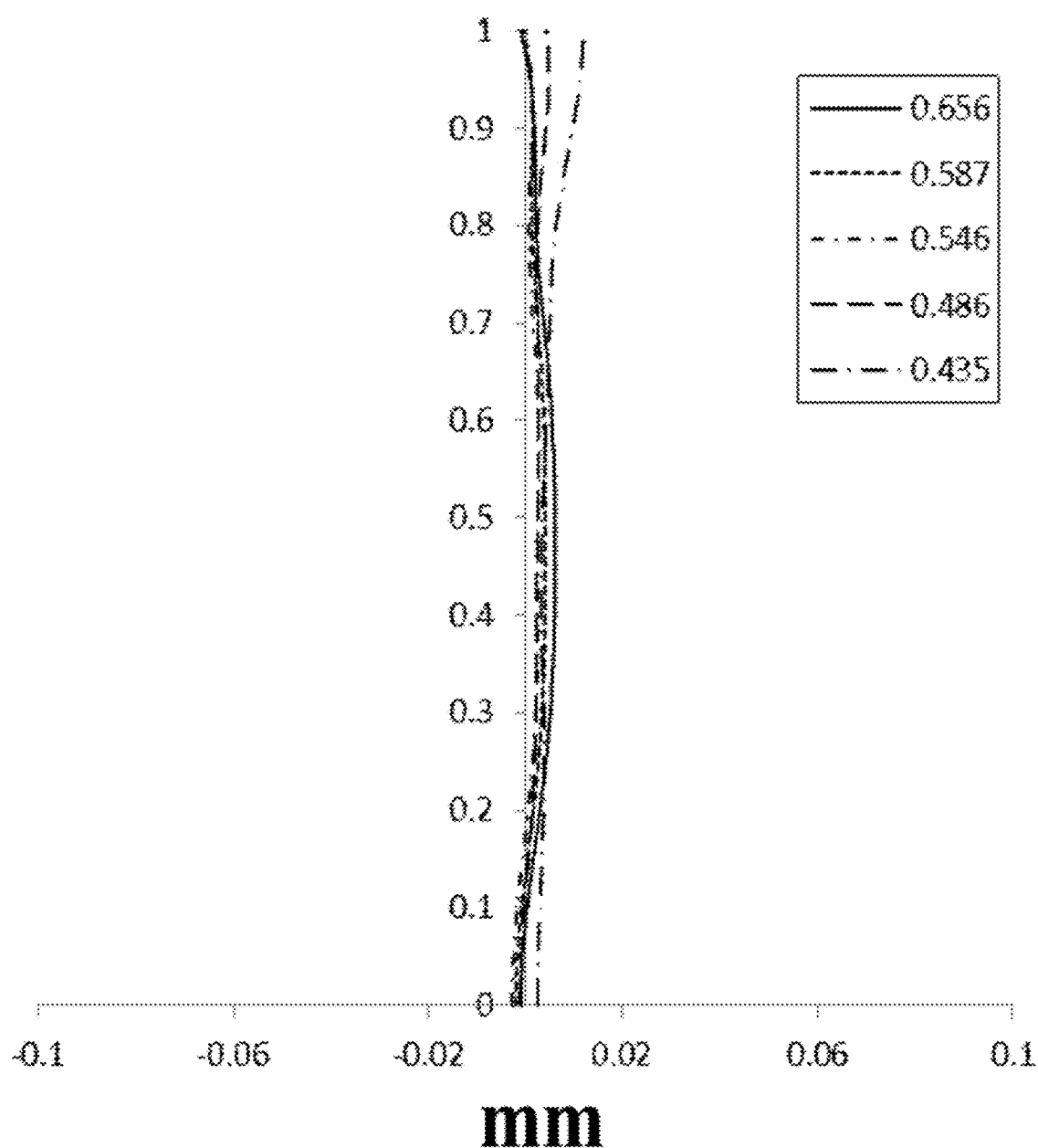
FIG. 4A to FIG. 4D show a longitudinal aberration curve, an astigmatic curve, a distortion curve and a lateral color curve of an optical imaging system of embodiment 2 respectively.
Figure 4B:
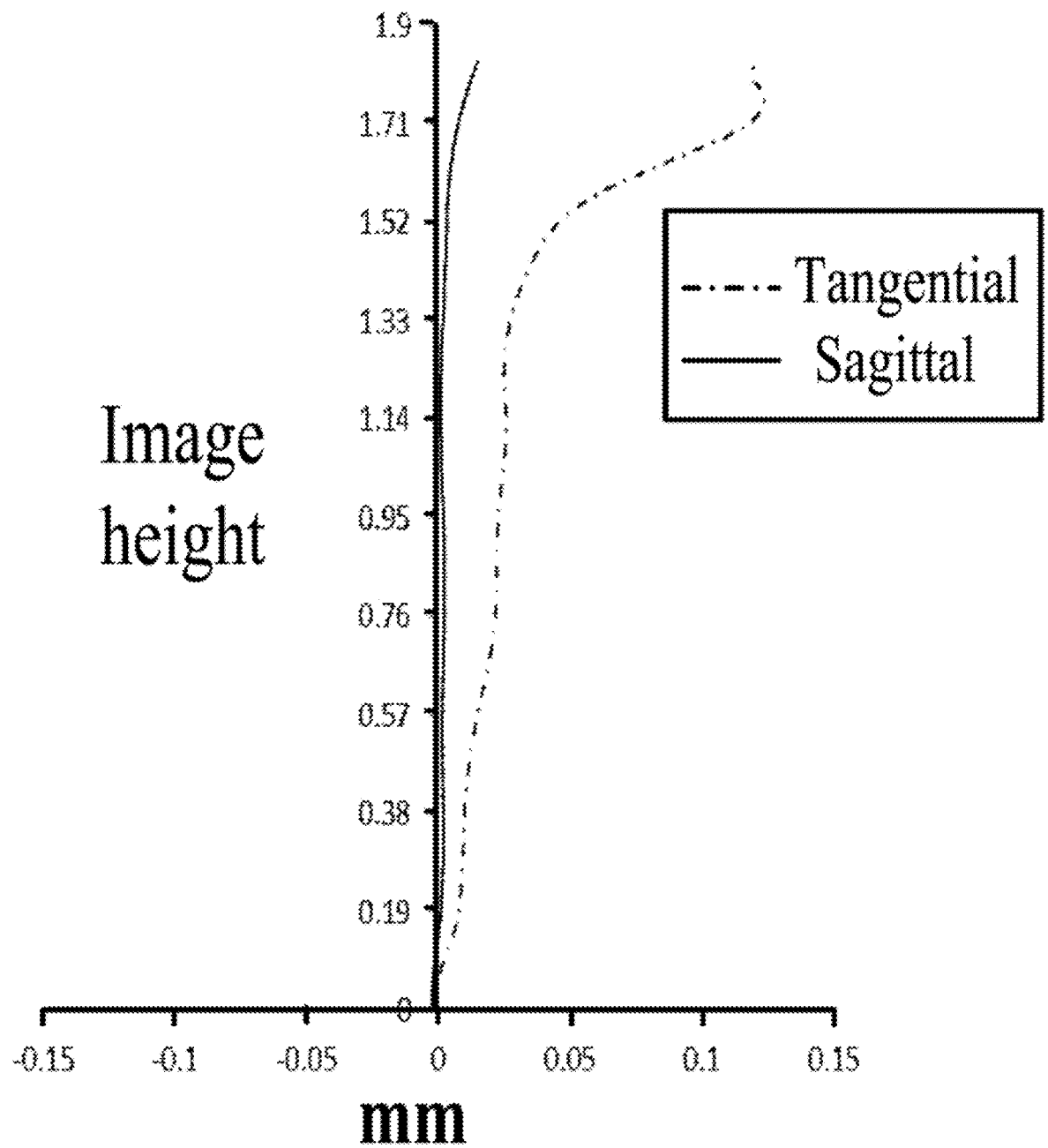
Figure 4C:
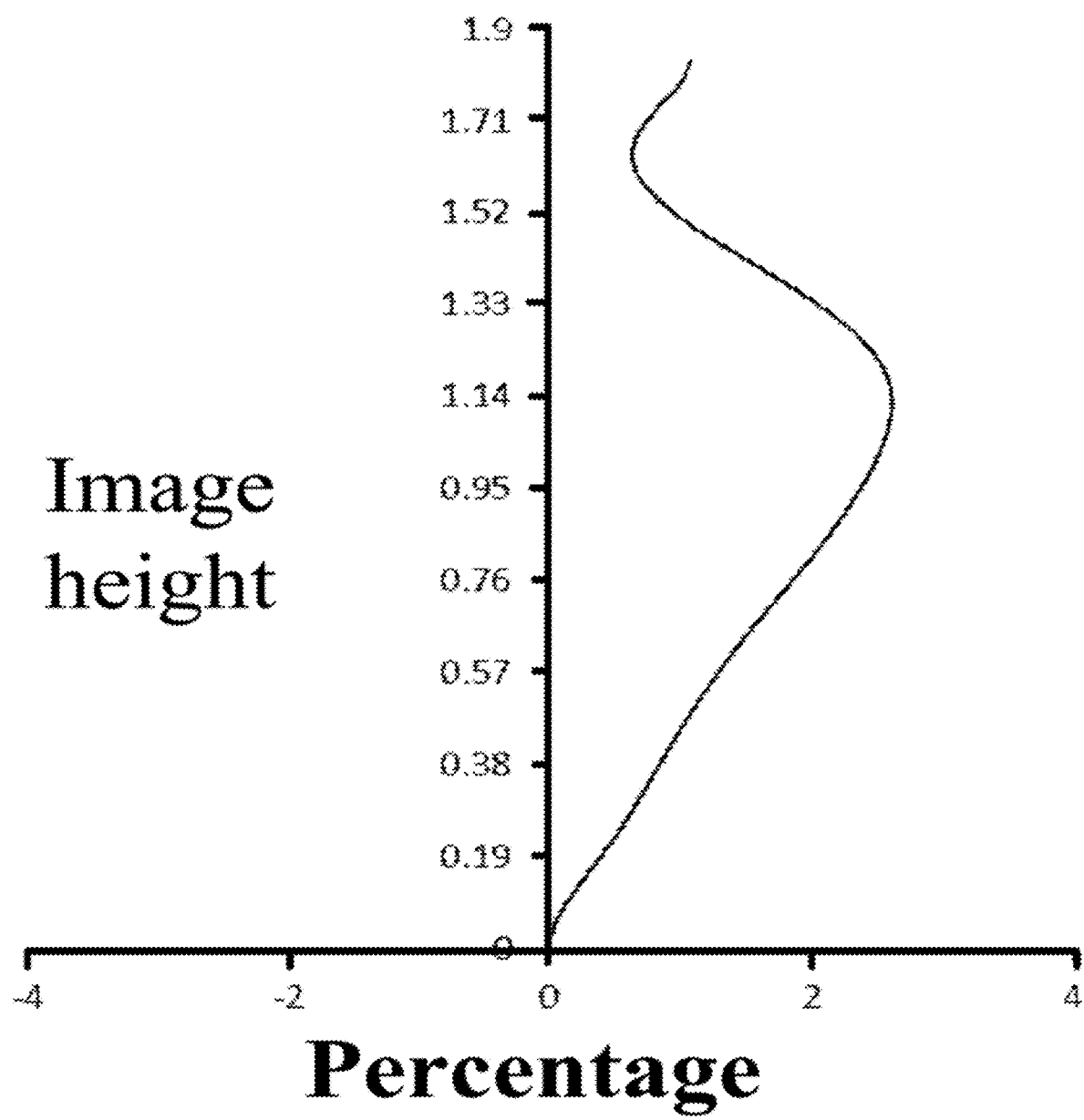
Figure 4D:
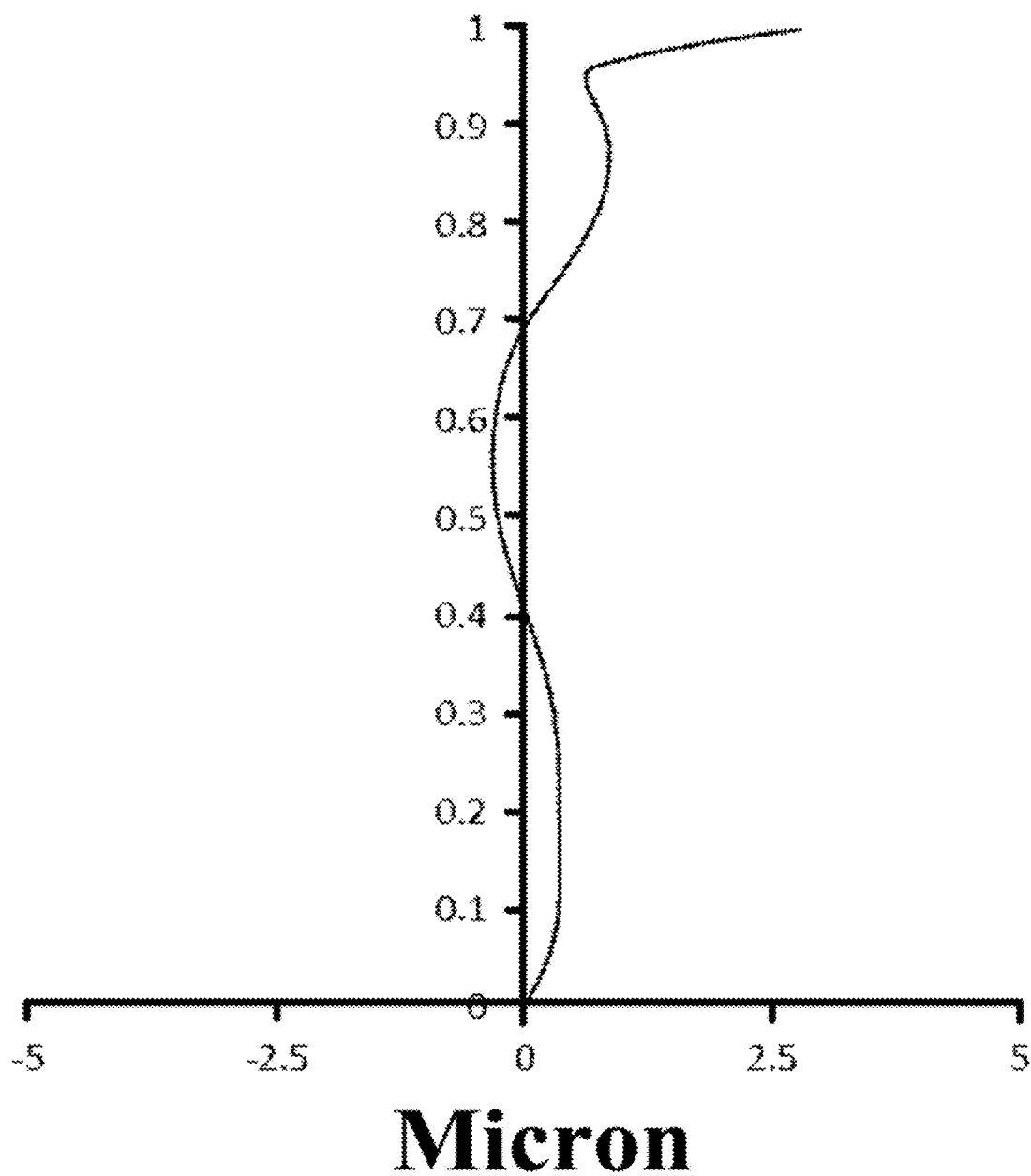

In addition, FIG. 4A shows a longitudinal aberration curve of the optical imaging system of embodiment 2, which indicates deviation of a convergence focal point after light with different wavelengths passes through the system. FIG. 4B shows an astigmatic curve of the optical imaging system of embodiment 2, which indicates a tangential image plane curvature and a sagittal image plane curvature. FIG. 4C shows a distortion curve of the optical imaging system of embodiment 2, which indicates a distortion value under different viewing angles. FIG. 4D shows a lateral color curve of the optical imaging system of embodiment 2, which indicates deviation of different image heights on the imaging surface after the light passes through the system. According to FIG. 4A to FIG. 4D, it can be seen that the optical imaging system provided in embodiment 2 can achieve high imaging quality.

Embodiment 3

Figure 5:
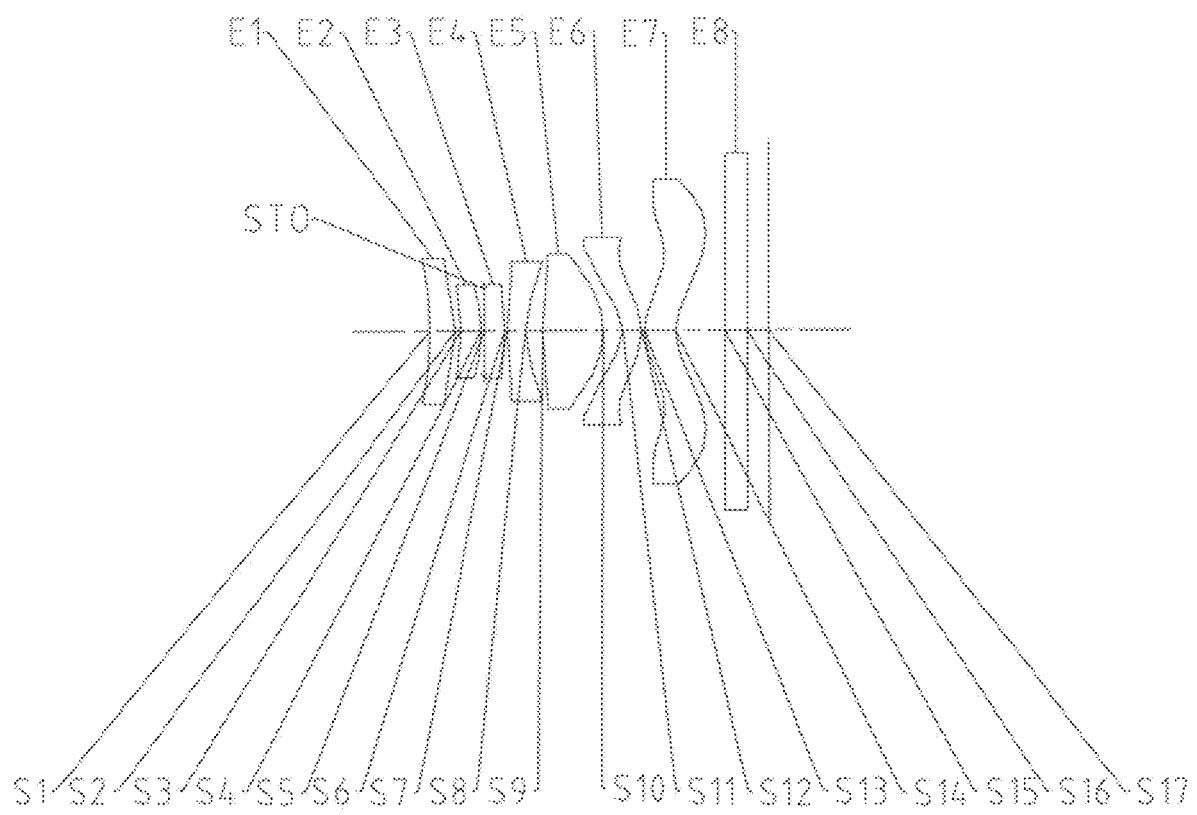
FIG. 5 is a structure diagram of an optical imaging system of embodiment 3 of the disclosure.

As shown in FIG. 5, the optical imaging system includes sequentially in a direction from an object side to an image side along an optical axis: a first lens E1, a second lens E2, a diaphragm STO, a third lens E3, a fourth lens E4, a fifth lens E5, a sixth lens E6, a seventh lens E7, an optical filter E8 and an imaging surface S17.

The first lens has a positive refractive power, an object-side surface of the first lens is a concave surface as well as an aspherical surface, and an image-side surface is a convex surface as well as a spherical surface. The second lens has a positive refractive power, an object-side surface of the second lens is a concave surface as well as a spherical surface, and an image-side surface is a convex surface as well as an aspherical surface. The third lens has a positive refractive power, an object-side surface of the third lens is a convex surface as well as an aspherical surface, and an image-side surface is a convex surface as well as an aspherical surface. The fourth lens has a negative refractive power, an object-side surface of the fourth lens is a convex surface as well as an aspherical surface, and an image-side surface is a concave surface as well as an aspherical surface. The fifth lens has a positive refractive power, an object-side surface of the fifth lens is a convex surface as well as an aspherical surface, and an image-side surface is a convex surface as well as an aspherical surface. The sixth lens has a negative refractive power, an object-side surface of the sixth lens is a concave surface as well as an aspherical surface, and an image-side surface is a convex surface as well as an aspherical surface. The seventh lens has a negative refractive power, an object-side surface of the seventh lens is a convex surface as well as an aspherical surface, and an image-side surface is a concave surface as well as an aspherical surface.

The optical imaging system further includes an optical filter including an object-side surface S15 and an image-side surface S16. Light from an object sequentially penetrates through each of the surfaces S1 to S16 and is finally imaged on the imaging surface S17.

Table 5 shows a surface type, radius of curvature, thickness, material and cone coefficient of each lens of the optical imaging system of embodiment 3. Units of the radius of curvature and the thickness are mm.

TABLE 5

| Surface number | Surface types | Radius of curvature (mm) | Thickness(mm) | Materials Refractive index | Abbe number | Conic coefficient |
|---|---|---|---|---|---|---|
| OBJ | Spherical | Infinity | Infinity | — | — | — |
| S1 | Aspheric | −5.3122 | 0.2539 | 1.55 | 64.1 | 51.9190 |
| S2 | Spherical | −2.3049 | 0.0552 | — | — | — |
| S3 | Spherical | −2.5784 | 0.2048 | 1.55 | 64.1 | — |
| S4 | Aspheric | −1.4601 | 0.0250 | — | — | −6.6926 |
| STO | Spherical | Infinity | 0.0085 | — | — | — |
| S5 | Aspheric | 11.1817 | 0.2010 | 1.65 | 23.5 | 15.8247 |
| S6 | Aspheric | −3.4860 | 0.0250 | — | — | 11.8002 |
| S7 | Aspheric | 2.9953 | 0.1800 | 1.65 | 23.5 | −15.3371 |
| S8 | Aspheric | 0.8946 | 0.1684 | — | — | −6.8810 |
| S9 | Aspheric | 3.8575 | 0.6054 | 1.55 | 64.1 | −50.3745 |
| S10 | Aspheric | −0.8493 | 0.1922 | — | — | −1.2564 |

TABLE 5-continued

| Surface number | Surface types | Radius of curvature (mm) | Thickness(mm) | Materials Refractive index | Abbe number | Conic coefficient |
|---|---|---|---|---|---|---|
| S11 | Aspheric | −0.3406 | 0.1889 | 1.65 | 23.5 | −2.9497 |
| S12 | Aspheric | −0.5760 | 0.0250 | — | — | −3.6360 |
| S13 | Aspheric | 0.5338 | 0.3094 | 1.55 | 64.1 | −3.7697 |
| S14 | Aspheric | 0.5789 | 0.4862 | — | — | −1.7339 |
| S15 | Spherical | Infinity | 0.2205 | 1.52 | 64.2 | — |
| S16 | Spherical | Infinity | 0.2204 | — | — | — |
| S17 | Spherical | Infinity | — | — | — | — |

In the embodiment, a calculation formula for a surface type x of each aspherical lens is the same as that in embodiment 1.

Table 6 shows high-order coefficients $A_4$, $A_6$, $A_8$, $A_{10}$, $A_{12}$, $A_{14}$, $A_{16}$ and $A_{20}$ applied to the aspherical mirror surfaces S1, S3, S5, S7 and S8 in embodiment 3.

TABLE 6

| Surface number | $A_4$ | $A_6$ | $A_8$ | $A_{10}$ | $A_{12}$ |
|---|---|---|---|---|---|
| S1 | −1.9223E−02 | 3.4232E−01 | −2.9990E+00 | 1.9290E+01 | −8.1623E+01 |
| S4 | 8.4458E−01 | −1.6188E+01 | 1.9627E+02 | −1.9015E+03 | 1.2960E+04 |
| S5 | 7.4175E−01 | −1.4254E+01 | 1.2626E+02 | −9.9180E+02 | 5.5600E+03 |
| S6 | 6.9347E−01 | −6.1805E+00 | 3.2776E+00 | 1.9044E+02 | 1.4226E+03 |
| S7 | 4.7707E−02 | −2.1242E+00 | 1.5934E+00 | 6.9446E+01 | −3.2613E+02 |
| S8 | −2.0322E−02 | 7.7318E−01 | −9.6162E+00 | 5.5470E+01 | −1.8298E+02 |
| S9 | 8.8596E−02 | −6.5810E−01 | 7.1879E+00 | −5.7021E+01 | 2.5853E+02 |
| S10 | −2.6809E−02 | 8.6471E−03 | −2.4829E+00 | 3.9937E+01 | −2.4545E+02 |
| S11 | 3.1788E−01 | −6.8281E+00 | 6.2216E+01 | −2.7720E+02 | 7.0497E+02 |
| S12 | 1.0453E−01 | −2.1102E+00 | 1.7225E+01 | −5.8201E+01 | 1.0885E+02 |
| S13 | −2.4120E−01 | −1.4260E−01 | −1.0554E+00 | 4.8610E+00 | −8.7646E+00 |
| S14 | −6.0609E−01 | 3.6610E−01 | 6.2086E−02 | −2.2159E−01 | −2.5855E−02 |

| Surface number | $A_{14}$ | $A_{16}$ | $A_{18}$ | $A_{20}$ |
|---|---|---|---|---|
| S1 | 2.1028E+02 | −2.9542E+02 | 1.7533E+02 | 0.0000E+00 |
| S4 | −5.6240E+04 | 1.3835E+05 | −1.4670E+05 | 0.0000E+00 |
| S5 | −1.9578E+04 | 3.9422E+04 | −3.5683E+04 | 0.0000E+00 |
| S6 | 5.7586E+03 | −1.2714E+04 | 1.1457E+04 | 0.0000E+00 |
| S7 | 6.5043E+02 | −6.6390E+02 | 3.0181E+02 | 0.0000E+00 |
| S8 | 3.5745E+02 | −3.8540E+02 | 1.7355E+02 | 0.0000E+00 |
| S9 | −7.0194E+02 | 1.1413E+03 | −1.0150E+03 | 3.7581E+02 |
| S10 | 7.4789E+02 | −1.2200E+03 | 1.0252E+03 | −3.4904E+02 |
| S11 | −1.0380E+03 | 8.2647E+02 | −2.7732E+02 | 0.0000E+00 |
| S12 | −1.1456E+02 | 6.2941E+01 | −1.3998E+01 | 0.0000E+00 |
| S13 | 8.5398E+00 | −4.6716E+00 | 1.3501E+00 | −1.6084E−01 |
| S14 | 2.2960E−01 | −1.7939E−01 | 5.9821E−02 | −7.5967E−03 |

In embodiment 3, an effective focal length of the first lens is f1=7.23 mm, an effective focal length of the second lens is f2=5.79 mm, an effective focal length of the third lens is f3=4.14 mm, an effective focal length of the fourth lens is f4=−2.05 mm, an effective focal length of the fifth lens is f5=1.33 mm, an effective focal length of the sixth lens is f6=−1.88 mm, and an effective focal length of the seventh lens is f7=3.6 mm. An effective focal length of the optical imaging system is f=1.84 mm, TTL=3.37 mm, HFOV=44.6°, and ImgH=1.86 mm, where TTL is a distance from a center of the object-side surface S1 of the first lens E1 to the imaging surface S17 on the optical axis, and ImgH is a half of a diagonal length of an effective pixel region on the imaging surface S17, specifically referring to Table 21.

The optical imaging system meets:
f5/f6=−0.71, f4/f=−1.11, f123/f7=0.50, |R2−R6|/R2+R6|=0.20, R11/R12=0.59, R13/R10=−0.63, CTmax/(3×CTmin)=1.12, CT5/(CT6+CT4)=1.64, |SAG52/CT5|=0.56, ImgH/|SAG72×10|=1.13, and DT21/DT71=0.34, specifically referring to Table 22.

Figure 6A:
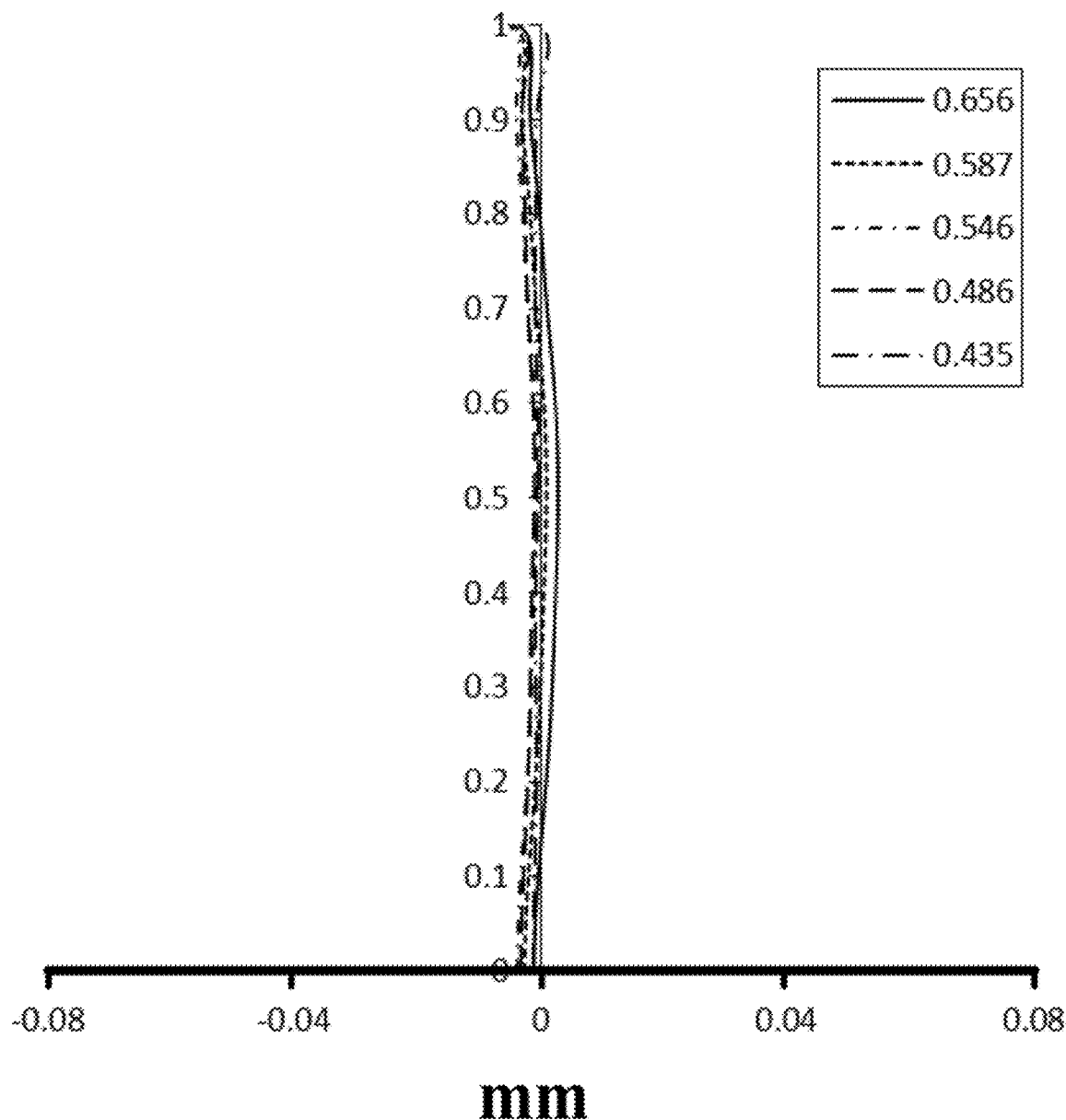
FIG. 6A to FIG. 6D show a longitudinal aberration curve, an astigmatic curve, a distortion curve and a lateral color curve of an optical imaging system of embodiment 3 respectively.
Figure 6B:
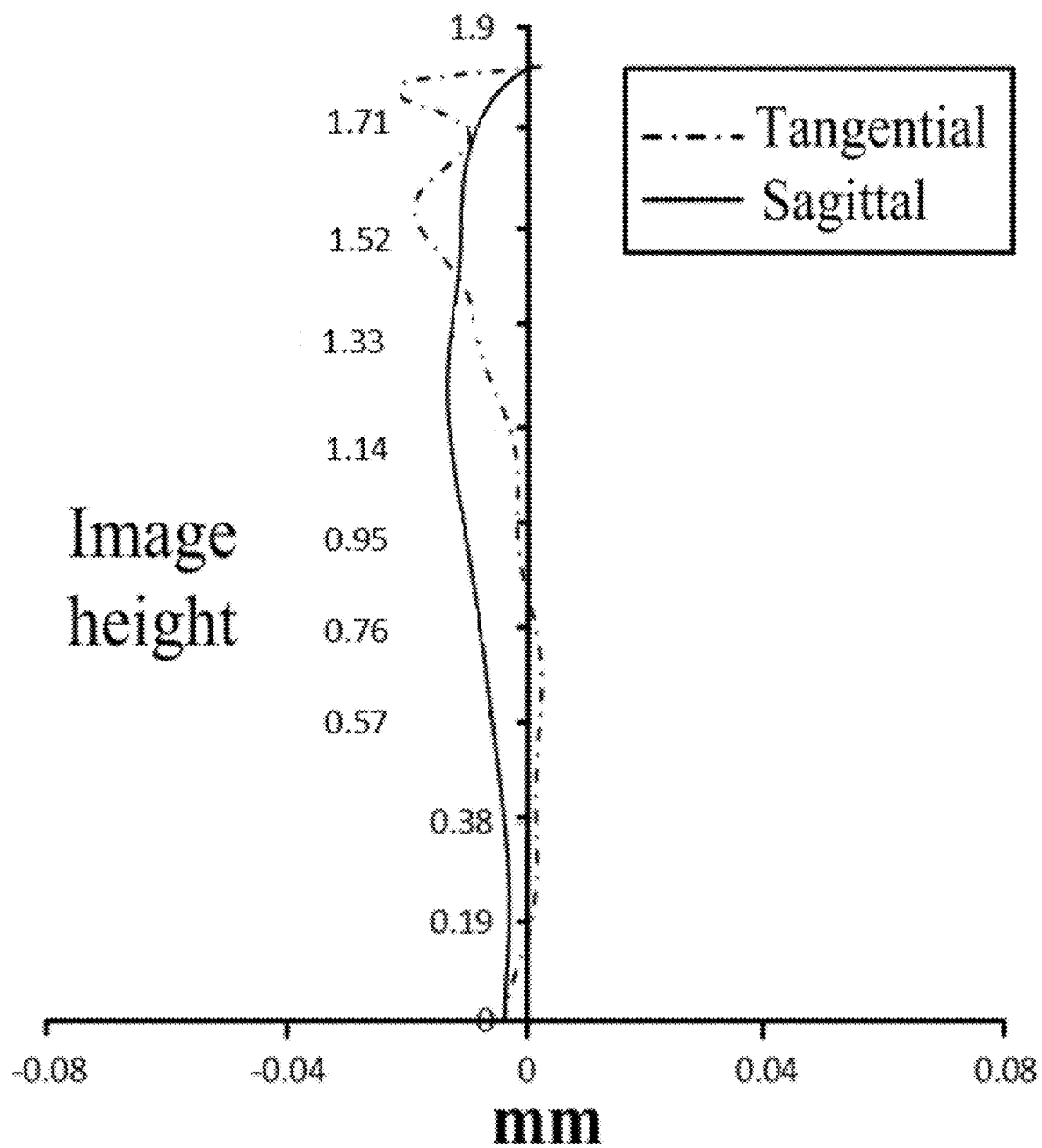
Figure 6C:
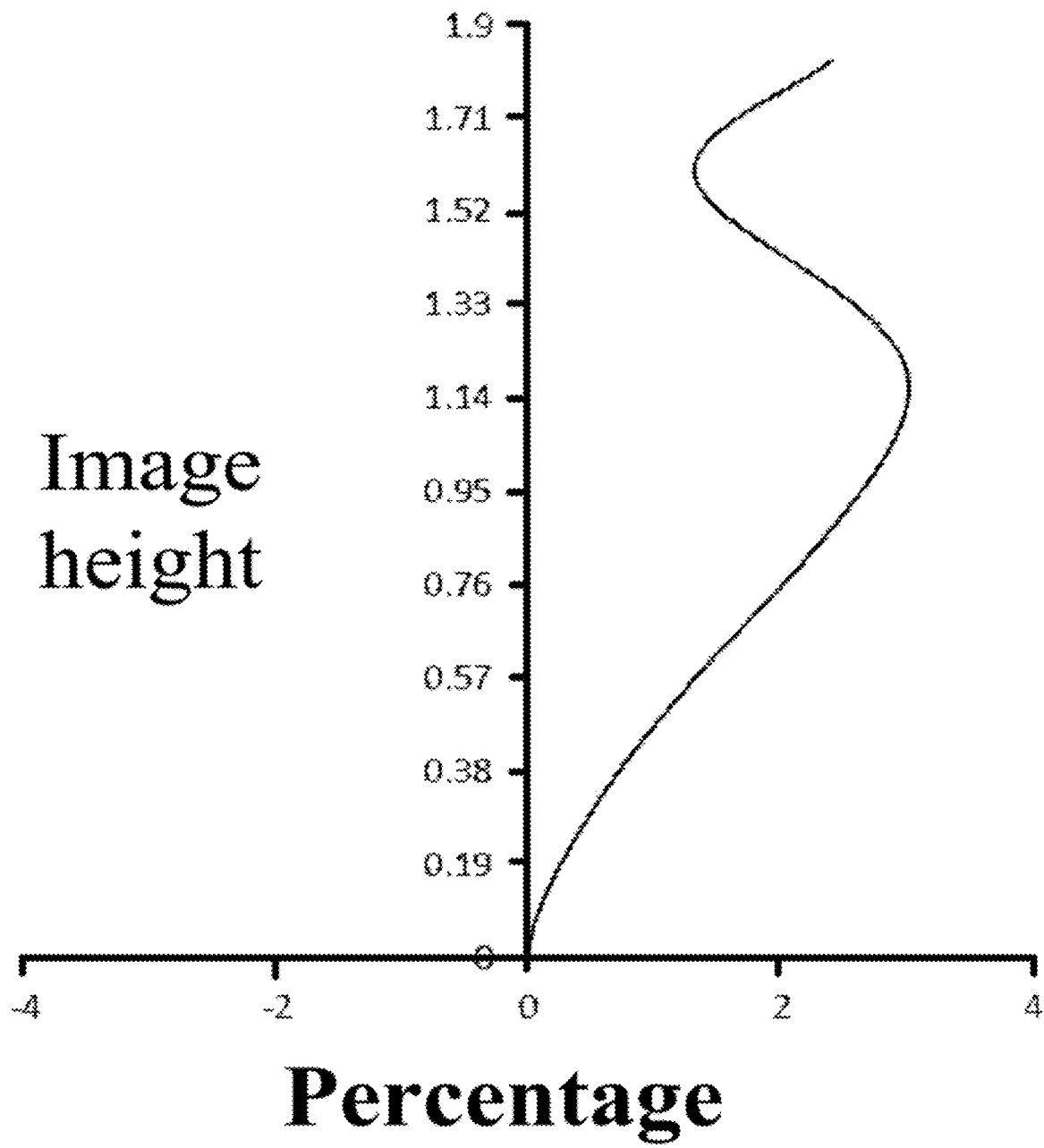
Figure 6D:
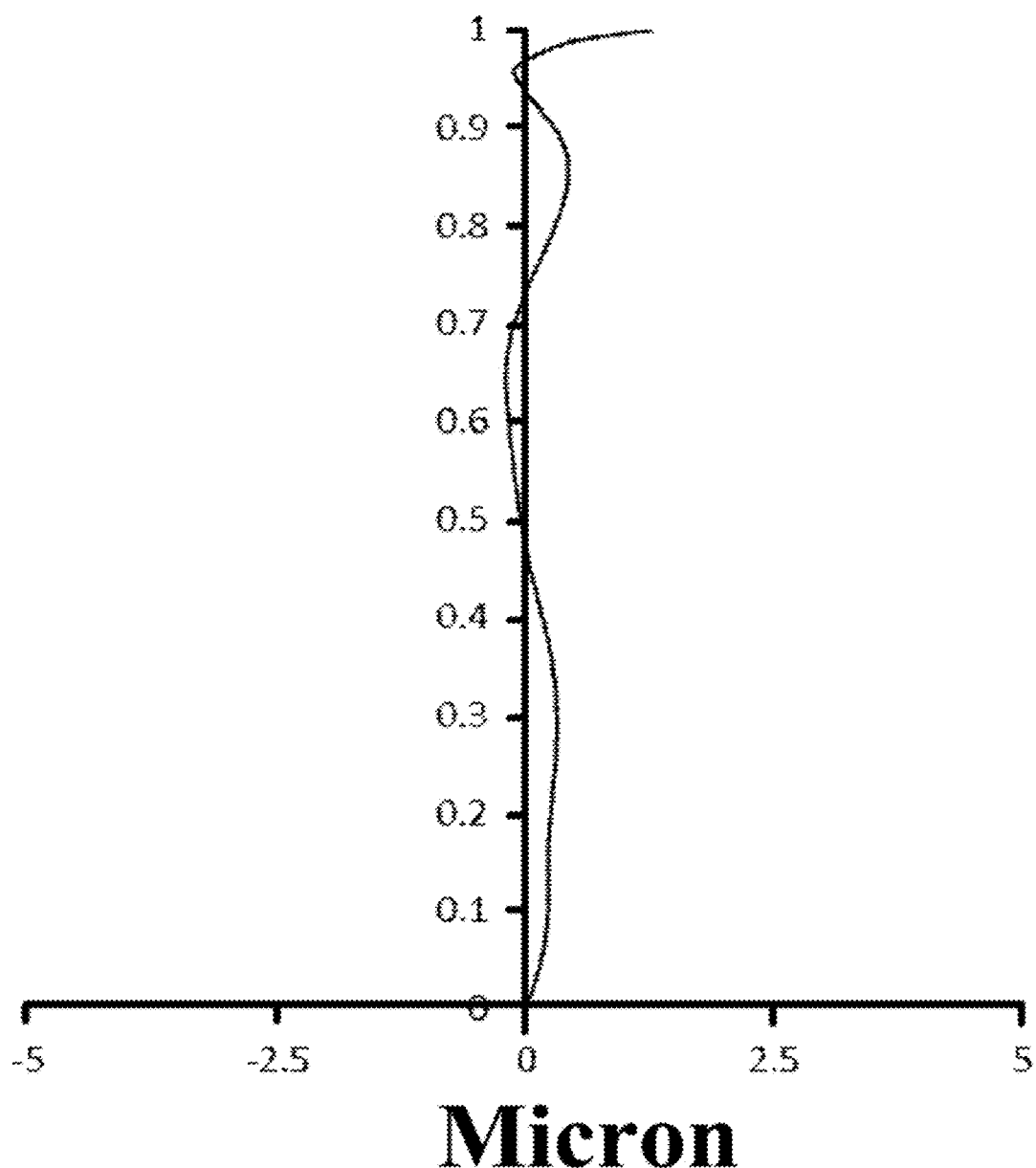

In addition, FIG. 6A shows a longitudinal aberration curve of the optical imaging system of embodiment 3, which indicates deviation of a convergence focal point after light with different wavelengths passes through the system. FIG. 6B shows an astigmatic curve of the optical imaging system of embodiment 3, which indicates a tangential image plane curvature and a sagittal image plane curvature. FIG. 6C shows a distortion curve of the optical imaging system of embodiment 3, which indicates a distortion value under different viewing angles. FIG. 6D shows a lateral color curve of the optical imaging system of embodiment 3, which indicates deviation of different image heights on the imaging surface after the light passes through the system. According to FIG. 6A to FIG. 6D, it can be seen that the optical imaging system provided in embodiment 3 can achieve high imaging quality.

Embodiment 4

Figure 7:
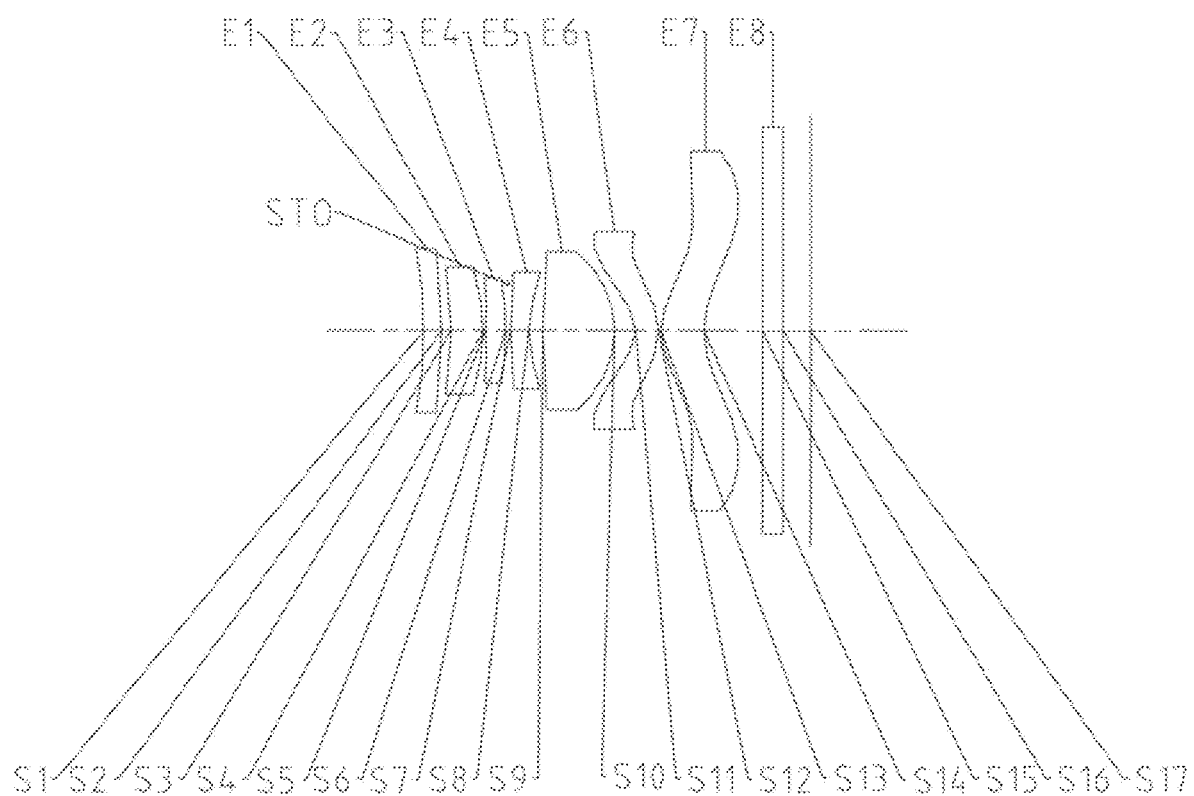
FIG. 7 is a structure diagram of an optical imaging system of embodiment 4 of the disclosure.

As shown in FIG. 7, the optical imaging system includes sequentially in a direction from an object side to an image side along an optical axis: a first lens E1, a second lens E2, a third lens E3, a diaphragm STO, a fourth lens E4, a fifth lens E5, a sixth lens E6, a seventh lens E7, an optical filter E8 and an imaging surface S17.

The first lens has a negative refractive power, an object-side surface of the first lens is a concave surface as well as an aspherical surface, and an image-side surface is a convex surface as well as an aspherical surface. The second lens has a positive refractive power, an object-side surface of the second lens is a concave surface as well as an aspherical surface, and an image-side surface is a convex surface as well as an aspherical surface. The third lens has a positive refractive power, an object-side surface of the third lens is a convex surface as well as an aspherical surface, and an image-side surface is a convex surface as well as an aspherical surface. The fourth lens has a negative refractive power, an object-side surface of the fourth lens is a convex surface as well as an aspherical surface, and an image-side surface is a concave surface as well as an aspherical surface. The fifth lens has a positive refractive power, an object-side surface of the fifth lens is a convex surface as well as an aspherical surface, and an image-side surface is a convex surface as well as an aspherical surface. The sixth lens has a negative refractive power, an object-side surface of the sixth lens is a concave surface as well as an aspherical surface, and an image-side surface is a convex surface as well as an aspherical surface. The seventh lens has a positive refractive power, an object-side surface of the seventh lens is a convex surface as well as an aspherical surface, and an image-side surface is a concave surface as well as an aspherical surface.

The optical imaging system further includes an optical filter including an object-side surface S15 and an image-side surface S16. Light from an object sequentially penetrates through each of the surfaces S1 to S16 and is finally imaged on the imaging surface S17.

Table 7 shows a surface type, radius of curvature, thickness, material and cone coefficient of each lens of the optical imaging system of embodiment 4. Units of the radius of curvature and the thickness are mm.

TABLE 7

| Surface number | Surface types | Radius of curvature | Thickness(mm) | Materials | | Conic coefficient (mm) |
| | | | | Refractive index | Abbe number | |
| --- | --- | --- | --- | --- | --- | --- |
| OBJ | Spherical | Infinity | 0.1465 | — | — | — |
| S1 | Aspheric | −5.8159 | 0.1800 | 1.55 | 64.1 | 44.3193 |
| S2 | Aspheric | −5.9703 | 0.0947 | — | — | 13.8695 |
| S3 | Aspheric | −2.7080 | 0.3216 | 1.55 | 64.1 | −4.9574 |
| S4 | Aspheric | −1.6653 | 0.0250 | — | — | −7.4983 |
| S5 | Aspheric | 4.2439 | 0.1976 | 1.65 | 23.5 | −60.3615 |
| S6 | Aspheric | −4.9795 | 0.0250 | — | — | 61.2413 |
| STO | Spherical | Infinity | 0.0250 | — | — | — |
| S7 | Aspheric | 3.4220 | 0.1800 | 1.65 | 23.5 | −65.5117 |
| S8 | Aspheric | 1.1010 | 0.1362 | — | — | −6.8317 |
| S9 | Aspheric | 3.8709 | 0.7182 | 1.55 | 64.1 | −69.3214 |
| S10 | Aspheric | −0.9415 | 0.2082 | — | — | −0.7689 |
| S11 | Aspheric | −0.3231 | 0.2264 | 1.65 | 23.5 | −2.4940 |
| S12 | Aspheric | −0.6109 | 0.0250 | — | — | −3.2742 |
| S13 | Aspheric | 0.5859 | 0.4238 | 1.55 | 64.1 | −3.8333 |
| S14 | Aspheric | 0.9306 | 0.5851 | — | — | −1.3997 |
| S15 | Spherical | Infinity | 0.2000 | 1.52 | 64.2 | — |
| S16 | Spherical | Infinity | 0.2781 | — | — | — |
| S17 | Spherical | Infinity | — | — | — | — |

In the embodiment, a calculation formula for a surface type x of each aspherical lens is the same as that in embodiment 1.

Table 8 shows high-order coefficients $A_4$, $A_6$, $A_8$, $A_{10}$, $A_{12}$, $A_{16}$ and $A_{20}$ applied to the aspherical mirror surfaces S1, S3, S5, S7 and S8 in embodiment 4.

TABLE 8

| Surface number | $A_4$ | $A_6$ | $A_8$ | $A_{10}$ | $A_{12}$ |
| --- | --- | --- | --- | --- | --- |
| S1 | 4.0241E−02 | 2.3439E−02 | −1.5409E+00 | 8.2095E+00 | −2.3543E+01 |
| S2 | −9.4228E−03 | −2.5331E−01 | 4.8989E−01 | −3.6085E−01 | 7.0585E−01 |
| S3 | 2.6946E−02 | 4.4209E−01 | −1.4882E+00 | 3.1690E+00 | −2.8382E+00 |
| S4 | −2.3149E−01 | 6.3238E+00 | −7.6209E+01 | 5.3882E+02 | −2.3850E+03 |
| S5 | −5.3213E−01 | 8.6362E+00 | −1.3996E+02 | 12259E+03 | −6.8194E+03 |
| S6 | 3.6014E−01 | −5.7654E+00 | 3.9137E+01 | −3.2901E+02 | 2.1187E+03 |
| S7 | 5.9256E−01 | −5.7361E+00 | 1.3935E+01 | 4.0788E+01 | −3.5789E+02 |
| S8 | 2.6592E−01 | −3.2208E+00 | 2.1660E+01 | −1.2928E+02 | 5.7637E+02 |
| S9 | 1.4821E−01 | −6.6931E−01 | 1.3998E+00 | −6.1201E+00 | 2.8538E+01 |
| S10 | 1.0734E−01 | −4.9103E−01 | −6.8619E+00 | 6.3222E+01 | −2.3544E+02 |
| S11 | 9.6078E−01 | −1.2844E+01 | 7.1877E+01 | −2.1297E+02 | 3.8421E+02 |
| S12 | 4.2319E−01 | −5.1607E+00 | 2.3039E+01 | −5.1534E+01 | 6.9642E+01 |
| S13 | −3.8276E−02 | −1.8038E−01 | 1.0489E−01 | 9.8531E−02 | −1.9681E−01 |
| S14 | −8.1777E−02 | −5.0670E−01 | 9.8853E−01 | −1.0475E+00 | 7.0774E−01 |

TABLE 8-continued

| Surface number | $A_{14}$ | $A_{16}$ | $A_{18}$ | $A_{20}$ |
|---|---|---|---|---|
| S1 | 3.9968E+01 | −3.6245E+01 | 1.3605E+01 | 0.0000E+00 |
| S2 | 0.0000E+00 | 0.0000E+00 | 0.0000E+00 | 0.0000E+00 |
| S3 | 1.9780E+00 | 0.0000E+00 | 0.0000E+00 | 0.0000E+00 |
| S4 | 6.4553E+03 | −9.7368E+03 | 6.2654E+03 | 0.0000E+00 |
| S5 | 2.3309E+04 | −4.4129E+04 | 3.5213E+04 | 0.0000E+00 |
| S6 | −7.9701E+03 | 1.5558E+04 | −1.2014E+04 | 0.0000E+00 |
| S7 | 9.2807E+02 | −1.0669E+03 | 4.6130E+02 | 0.0000E+00 |
| S8 | −1.6042E+03 | 2.4002E+03 | −1.4539E+03 | 0.0000E+00 |
| S9 | −9.6978E+01 | 2.1355E+02 | −2.4335E+02 | 1.0631E+02 |
| S10 | 4.8508E+02 | −5.8727E+02 | 3.9211E+02 | −1.1075E+02 |
| S11 | −4.3041E+02 | 2.7748E+02 | −7.9238E+01 | 0.0000E+00 |
| S12 | −5.7423E+01 | 2.6345E+01 | −5.1168E+00 | 0.0000E+00 |
| S13 | 1.4645E−01 | −5.7496E−02 | 1.1618E−02 | −9.4859E−04 |
| S14 | −3.0974E−01 | 8.4612E−02 | −1.3054E−02 | 8.6479E−04 |

In embodiment 4, an effective focal length of the first lens is f1=−700.00 mm, an effective focal length of the second lens is f2=7.14 mm, an effective focal length of the third lens is f3=3.58 mm, an effective focal length of the fourth lens is f4=−2.60 mm, an effective focal length of the fifth lens is f5=1.46 mm, an effective focal length of the sixth lens is f6=−1.54 mm, and an effective focal length of the seventh lens is f7=2.02 mm. An effective focal length of the optical imaging system is f1=1.84 mm, TTL=3.85 mm, HFOV=49.0°, and ImgH=2.15 mm, where TTL is a distance from a center of the object-side surface S1 of the first lens E1 to the imaging surface S17 on the optical axis, and ImgH is a half of a diagonal length of an effective pixel region on the imaging surface S17, specifically referring to Table 21.

The optical imaging system meets:
f5/f6=−0.95, f4/f=−1.41, f123/f7=1.15, |R2−R6|/R2+R6|=0.09, R11/R12=0.53, R13/R10=−0.62, CTmax/(3×CTmin)=1.33, CT5/(CT6+CT4)=1.77, |SAG52/CT5|=0.52, ImgH/|SAG72×10|=1.35, and DT21/DT71=0.39, specifically referring to Table 22.

Figure 8A:
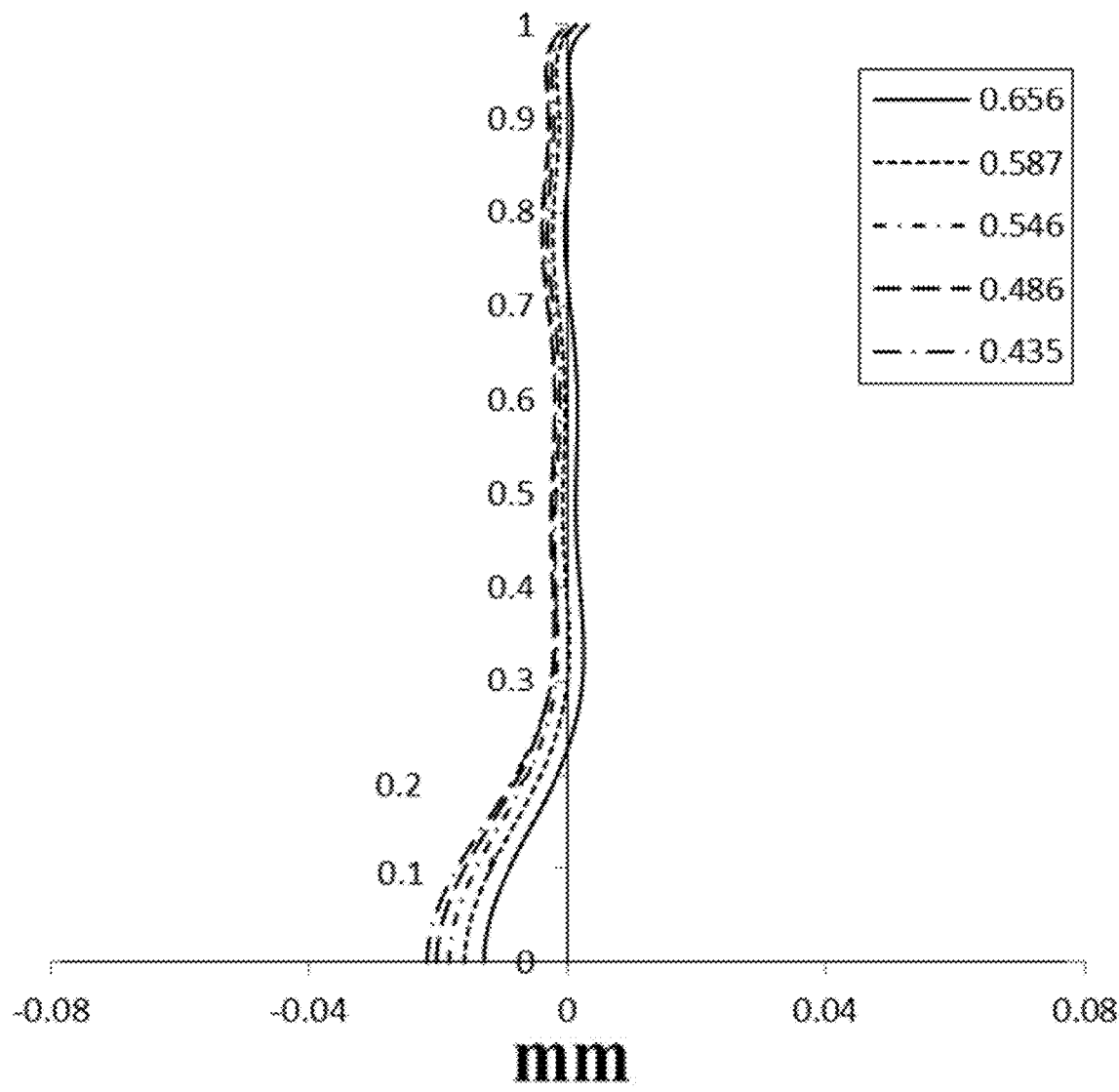
FIG. 8A to FIG. 8D show a longitudinal aberration curve, an astigmatic curve, a distortion curve and a lateral color curve of an optical imaging system of embodiment 4 respectively.
Figure 8B:
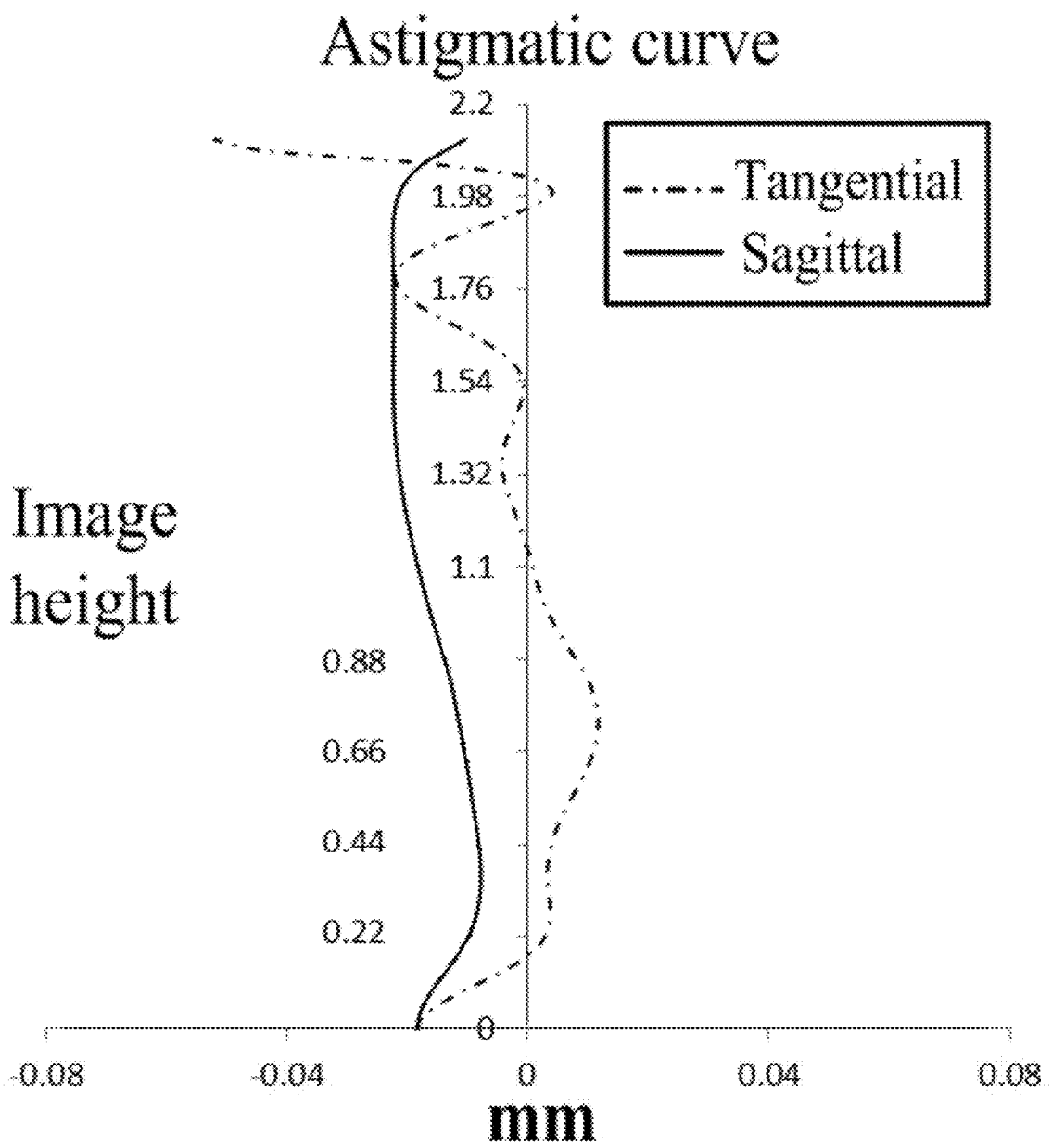
Figure 8C:
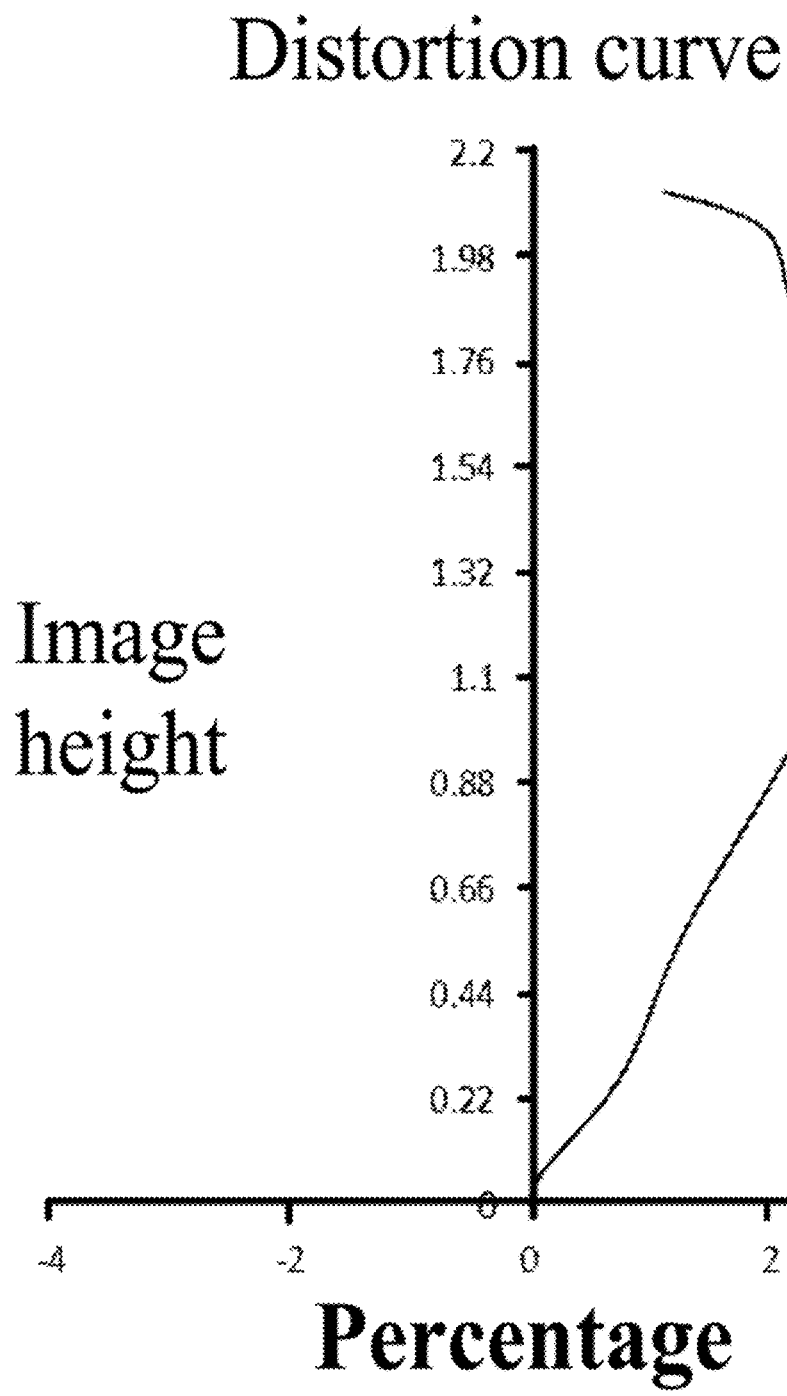
Figure 8D:
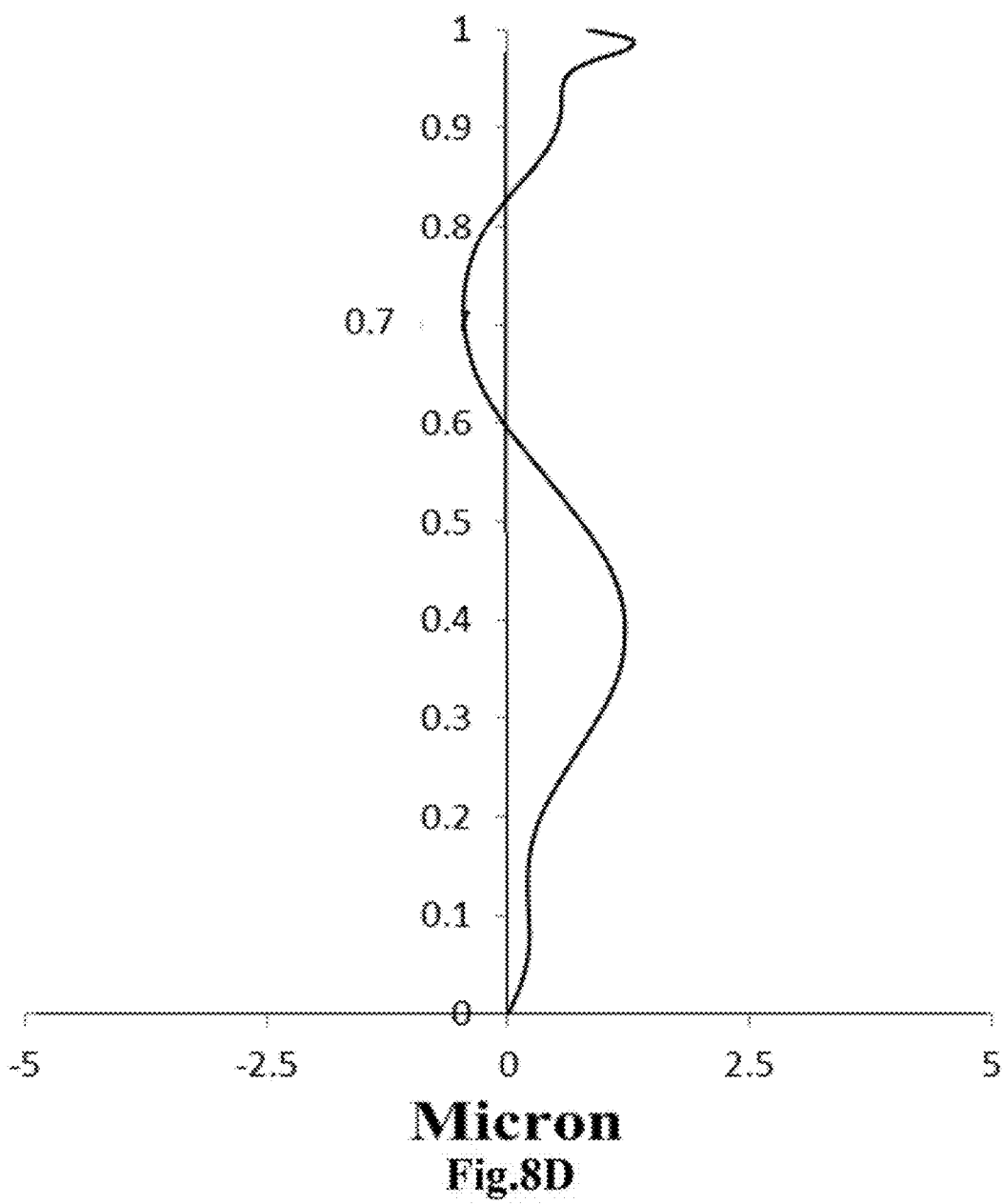

In addition, FIG. 8A shows a longitudinal aberration curve of the optical imaging system of embodiment 4, which indicates deviation of a convergence focal point after light with different wavelengths passes through the system. FIG. 8B shows an astigmatic curve of the optical imaging system of embodiment 4, which indicates a tangential image plane curvature and a sagittal image plane curvature. FIG. 8C shows a distortion curve of the optical imaging system of embodiment 4, which indicates a distortion value under different viewing angles. FIG. 8D shows a lateral color curve of the optical imaging system of embodiment 4, which indicates deviation of different image heights on the imaging surface after the light passes through the system. According to FIG. 8A to FIG. 8D, it can be seen that the optical imaging system provided in embodiment 4 can achieve high imaging quality.

Embodiment 5

Figure 9:
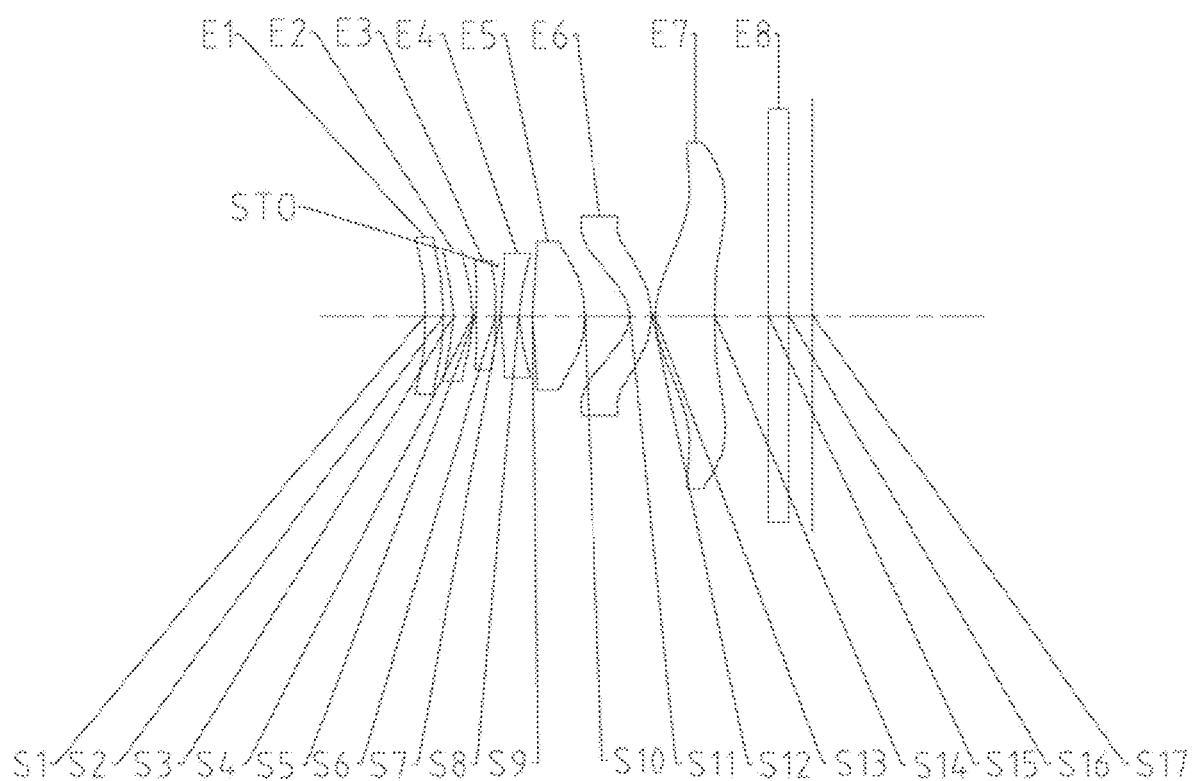
FIG. 9 is a structure diagram of an optical imaging system of embodiment 5 of the disclosure.

As shown in FIG. 9, the optical imaging system includes sequentially in a direction from an object side to an image side along an optical axis: a first lens E1, a second lens E2, a third lens E3, a diaphragm STO, a fourth lens E4, a fifth lens E5, a sixth lens E6, a seventh lens E7, an optical filter E8 and an imaging surface S17.

The first lens has a positive refractive power, an object-side surface of the first lens is a concave surface as well as an aspherical surface, and an image-side surface is a convex surface as well as an aspherical surface. The second lens has a negative refractive power, an object-side surface of the second lens is a concave surface as well as an aspherical surface, and an image-side surface is a convex surface as well as an aspherical surface. The third lens has a positive refractive power, an object-side surface of the third lens is a convex surface as well as an aspherical surface, and an image-side surface is a convex surface as well as an aspherical surface. The fourth lens has a negative refractive power, an object-side surface of the fourth lens is a convex surface as well as an aspherical surface, and an image-side surface is a concave surface as well as an aspherical surface. The fifth lens has a positive refractive power, an object-side surface of the fifth lens is a convex surface as well as an aspherical surface, and an image-side surface is a convex surface as well as an aspherical surface. The sixth lens has a negative refractive power, an object-side surface of the sixth lens is a concave surface as well as an aspherical surface, and an image-side surface is a convex surface as well as an aspherical surface. The seventh lens has a positive refractive power, an object-side surface of the seventh lens is a convex surface as well as an aspherical surface, and an image-side surface is a convex surface as well as a spherical surface.

The optical imaging system further includes the optical filter including an object-side surface S15 and an image-side surface S16. Light from an object sequentially penetrates through each of the surfaces S1 to S16 and is finally imaged on the imaging surface S17.

Table 9 shows a surface type, radius of curvature, thickness, material and cone coefficient of each lens of the optical imaging system of embodiment 5. Units of the radius of curvature and the thickness are mm.

TABLE 9

| Surface number | Surface types | Radius of curvature (mm) | Thickness(mm) | Refractive index | Abbe number | Conic coefficient |
|---|---|---|---|---|---|---|
| OBJ | Spherical | Infinity | Infinity | — | — | — |
| S1 | Aspheric | −5.5930 | 0.1800 | 1.55 | 64.1 | 41.2052 |
| S2 | Aspheric | −3.1698 | 0.1041 | — | — | 6.1571 |
| S3 | Aspheric | −1.0745 | 0.1979 | 1.55 | 64.1 | −6.7257 |
| S4 | Aspheric | −1.1558 | 0.0250 | — | — | −6.8269 |
| S5 | Aspheric | 3.0378 | 0.1947 | 1.65 | 23.5 | −77.5804 |
| S6 | Aspheric | −88.7022 | 0.0250 | — | — | 99.0000 |
| STO | Spherical | Infinity | 0.0250 | — | — | — |
| S7 | Aspheric | 1.9136 | 0.1800 | 1.65 | 23.5 | −31.0122 |
| S8 | Aspheric | 1.0244 | 0.1329 | — | — | −7.0820 |
| S9 | Aspheric | 4.5858 | 0.5209 | 1.55 | 64.1 | −21.6782 |
| S10 | Aspheric | −1.0632 | 0.4500 | — | — | −1.0418 |
| S11 | Aspheric | −0.2966 | 0.2200 | 1.65 | 23.5 | −2.0152 |
| S12 | Aspheric | −0.6602 | 0.0250 | — | — | −2.2782 |
| S13 | Aspheric | 0.6759 | 0.5910 | 1.55 | 64.1 | −5.7962 |
| S14 | Spherical | −500.0000 | 0.5410 | — | — | −99.0000 |
| S15 | Spherical | Infinity | 0.2000 | 1.52 | 64.2 | — |
| S16 | Spherical | Infinity | 0.2375 | — | — | — |
| S17 | Spherical | Infinity | — | — | — | — |

In the embodiment, a calculation formula for a surface type x of each aspherical lens is the same as that in embodiment 1.

Table 10 shows high-order coefficients $A_4$, $A_6$, $A_8$, $A_{10}$, $A_{12}$, $A_{14}$, $A_{16}$ and $A_{20}$ applied to the aspherical mirror surfaces S1, S3, S5, S7 and S8 in embodiment 5.

TABLE 10

| Surface number | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|
| S1 | −5.4038E−02 | 1.0520E−01 | −1.7527E+00 | 8.3098E+00 | −2.3344E+01 | 4.0320E+01 | −3.7550E+01 | 1.4563E+01 | 0.0000E+00 |
| S2 | −3.3986E−02 | −9.6863E−02 | 5.6671E−02 | 4.0756E−01 | 0.0000E+00 | 0.0000E+00 | 0.0000E+00 | 0.0000E+00 | 0.0000E+00 |
| S3 | 6.1788E−02 | 5.2336E−01 | −1.6572E+00 | 3.9564E+00 | −3.6293E+00 | 1.8908E+00 | 0.0000E+00 | 0.0000E+00 | 0.0000E+00 |
| S4 | −3.7976E−01 | 5.6000E+00 | −4.3843E+01 | 2.3819E+02 | −8.6116E+02 | 1.9651E+03 | −2.5449E+03 | 1.4208E+03 | 0.0000E+00 |
| S5 | −4.5438E−01 | 3.8980E+00 | −7.3064E+01 | 6.8504E+02 | −3.9113E+03 | 1.3393E+04 | −2.5263E+04 | 2.0073E+04 | 0.0000E+00 |
| S6 | 5.6508E−01 | −1.6395E+01 | 1.3813E+02 | −8.1437E+02 | 3.2244E+03 | −7.6996E+03 | 9.0416E+03 | −2.9103E+03 | 0.0000E+00 |
| S7 | 1.1566E+00 | −1.8047E+01 | 1.3618E+02 | −7.8080E+02 | 3.3447E+03 | −9.7224E+03 | 1.6631E+04 | −1.2541E+04 | 0.0000E+00 |
| S8 | 4.2479E−01 | −4.5075E+00 | 1.8764E+01 | −4.6732E+01 | 6.4503E+01 | −4.1910E+01 | −1.1433E+01 | 2.9731E+01 | 0.0000E+00 |
| S9 | 1.2322E−01 | −3.3062E−01 | −6.8477E−02 | 9.7516E+00 | −8.6180E+01 | 3.5190E+02 | −7.4138E+02 | 7.5225E+02 | −2.7044E+02 |
| S10 | −6.2013E−03 | −6.2788E−01 | 3.1152E+00 | −1.1166E+01 | 4.1240E+01 | −1.4654E+02 | 3.5144E+02 | −4.3856E+02 | 2.1483E+02 |
| S11 | 8.4376E−01 | −1.3123E+01 | 7.4865E+01 | −2.3131E+02 | 4.4225E+02 | −5.1744E+02 | 3.3794E+02 | −9.4397E+01 | 0.0000E+00 |
| S12 | 5.7983E−01 | −5.6745E+00 | 2.0213E+01 | −3.7349E+01 | 4.1206E+01 | −2.6335E+01 | 8.4623E+00 | −9.2987E−01 | 0.0000E+00 |
| S13 | 1.2119E−01 | −4.0589E−01 | 5.1021E−01 | −3.5562E−01 | 1.0951E−01 | 8.5565E−03 | −1.5789E−02 | 4.1099E−03 | −3.5977E−04 |
| S14 | 6.3019E−01 | −1.3712E+00 | 1.6693E+00 | −1.3270E+00 | 6.9660E−01 | −2.4077E−01 | 5.2989E−02 | −6.7393E−03 | 3.7602E−04 |

In embodiment 5, an effective focal length of the first lens is f1=13.04 mm, an effective focal length of the second lens is f2=−200.00 mm, an effective focal length of the third lens is f3=4.56 mm, an effective focal length of the fourth lens is f4=−3.71 mm, an effective focal length of the fifth lens is f5=1.63 mm, an effective focal length of the sixth lens is f6=−1.09 mm, and an effective focal length of the seventh lens is f7=1.24 mm. An effective focal length of the optical imaging system is f=1.84 mm, TTL=3.85 mm, HFOV=49.1°, and ImgH=2.15 mm, where TTL is a distance from a center of the object-side surface S1 of the first lens E1 to the imaging surface S17 on the optical axis, and ImgH is a half of a diagonal length of an effective pixel region on the imaging surface S17, specifically referring to Table 21.

The optical imaging system meets:
f5/f6=−1.49, f4/f=−2.02, f123/f7=2.71, |R2−R6|/R2+R6|=0.93, R11/R12=0.45, R13/R10=−0.64, CTmax/(3×CTmin)=1.09, CT5/(CT6+CT4)=1.30, |SAG52/CT5|=0.50, ImgH/|SAG72×10|=1.91, and DT21/DT71=0.40, specifically referring to Table 22.

Figure 10A:
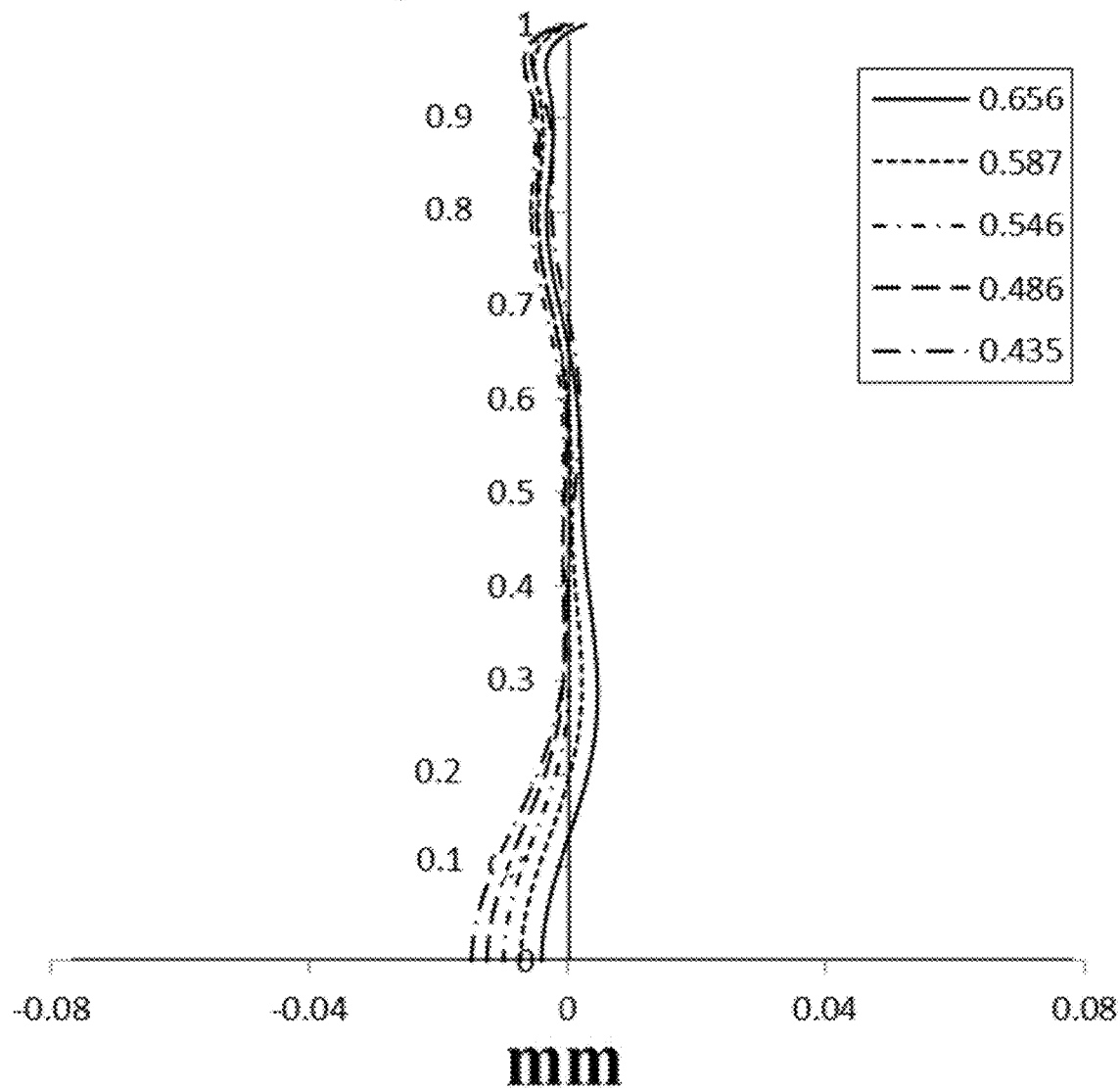
FIG. 10A to FIG. 10D show a longitudinal aberration curve, an astigmatic curve, a distortion curve and a lateral color curve of an optical imaging system of embodiment 5 respectively.
Figure 10B:
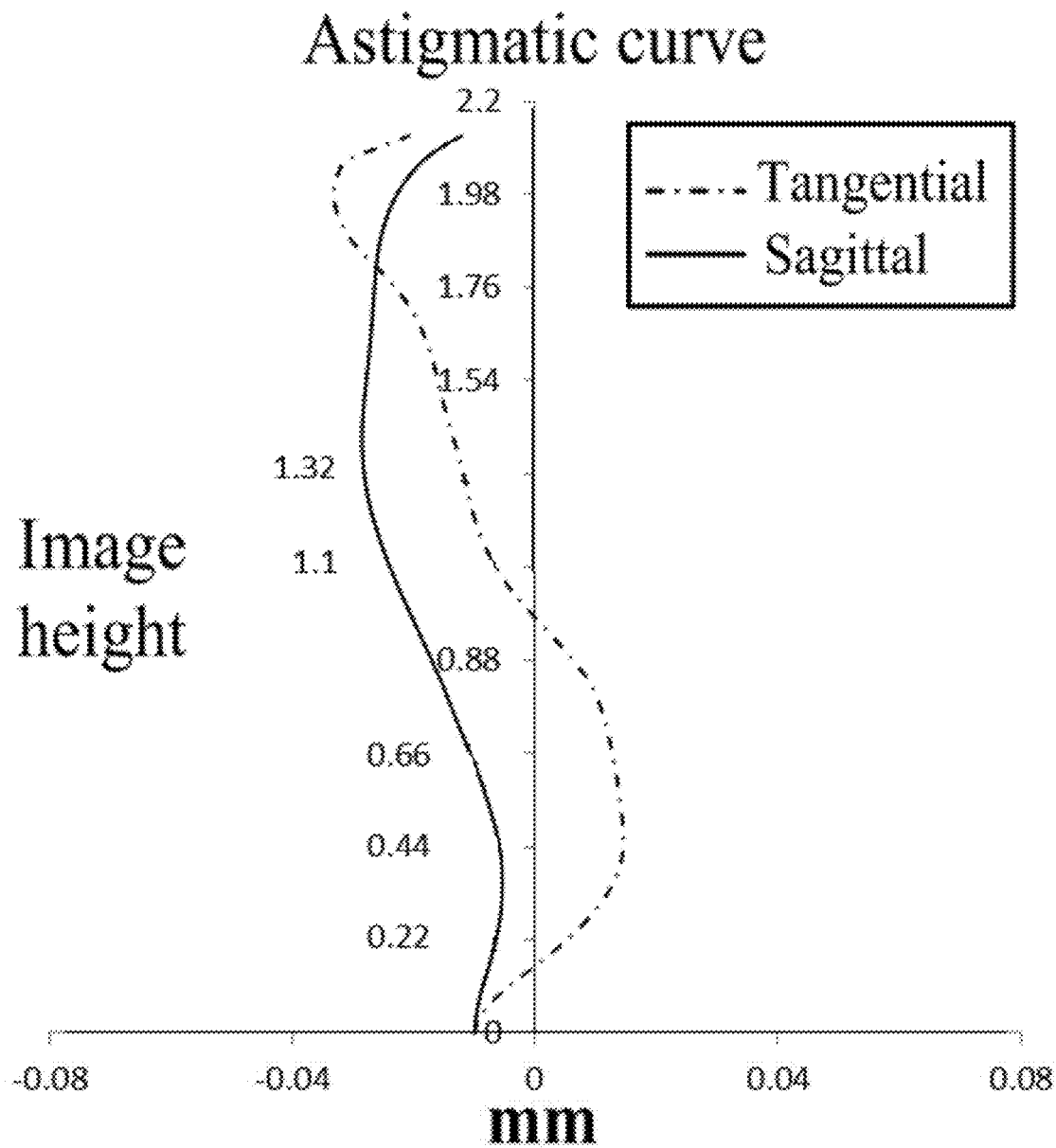
Figure 10C:
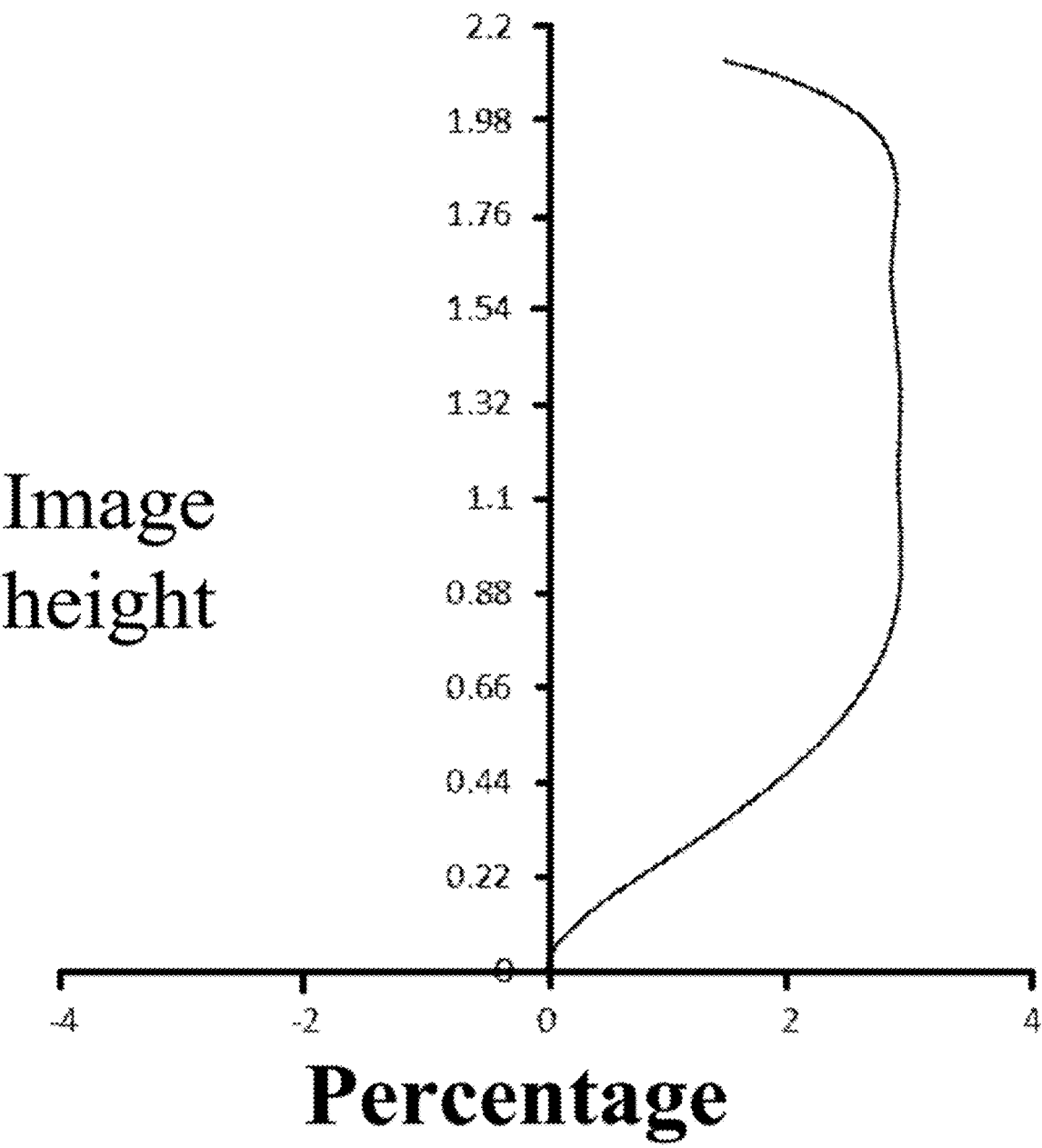
Figure 10D:
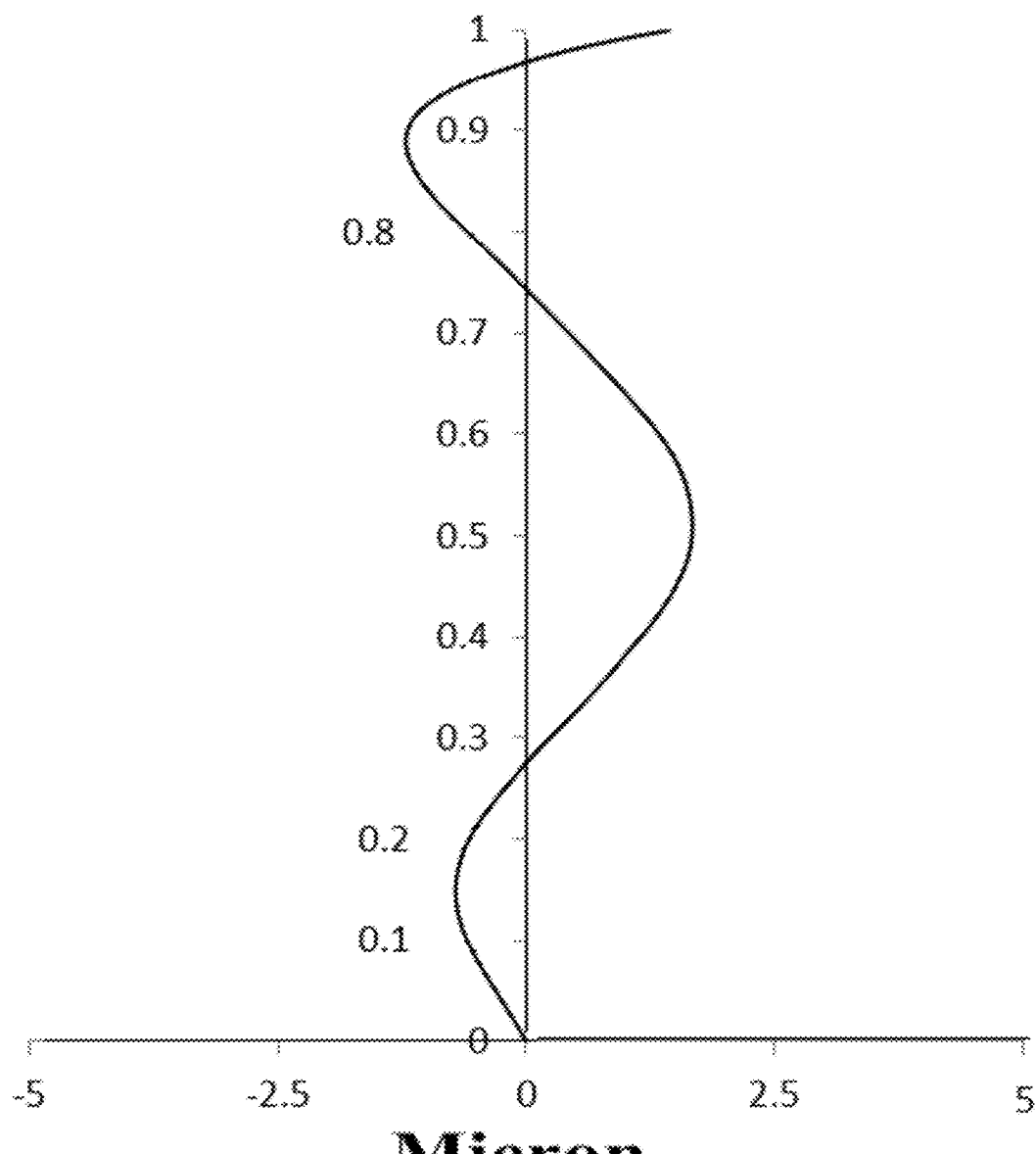

In addition, FIG. 10A shows a longitudinal aberration curve of the optical imaging system of embodiment 5, which indicates deviation of a convergence focal point after light with different wavelengths passes through the system. FIG. 10B shows an astigmatic curve of the optical imaging system of embodiment 5, which indicates a tangential image plane curvature and a sagittal image plane curvature. FIG. 10O shows a distortion curve of the optical imaging system of embodiment 5, which indicates a distortion value under different viewing angles. FIG. 10D shows a lateral color curve of the optical imaging system of embodiment 5, which indicates deviation of different image heights on the imaging surface after the light passes through the system. According to FIG. 10A to FIG. 10D, it can be seen that the optical imaging system provided in embodiment 5 can achieve high imaging quality.

Embodiment 6

Figure 11:
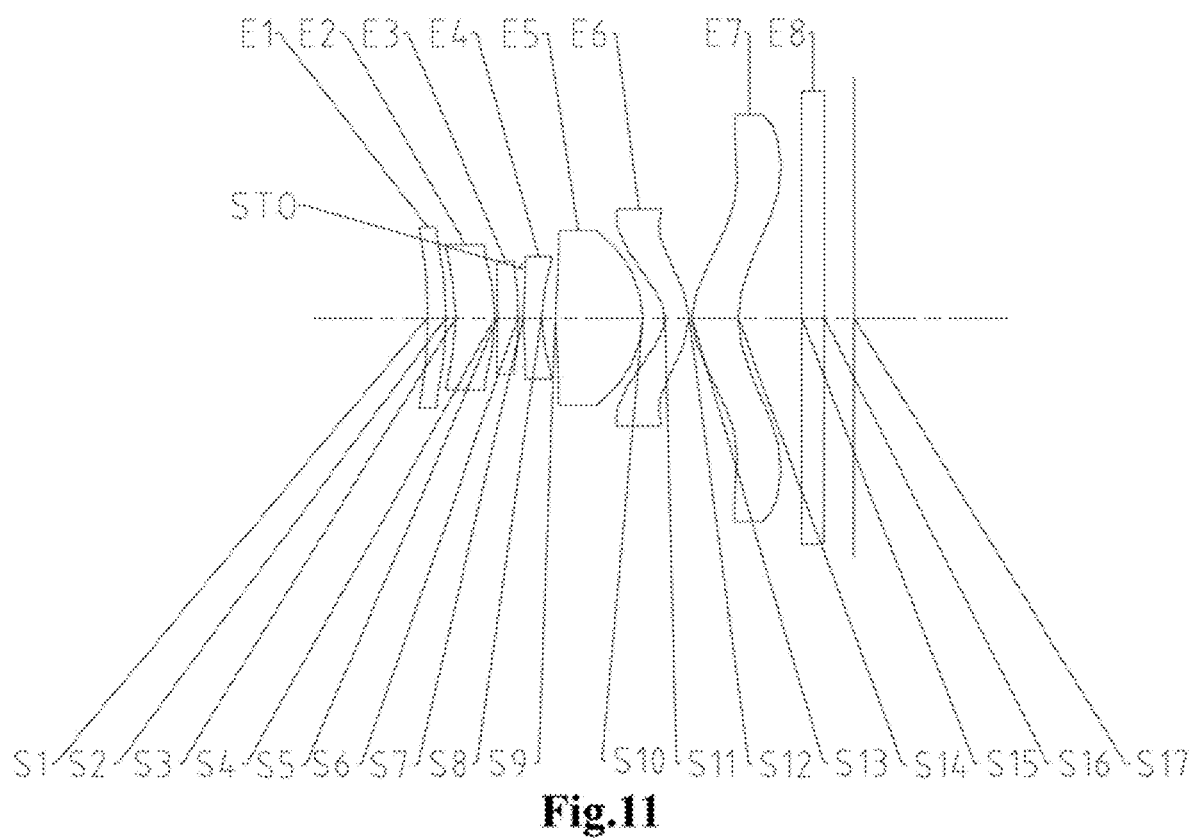
FIG. 11 is a structure diagram of an optical imaging system of embodiment 6 of the disclosure.

As shown in FIG. 11, the optical imaging system includes sequentially in a direction from an object side to an image side along an optical axis: a first lens E1, a second lens E2, a third lens E3, a diaphragm STO, a fourth lens E4, a fifth lens E5, a sixth lens E6, a seventh lens E7, an optical filter E8 and an imaging surface S17.

The first lens has a positive refractive power, an object-side surface of the first lens is a concave surface as well as an aspherical surface, and an image-side surface is a convex surface as well as an aspherical surface. The second lens has a positive refractive power, an object-side surface of the second lens is a concave surface as well as an aspherical surface, and an image-side surface is a convex surface as well as an aspherical surface. The third lens has a positive refractive power, an object-side surface of the third lens is a convex surface as well as an aspherical surface, and an image-side surface is a convex surface as well as an aspherical surface. The fourth lens has a negative refractive power, an object-side surface of the fourth lens is a convex surface as well as an aspherical surface, and an image-side surface is a concave surface as well as an aspherical surface. The fifth lens has a positive refractive power, an object-side surface of the fifth lens is a convex surface as well as an aspherical surface, and an image-side surface is a convex surface as well as an aspherical surface. The sixth lens has a negative refractive power, an object-side surface of the sixth lens is a concave surface as well as an aspherical surface, and an image-side surface is a convex surface as well as an aspherical surface. The seventh lens has a positive refractive power, an object-side surface of the seventh lens is a convex surface as well as an aspherical surface, and an image-side surface is a concave surface as well as a spherical surface.

The optical imaging system further includes the optical filter including an object-side surface S15 and an image-side surface S16. Light from an object sequentially penetrates through each of the surfaces S1 to S16 and is finally imaged on the imaging surface S17.

Table 11 shows a surface type, radius of curvature, thickness, material and cone coefficient of each lens of the optical imaging system of embodiment 6. Units of the radius of curvature and the thickness are mm.

TABLE 11

| Surface number | Surface types | Radius of curvature (mm) | Thickness (mm) | Materials Refractive index | Abbe number | Conic coefficient |
|---|---|---|---|---|---|---|
| OBJ | Spherical | Infinity | Infinity | — | — | — |
| S1 | Aspheric | −6.3744 | 0.1800 | 1.55 | 64.1 | 44.0977 |
| S2 | Aspheric | −3.8816 | 0.0991 | — | — | 5.0154 |
| S3 | Aspheric | −1.8436 | 0.3939 | 1.55 | 64.1 | −5.3373 |
| S4 | Aspheric | −1.5478 | 0.0250 | — | — | −8.4328 |
| S5 | Aspheric | 5.0310 | 0.2022 | 1.65 | 23.5 | −75.8144 |
| S6 | Aspheric | −5.7853 | 0.0250 | — | — | 82.9879 |
| STO | Spherical | Infinity | 0.0250 | — | — | — |
| S7 | Aspheric | 4.1944 | 0.1800 | 1.65 | 23.5 | −89.3275 |
| S8 | Aspheric | 1.2839 | 0.1377 | — | — | −7.1083 |
| S9 | Aspheric | 4.3642 | 0.8710 | 1.55 | 64.1 | −98.9484 |
| S10 | Aspheric | −0.9375 | 0.2179 | — | — | −0.7647 |
| S11 | Aspheric | −0.3086 | 0.2384 | 1.65 | 23.5 | −2.3921 |
| S12 | Aspheric | −0.6012 | 0.0250 | — | — | −3.4122 |
| S13 | Aspheric | 0.6107 | 0.4600 | 1.55 | 64.1 | −3.6913 |
| S14 | Spherical | 1.1397 | 0.6336 | — | — | −1.2254 |
| S15 | Spherical | Infinity | 0.2203 | 1.52 | 64.2 | — |
| S16 | Spherical | Infinity | 0.2959 | — | — | — |
| S17 | Spherical | Infinity | — | — | — | — |

In the embodiment, a calculation formula for a surface type x of each aspherical lens is the same as that in embodiment 1.

Table 12 shows high-order coefficients $A_4$, $A_6$, $A_8$, $A_{10}$, $A_{12}$, $A_{14}$, $A_{16}$ and $A_{20}$ applied to the aspherical mirror surfaces S1, S3, S5, S7 and S8 in embodiment 6.

TABLE 12

| Surface number | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|
| S1 | 3.1844E−02 | −2.1767E−03 | −8.0482E−01 | 3.5740E+00 | −8.7022E+00 | 1.2721E+01 | −9.9008E+00 | 3.1686E+00 | 0.0000E+00 |
| S2 | −1.7928E−02 | −4.6064E−02 | 1.8679E−02 | 1.5110E−01 | 0.0000E+00 | 0.0000E+00 | 0.0000E+00 | 0.0000E+00 | 0.0000E+00 |
| S3 | 2.0749E−02 | 3.3663E−01 | −1.0044E+00 | 1.8647E+00 | −1.9159E+00 | 1.0085E+00 | 0.0000E+00 | 0.0000E+00 | 0.0000E+00 |
| S4 | 6.0119E−02 | 1.0113E+00 | −1.8969E+01 | 1.4685E+02 | −6.5255E+02 | 1.7066E+03 | −2.4352E+03 | 1.4639E+03 | 0.0000E+00 |
| S5 | −2.4552E−01 | 2.9693E+00 | −6.3616E+01 | 5.7235E+02 | −3.0483E+03 | 9.6828E+03 | −1.6760E+04 | 1.2092E+04 | 0.0000E+00 |
| S6 | 2.0492E−01 | −4.5591E+00 | 2.4675E+01 | −1.2586E+02 | 5.7915E+02 | −1.7280+E03 | 2.7249E+03 | −1.6693E+03 | 0.0000E+00 |
| S7 | 5.1967E−01 | −4.9167E+00 | 1.2489E+01 | 2.4641E+01 | −2.3847E+02 | 5.7944E+02 | −6.0567E+02 | 2.3504E+02 | 0.0000E+00 |
| S8 | 2.1129E−01 | −2.1297E+00 | 9.6271E+00 | −3.7687E+01 | 1.3512E+02 | −3.4513E+02 | 4.8557E+02 | −2.7291E+02 | 0.0000E+00 |
| S9 | 1.1547E−01 | −4.3766E−01 | −5.3975E−01 | 5.0260E+00 | −1.3580E+01 | 1.8227E+01 | 2.8124E+00 | −3.0608E+01 | 1.9650E+01 |
| S10 | 1.3409E−01 | −5.6604E−01 | −5.5620E+00 | 4.7739E+01 | −1.5862E+02 | 2.8674E+02 | −2.9790E+02 | 1.6687E+02 | −3.8907E+01 |
| S11 | 8.1663E−01 | −1.0528E+01 | 5.4307E+01 | −1.4682E+02 | 2.3757E+02 | −2.3279E+02 | 1.2778E+02 | −3.0281E+01 | 0.0000E+00 |
| S12 | 4.0788E−01 | −4.6147E+00 | 1.8831E+01 | −3.8971E+01 | 4.8050E+01 | −3.5549E+01 | 1.4503E+01 | −2.5024E+00 | 0.0000E+00 |
| S13 | −3.0934E−02 | 1.0584E−01 | −3.5768E−01 | 4.6735E−01 | −3.4850E−01 | 1.5850E−01 | −4.2971E−02 | 6.3442E−03 | −3.9137E−04 |
| S14 | 1.6309E−02 | −3.2272E−01 | 4.0207E−01 | −3.0196E−01 | 1.5153E−01 | −5.1193E−02 | 1.1168E−02 | −1.4109E−03 | 7.7649E−05 |

In embodiment 6, an effective focal length of the first lens is f1=17.71 mm, an effective focal length of the second lens is f2=12.01 mm, an effective focal length of the third lens is f3=4.20 mm, an effective focal length of the fourth lens is f4=−2.94 mm, an effective focal length of the fifth lens is f5=1.50 mm, an effective focal length of the sixth lens is f6=−1.44, and an effective focal length of the seventh lens is f7=1.84. An effective focal length of the optical imaging system is f=1.87 mm, TTL=4.23 mm, HFOV=51.3°, and ImgH=2.36 mm, where TTL is a distance from a center of the object-side surface S1 of the first lens E1 to the imaging surface S17 on the optical axis, and ImgH is a half of a diagonal length of an effective pixel region on the imaging surface S17, specifically referring to Table 21.

The optical imaging system meets:

f5/f6=−1.04, f4/f=−1.57, f123/f7=1.41, |R2−R6|/R2+R6|=0.20, R11/R12=0.51, R13/R10=−0.65, CTmax/(3×CTmin)=1.61, CT5/(CT6+CT4)=2.08, |SAG52/CT5|=0.52, ImgH/|SAG72×10|=0.93, and DT21/DT71=0.39, specifically referring to Table 22.

Figure 12A:
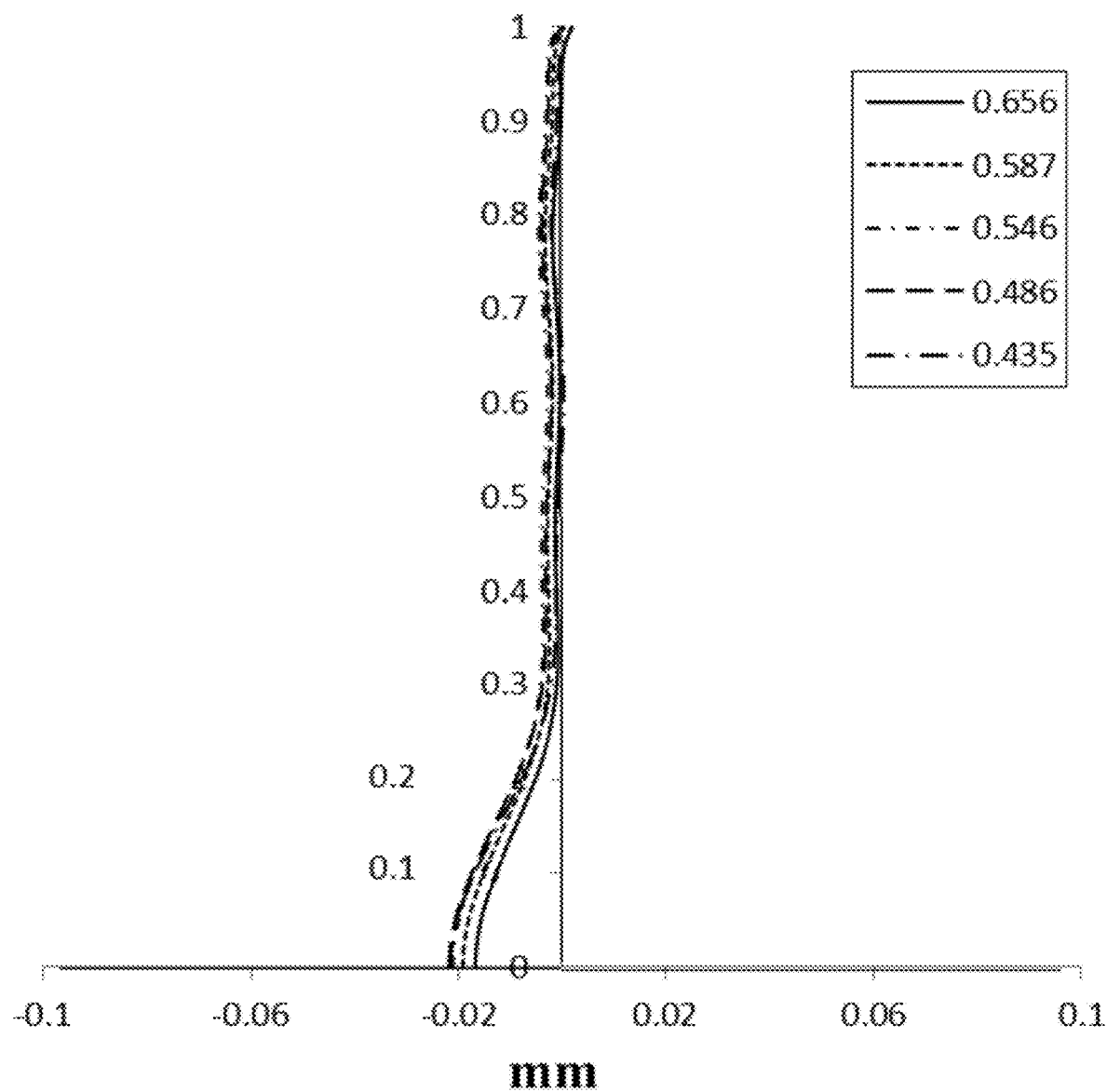
FIG. 12A to FIG. 12D show a longitudinal aberration curve, an astigmatic curve, a distortion curve and a lateral color curve of an optical imaging system of embodiment 6 respectively.
Figure 12B:
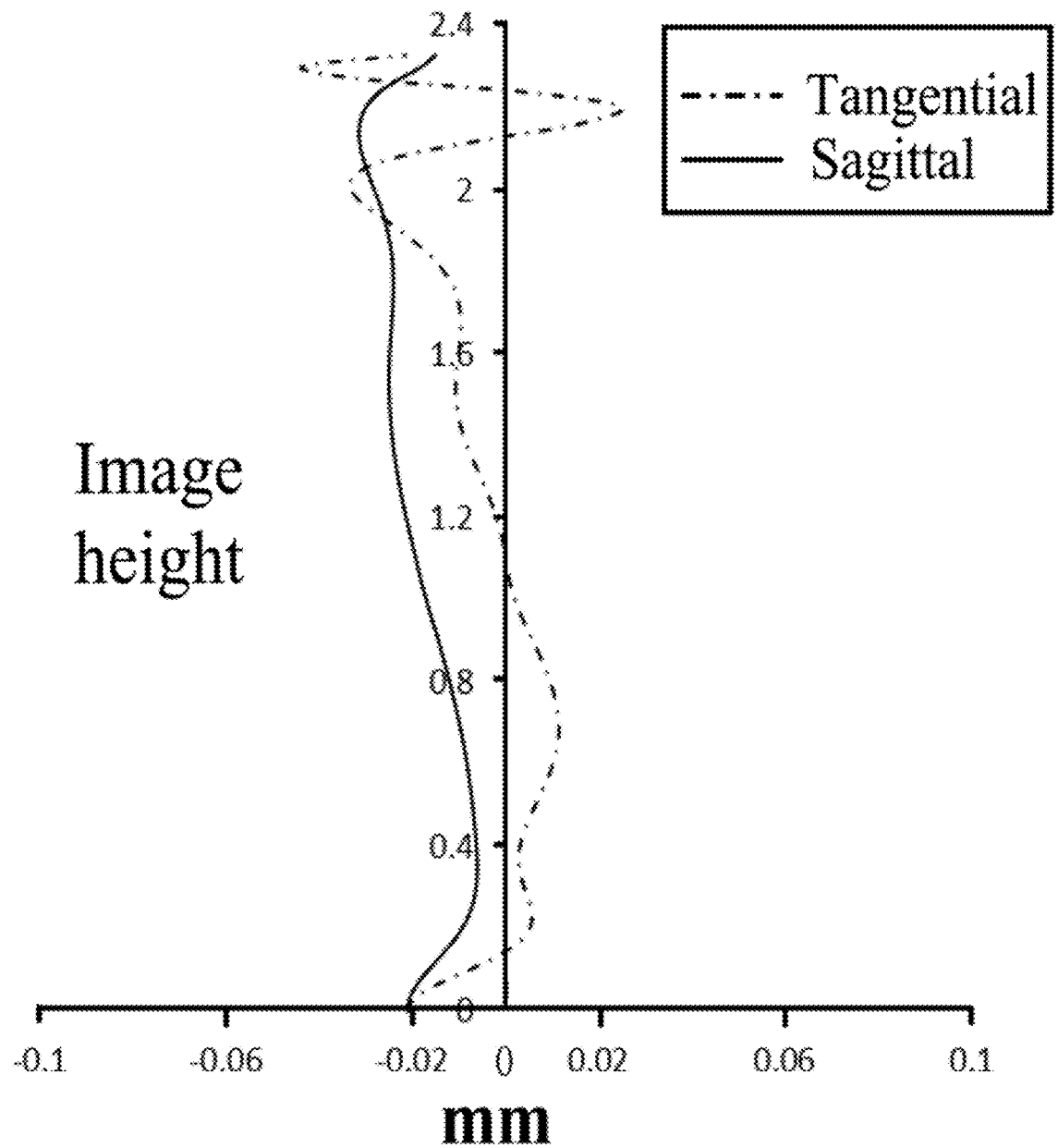
Figure 12C:
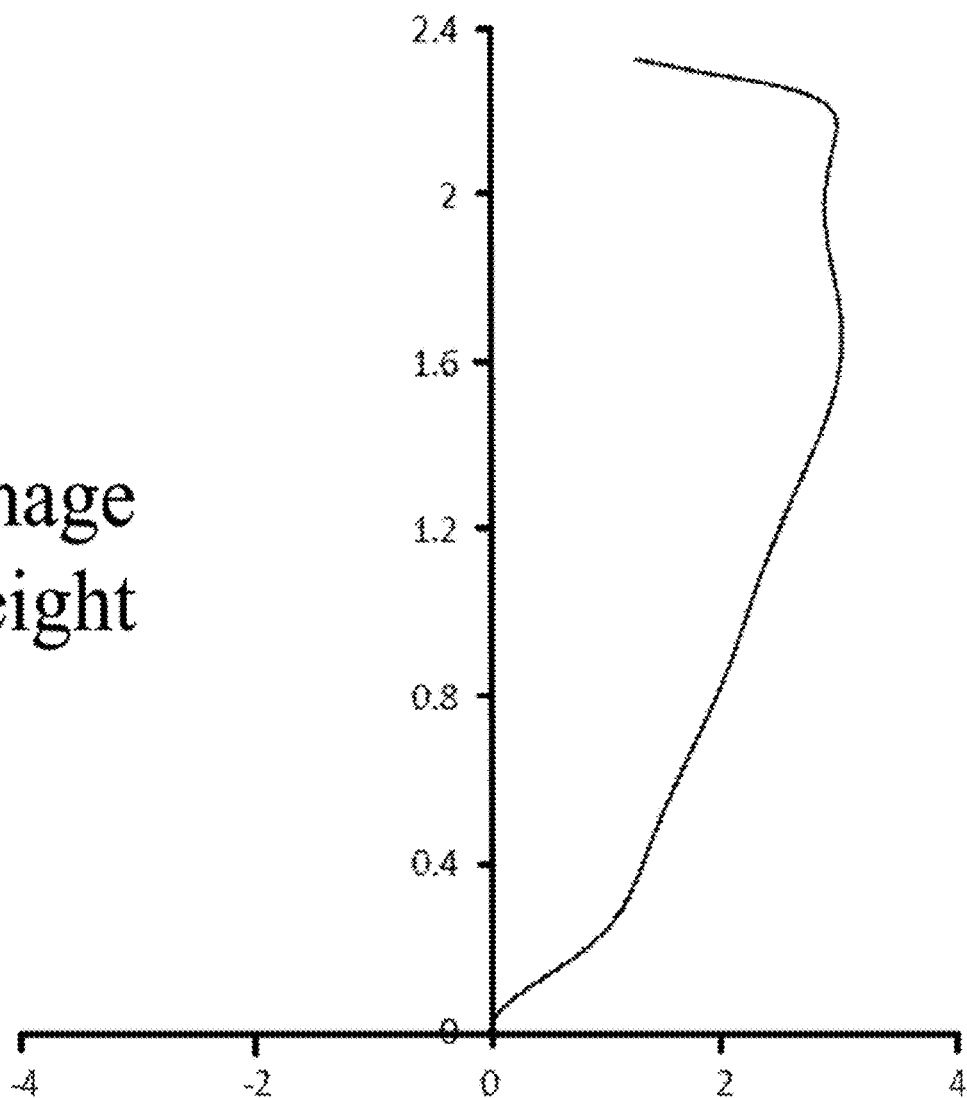
Figure 12D:
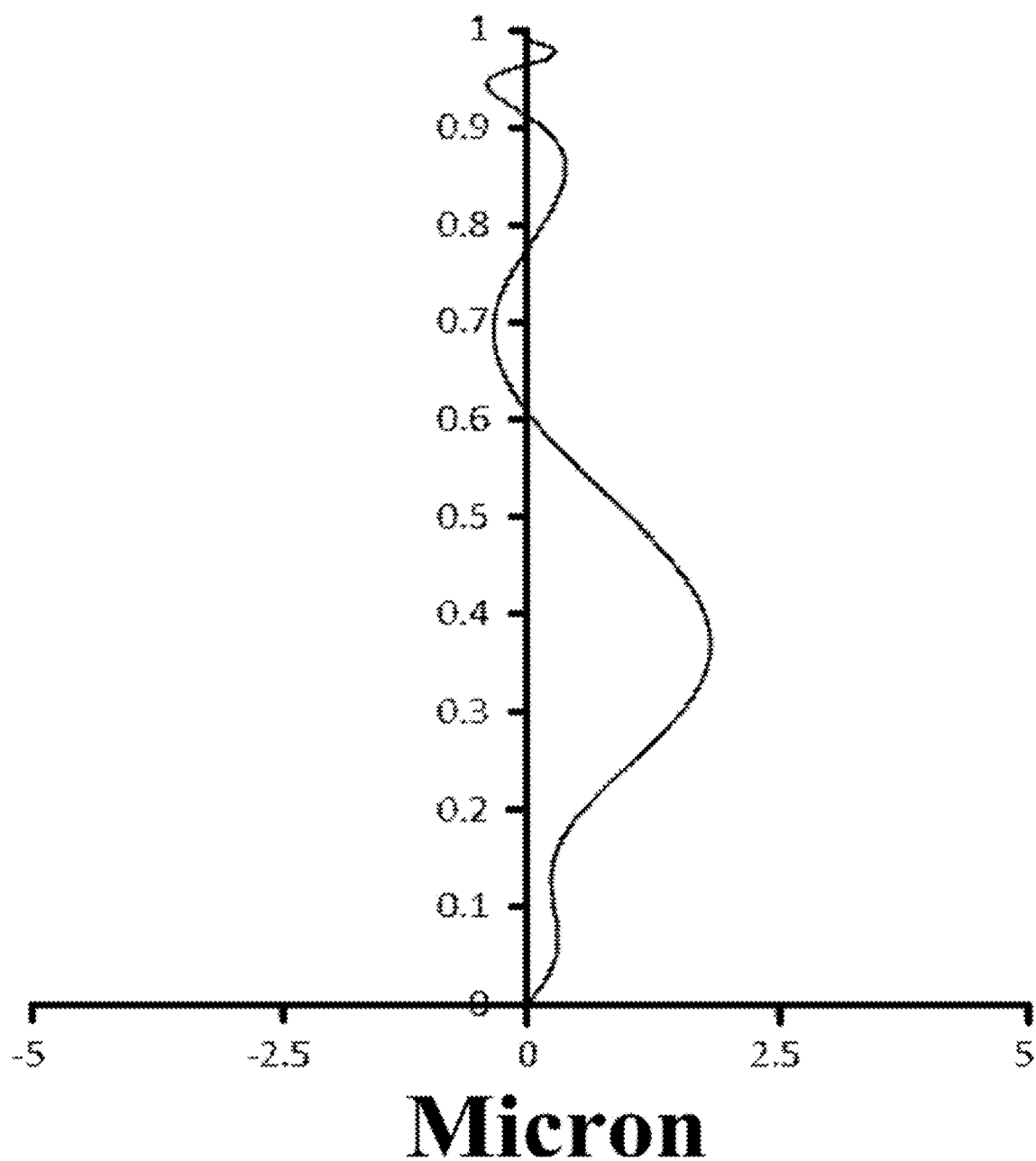

In addition, FIG. 12A shows a longitudinal aberration curve of the optical imaging system of embodiment 6, which indicates deviation of a convergence focal point after light with different wavelengths passes through the system. FIG. 12B shows an astigmatic curve of the optical imaging system of embodiment 6, which indicates a tangential image plane curvature and a sagittal image plane curvature. FIG. 12C shows a distortion curve of the optical imaging system of embodiment 6, which indicates a distortion value under different viewing angles. FIG. 12D shows a lateral color curve of the optical imaging system of embodiment 6, which indicates deviation of different image heights on the imaging surface after the light passes through the system. According to FIG. 12A to FIG. 12D, it can be seen that the optical imaging system provided in embodiment 6 can achieve high imaging quality.

Embodiment 7

Figure 13:
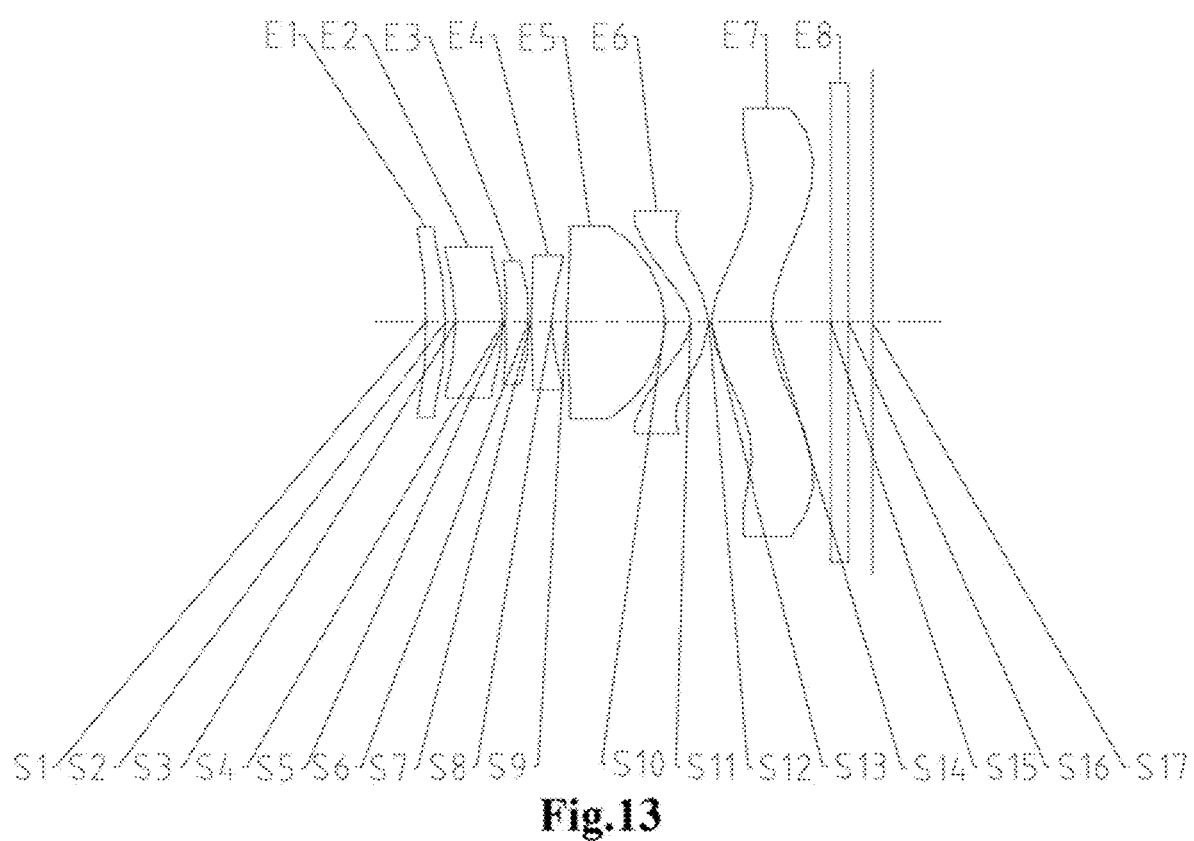
FIG. 13 is a structure diagram of an optical imaging system of embodiment 7 of the disclosure.

As shown in FIG. 13, the optical imaging system includes sequentially in a direction from an object side to an image side along an optical axis: a first lens E1, a second lens E2, a third lens E3, a fourth lens E4, a fifth lens E5, a sixth lens E6, a seventh lens E7, an optical filter E8 and an imaging surface S17.

The first lens has a positive refractive power, an object-side surface of the first lens is a concave surface as well as an aspherical surface, and an image-side surface is a convex surface as well as an aspherical surface. The second lens has a positive refractive power, an object-side surface of the second lens is a concave surface as well as an aspherical surface, and an image-side surface is a convex surface as well as an aspherical surface. The third lens has a positive refractive power, an object-side surface of the third lens is a convex surface as well as an aspherical surface, and an image-side surface is a convex surface as well as an aspherical surface. The fourth lens has a negative refractive power, an object-side surface of the fourth lens is a convex surface as well as an aspherical surface, and an image-side surface is a concave surface as well as an aspherical surface. The fifth lens has a positive refractive power, an object-side surface of the fifth lens is a convex surface as well as an aspherical surface, and an image-side surface is a convex surface as well as an aspherical surface. The sixth lens has a negative refractive power, an object-side surface of the sixth lens is a concave surface as well as an aspherical surface, and an image-side surface is a convex surface as well as an aspherical surface. The seventh lens has a positive refractive power, an object-side surface of the seventh lens is a convex surface as well as an aspherical surface, and an image-side surface is a concave surface as well as an aspherical surface.

The optical imaging system further includes the optical filter including an object-side surface S15 and an image-side surface S16. Light from an object sequentially penetrates through each of the surfaces S1 to S16 and is finally imaged on the imaging surface S17.

Table 13 shows a surface type, radius of curvature, thickness, material and cone coefficient of each lens of the optical imaging system of embodiment 7. Units of the radius of curvature and the thickness are mm.

TABLE 13

| Surface number | Surface types | Radius of curvature (mm) | Thickness (mm) | Materials Refractive index | Abbe number | Conic coefficient |
|---|---|---|---|---|---|---|
| OBJ | Spherical | Infinity | Infinity | — | — | — |
| S1 | Aspheric | −6.7606 | 0.1891 | 1.55 | 64.1 | 42.2327 |
| S2 | Aspheric | −3.6881 | 0.1045 | — | — | 3.0562 |
| S3 | Aspheric | −1.9661 | 0.4737 | 1.55 | 64.1 | −4.9332 |
| S4 | Aspheric | −1.5810 | 0.0250 | — | — | −8.8335 |
| S5 | Aspheric | 8.1328 | 0.2260 | 1.65 | 23.5 | −17.4437 |
| S6(STO) | Aspheric | −6.3034 | 0.0250 | — | — | 97.1821 |
| S7 | Aspheric | 2.9341 | 0.2028 | 1.65 | 23.5 | −68.9052 |
| S8 | Aspheric | 1.2154 | 0.1503 | — | — | −8.2027 |
| S9 | Aspheric | 4.2075 | 0.9811 | 1.55 | 64.1 | −82.0221 |
| S10 | Aspheric | −1.0311 | 0.2517 | — | — | −0.4877 |
| S11 | Aspheric | −0.2755 | 0.1800 | 1.65 | 23.5 | −2.3472 |
| S12 | Aspheric | −0.5083 | 0.0250 | — | — | −3.9728 |
| S13 | Aspheric | 0.6160 | 0.5973 | 1.55 | 64.1 | −4.6565 |
| S14 | Aspheric | 1.3752 | 0.5865 | — | — | −1.1491 |
| S15 | Spherical | Infinity | 0.1800 | 1.52 | 64.2 | — |
| S16 | Spherical | Infinity | 0.2319 | — | — | — |
| S17 | Spherical | Infinity | — | — | — | — |

In the embodiment, a calculation formula for a surface type x of each aspherical lens is the same as that in embodiment 1.

Table 14 shows high-order coefficients $A_4$, $A_6$, $A_8$, $A_{10}$, $A_{12}$, $A_{14}$, $A_{16}$ and $A_{20}$ applied to the aspherical mirror surfaces S1, S3, S5, S7 and S8 in embodiment 7.

TABLE 14

| Surface number | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|
| S1 | 2.7963E−02 | −8.7594E−02 | 1.4731E−02 | 3.1752E−01 | −1.0899E+00 | 1.8782E+00 | −1.4884E+00 | 4.4831E−01 | 0.0000E+00 |
| S2 | −9.1095E−03 | −2.8728E−02 | 6.0395E−03 | 7.8347E−02 | 0.0000E+00 | 0.0000E+00 | 0.0000E+00 | 0.0000E+00 | 0.0000E+00 |
| S3 | 1.1954E−02 | 2.1740E−01 | −5.3505E−01 | 9.4577E−01 | −9.9796E−01 | 5.2301E−01 | 0.0000E+00 | 0.0000E+00 | 0.0000E+00 |
| S4 | 1.3286E−01 | −4.1129E−01 | −1.3960E+00 | 1.7765E+01 | −8.2154E+01 | 2.0958E+02 | −2.8427E+02 | 1.6019E+02 | 0.0000E+00 |
| S5 | −1.1944E−01 | 1.6687E−01 | −8.2930E+00 | 3.7628E+01 | −7.5970E+01 | 1.5839E+01 | 2.1351E+02 | −2.6969E+02 | 0.0000E+00 |
| S6 | −3.5919E−01 | 2.5438E+00 | −2.5101E+01 | 1.2211E+02 | −3.3054E+02 | 5.1475E+02 | −4.4390E+02 | 2.0376E+00 | 0.0000E+02 |
| S7 | −1.2680E−01 | 1.3587E+00 | −1.7658E+01 | 8.9492E+01 | −2.3279E+02 | 3.1997E+02 | −2.2005E+02 | 5.9647E+01 | 0.0000E+00 |
| S8 | 8.0453E−04 | 6.0850E−02 | −2.6253E+00 | 1.2155E+01 | −2.6301E+01 | 2.4959E+01 | −1.7039E+00 | −8.0063E+00 | 0.0000E+00 |
| S9 | 1.0954E−01 | −6.0227E−01 | 3.8966E+00 | −2.5768E+01 | 1.0142E+02 | −2.4074E+02 | 3.3477E+02 | −2.4622E+02 | 7.3246E+01 |
| S10 | −2.9290E−02 | 7.8499E−01 | −7.3503E+00 | 2.8908E+01 | −6.2389E+01 | 8.0265E+01 | −6.1826E+01 | 2.6262E+01 | −4.7030E+00 |
| S11 | 7.3201E−01 | −6.9123E+00 | 2.7481E+01 | −5.8506E+01 | 7.5764E+01 | −6.0451E+01 | 2.7493E+01 | −5.4847E+00 | 0.0000E+00 |
| S12 | 2.7185E−01 | −3.0159E+00 | 1.0648E+01 | −1.8551E+01 | 1.9208E+01 | −1.1994E+01 | 4.1541E+00 | −6.1107E−01 | 0.0000E+00 |

TABLE 14-continued

| Surface number | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|
| S13 | 7.0223E−02 | −1.7610E−01 | 8.1247E−02 | 2.3416E−02 | −4.7402E−02 | 2.5160E−02 | −6.7193E−03 | 9.1722E−04 | −5.0856E−05 |
| S14 | 1.2373E−01 | −4.6076E−01 | 5.0041E−01 | −3.2968E−01 | 1.4192E−01 | −4.0011E−02 | 7.0971E−03 | −7.1615E−04 | 3.1257E−05 |

In embodiment 7, an effective focal length of the first lens is f1=14.53 mm, an effective focal length of the second lens is f2=10.29 mm, an effective focal length of the third lens is f3=5.54 mm, an effective focal length of the fourth lens is f4=−3.37 mm, an effective focal length of the fifth lens is f5=1.62 mm, an effective focal length of the sixth lens is f6=−1.34 mm, and an effective focal length of the seventh lens is f7=1.60 mm. An effective focal length of the optical imaging system is f=1.90 mm, TTL=4.43 mm, HFOV=52.1°, and ImgH=2.48 mm, where TTL is a distance from a center of the object-side surface S1 of the first lens E1 to the imaging surface S17 on the optical axis, and ImgH is a half of a diagonal length of an effective pixel region on the imaging surface S17, specifically referring to Table 21.

The optical imaging system meets:
f5/f6=−1.21, f4/f=−1.78, f123/f7=1.80, |R2−R6|/R2+R6|=0.26, R11/R12=0.54, R13/R10=−0.60, CTmax/(3×CTmin)=1.82, CT5/(CT6+CT4)=2.56, |SAG52/CT5|=0.57, ImgH/|SAG72×10|=1.29, and DT21/DT71=0.41, specifically referring to Table 22.

Figure 14A:
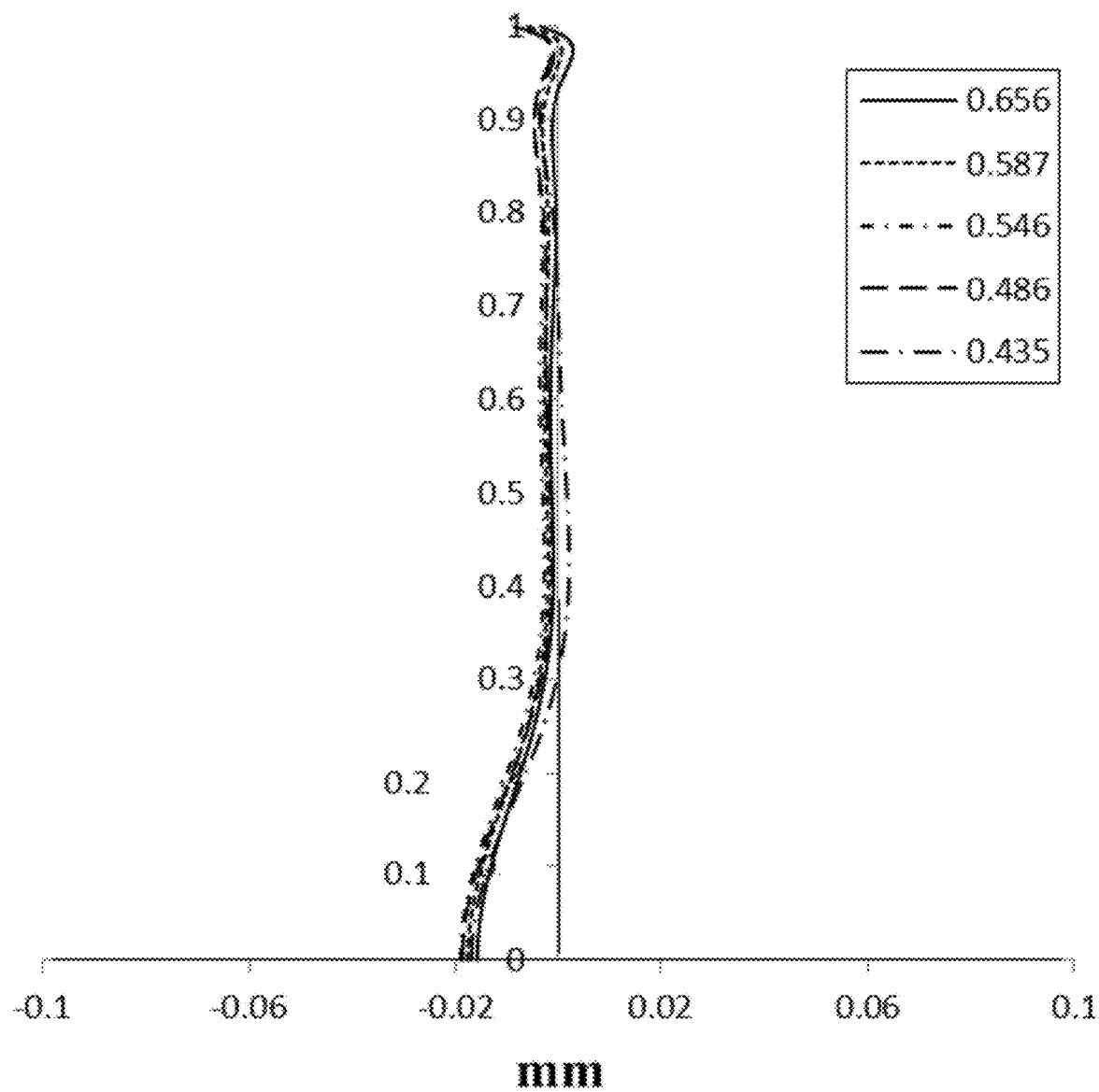
FIG. 14A to FIG. 14D show a longitudinal aberration curve, an astigmatic curve, a distortion curve and a lateral color curve of an optical imaging system of embodiment 7 respectively.
Figure 14B:
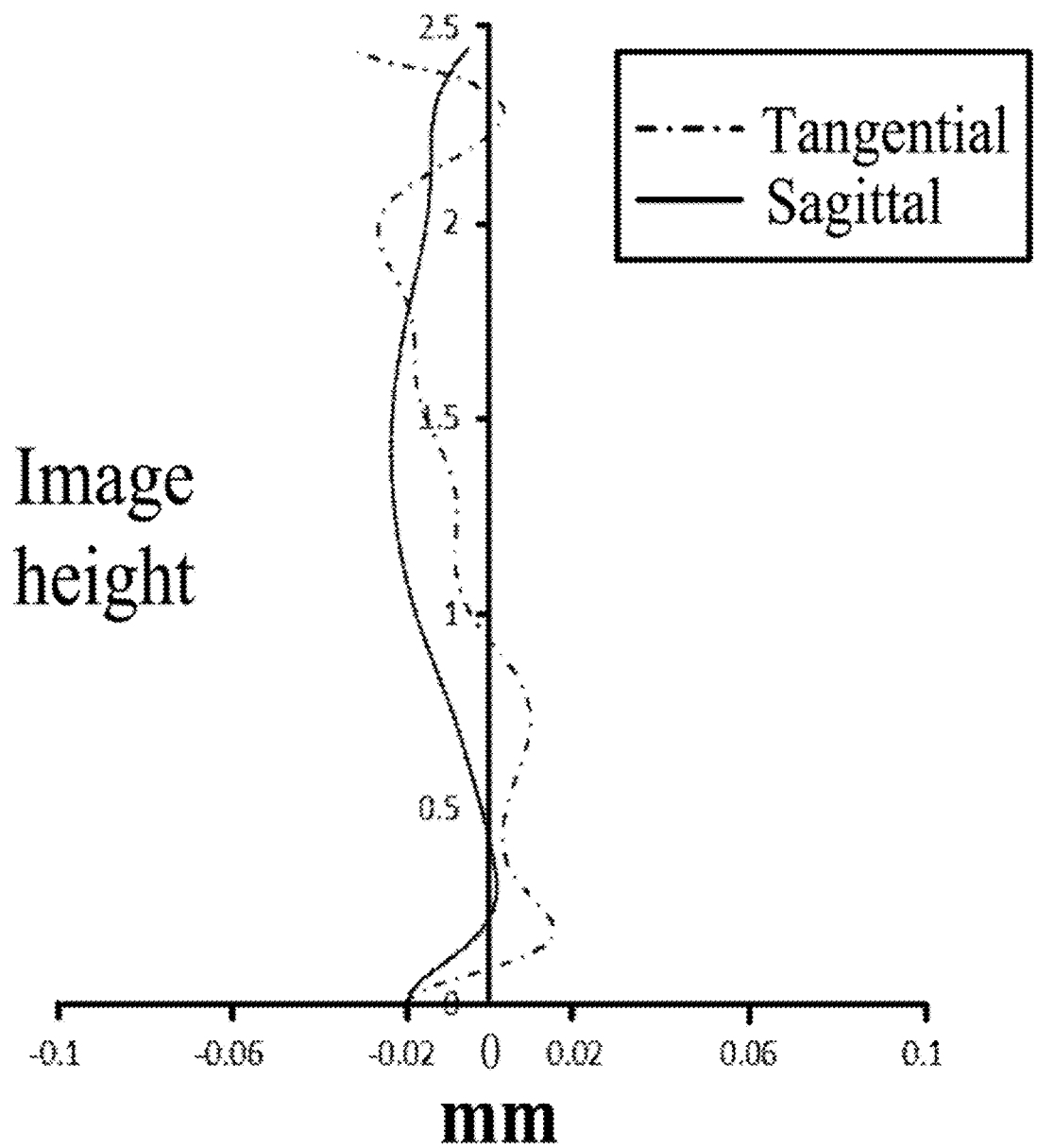
Figure 14C:
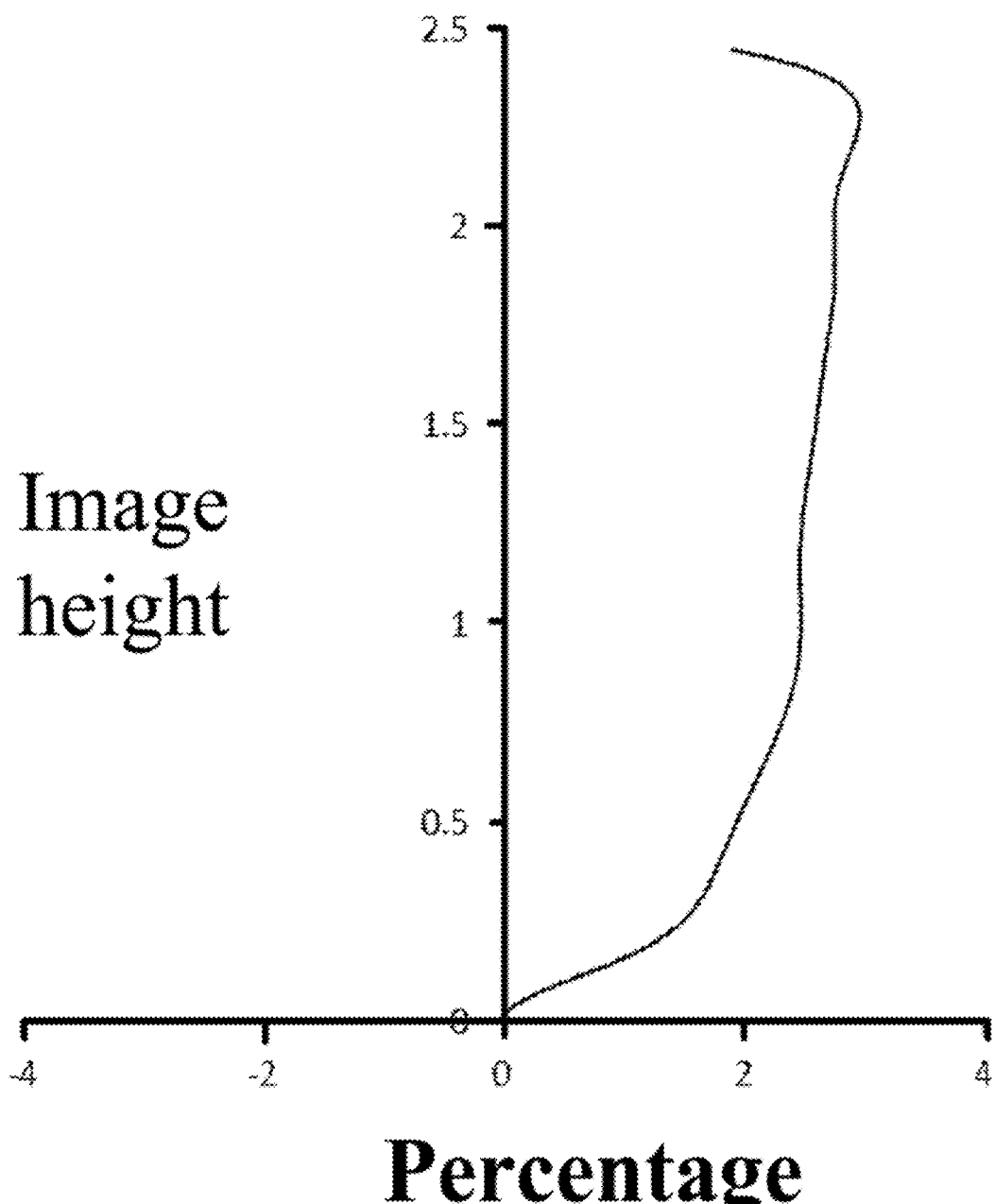
Figure 14D:
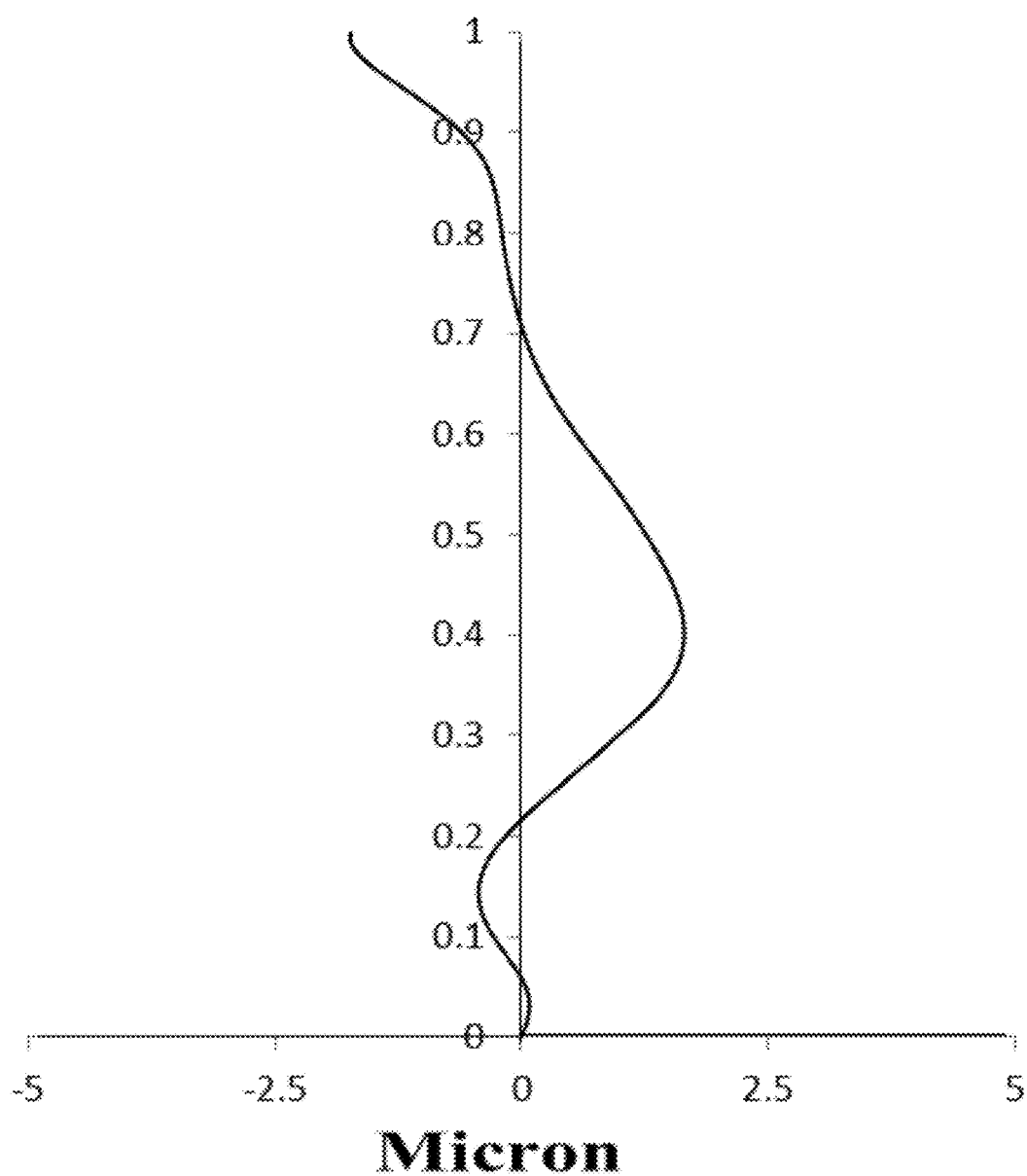

In addition, FIG. 14A shows a longitudinal aberration curve of the optical imaging system of embodiment 7, which indicates deviation of a convergence focal point after light with different wavelengths passes through the system. FIG. 14B shows an astigmatic curve of the optical imaging system of embodiment 7, which indicates a tangential image plane curvature and a sagittal image plane curvature. FIG. 14C shows a distortion curve of the optical imaging system of embodiment 7, which indicates a distortion value under different viewing angles. FIG. 14D shows a lateral color curve of the optical imaging system of embodiment 7, which indicates deviation of different image heights on the imaging surface after the light passes through the system. According to FIG. 14A to FIG. 14D, it can be seen that the optical imaging system provided in embodiment 7 can achieve high imaging quality.

Embodiment 8

Figure 15:
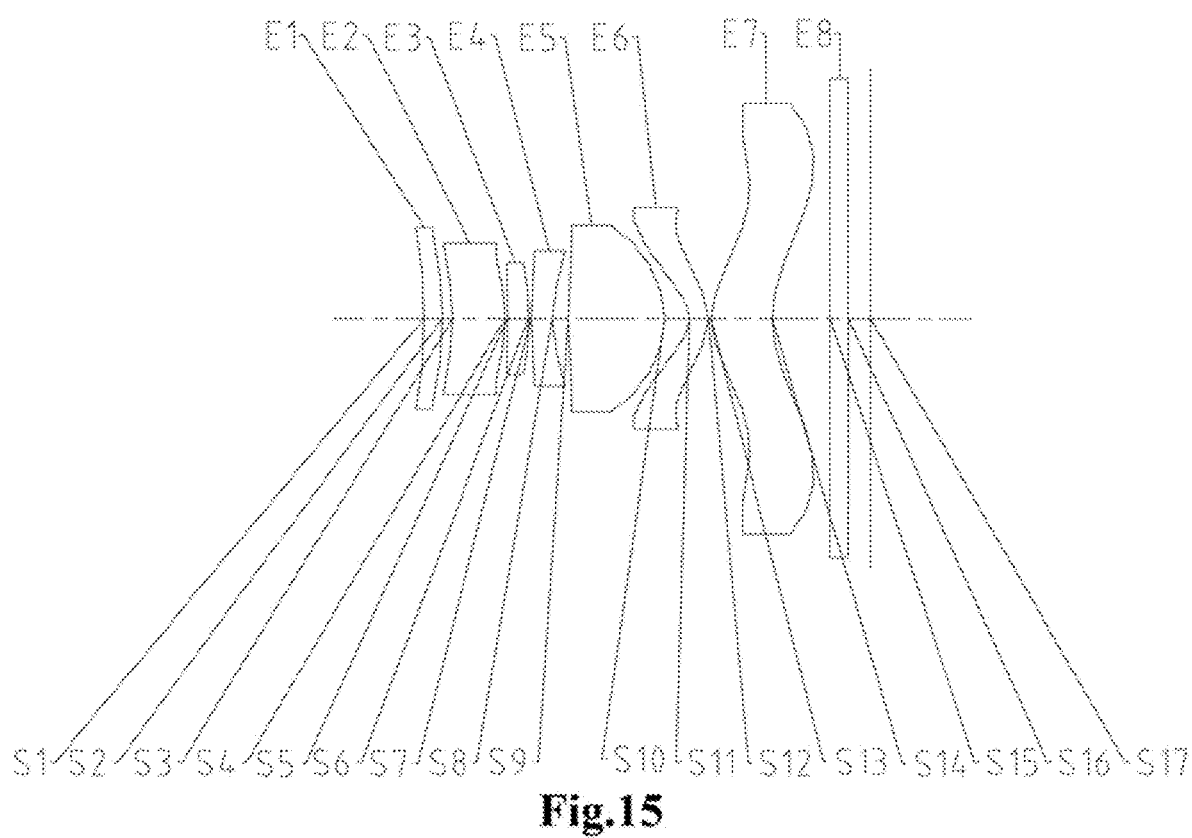
FIG. 15 is a structure diagram of an optical imaging system of embodiment 8 of the disclosure.

As shown in FIG. 15, the optical imaging system includes sequentially in a direction from an object side to an image side along an optical axis: a first lens E1, a second lens E2, a third lens E3, a fourth lens E4, a fifth lens E5, a sixth lens E6, a seventh lens E7, an optical filter E8 and an imaging surface S17.

The first lens has a positive refractive power, an object-side surface of the first lens is a concave surface as well as an aspherical surface, and an image-side surface is a convex surface as well as an aspherical surface. The second lens has a positive refractive power, an object-side surface of the second lens is a concave surface as well as an aspherical surface, and an image-side surface is a convex surface as well as an aspherical surface. The third lens has a positive refractive power, an object-side surface of the third lens is a convex surface as well as an aspherical surface, and an image-side surface is a convex surface as well as an aspherical surface. The fourth lens has a negative refractive power, an object-side surface of the fourth lens is a convex surface as well as an aspherical surface, and an image-side surface is a concave surface as well as an aspherical surface. The fifth lens has a positive refractive power, an object-side surface of the fifth lens is a convex surface as well as an aspherical surface, and an image-side surface is a convex surface as well as an aspherical surface. The sixth lens has a negative refractive power, an object-side surface of the sixth lens is a concave surface as well as an aspherical surface, and an image-side surface is a convex surface as well as an aspherical surface. The seventh lens has a positive refractive power, an object-side surface of the seventh lens is a convex surface as well as an aspherical surface, and an image-side surface is a concave surface as well as an aspherical surface.

The optical imaging system further includes the optical filter including an object-side surface S15 and an image-side surface S16. Light from an object sequentially penetrates through each of the surfaces S1 to S16 and is finally imaged on the imaging surface S17.

Table 15 shows a surface type, radius of curvature, thickness, material and cone coefficient of each lens of the optical imaging system of embodiment 8. Units of the radius of curvature and the thickness are mm.

TABLE 15

| Surface number | Surface types | Radius of curvature (mm) | Thickness (mm) | Refractive index | Abbe number | Conic coefficient |
|---|---|---|---|---|---|---|
| OBJ | Spherical | Infinity | Infinity | — | — | — |
| S1 | Aspheric | −6.7419 | 0.1837 | 1.55 | 64.1 | 43.4515 |
| S2 | Aspheric | −3.8086 | 0.1007 | — | — | 2.9789 |
| S3 | Aspheric | −2.2689 | 0.5241 | 1.55 | 64.1 | −4.7414 |
| S4 | Aspheric | −1.7381 | 0.0250 | — | — | −8.2940 |
| S5 | Aspheric | 7.6109 | 0.2076 | 1.65 | 23.5 | −54.3647 |
| S6(STO) | Aspheric | −6.3849 | 0.0250 | — | — | 95.7223 |
| S7 | Aspheric | 2.7418 | 0.2070 | 1.65 | 23.5 | −78.0694 |
| S8 | Aspheric | 1.1935 | 0.1588 | — | — | −7.9436 |
| S9 | Aspheric | 4.5595 | 0.9594 | 1.55 | 64.1 | −99.0000 |
| S10 | Aspheric | −0.9872 | 0.2453 | — | — | −0.6174 |

TABLE 15-continued

| Surface number | Surface types | Radius of curvature (mm) | Thickness (mm) | Refractive index | Abbe number | Conic coefficient |
|---|---|---|---|---|---|---|
| S11 | Aspheric | −0.2789 | 0.1873 | 1.65 | 23.5 | −2.3164 |
| S12 | Aspheric | −0.5254 | 0.0250 | — | — | −3.6748 |
| S13 | Aspheric | 0.6172 | 0.6098 | 1.55 | 64.1 | −4.9218 |
| S14 | Aspheric | 1.3300 | 0.5730 | — | — | −1.2472 |
| S15 | Spherical | Infinity | 0.1800 | 1.52 | 64.2 | — |
| S16 | Spherical | Infinity | 0.2184 | — | — | — |
| S17 | Spherical | Infinity | — | — | — | — |

In the embodiment, a calculation formula for a surface type x of each aspherical lens is the same as that in embodiment 1.

Table 16 shows high-order coefficients $A_4$, $A_6$, $A_8$, $A_{10}$, $A_{12}$, $A_{14}$, $A_{16}$ and $A_{20}$ applied to the aspherical mirror surfaces S1, S3, S5, S7 and S8 in embodiment 8.

TABLE 16

| Surface number | $A_4$ | $A_6$ | $A_8$ | $A_{10}$ | $A_{12}$ | $A_{14}$ | $A_{16}$ | $A_{18}$ | $A_{20}$ |
|---|---|---|---|---|---|---|---|---|---|
| S1 | 2.5044E−02 | −5.5482E−02 | −2.0659E−01 | 1.0939E+00 | −2.6293E+00 | 3.7173E+00 | −2.7080E+00 | 7.9217E−01 | 0.0000E+00 |
| S2 | −7.5459E−03 | −3.3676E−02 | 1.0247E−02 | 8.8857E−02 | 0.0000E+00 | 0.0000E+00 | 0.0000E+00 | 0.0000E+00 | 0.0000E+00 |
| S3 | 1.5757E−02 | 2.2124E−01 | −5.5167E−01 | 9.7492E−01 | −9.9796E−01 | 5.2301E−01 | 0.0000E+00 | 0.0000E+00 | 0.0000E+00 |
| S4 | 1.2237E−01 | 3.0825E−01 | −1.1251E+01 | 7.9733E+01 | −3.0227E+02 | 6.5935E+02 | −7.7026E+02 | 3.7133E+02 | 0.0000E+00 |
| S5 | −1.4263E−01 | 1.9669E+00 | −3.7673E+01 | 2.6885E+02 | −1.1384E+03 | 2.8227E+03 | −3.6167E+03 | 1.7302E+03 | 0.0000E+00 |
| S6 | −2.9069E−03 | −4.5499E−01 | −1.0533E+01 | 5.7924E+01 | −7.2042E+01 | −2.4443E+02 | 8.4406E+02 | −6.9909E+02 | 0.0000E+00 |
| S7 | 3.2454E−01 | −2.3553E+00 | −7.4431E−01 | 4.3259E+01 | −1.6150E+02 | 2.7076E+02 | −2.1719E+02 | 6.7467E+01 | 0.0000E+00 |
| S8 | 3.5735E−02 | −9.2513E−02 | −2.9063E+00 | 1.7355E+01 | −4.7068E+01 | 6.8201E+01 | −4.9619E+01 | 1.3785E+01 | 0.0000E+00 |
| S9 | 8.0576E−02 | −1.6135E−01 | −1.1947E+00 | 6.0266E+00 | −1.5485E+01 | 1.8945E+01 | −7.3797E−01 | −1.6723E+01 | 9.3043E+00 |
| S10 | −3.5282E−02 | 6.8218E−01 | −7.2163E+00 | 3.0648E+01 | −7.0388E+01 | 9.5787E+01 | −7.7972E+01 | 3.5105E+01 | −6.6936E+00 |
| S11 | 6.2447E−01 | −6.4073E+00 | 2.6720E+01 | −5.8194E+01 | 7.6098E+01 | −6.0890E+01 | 2.7693E+01 | −5.5279E+00 | 0.0000E+00 |
| S12 | 2.6761E−01 | −2.8337E+00 | 1.0128E+01 | −1.7708E+01 | 1.8359E+01 | −1.1503E+01 | 4.0095E+00 | −5.9480E−01 | 0.0000E+00 |
| S13 | 8.5519E−02 | −2.4470E−01 | 1.7355E−01 | −3.9310E−02 | −2.3788E−02 | 2.0997E−02 | −6.7919E−03 | 1.0550E−03 | −6.5294E−05 |
| S14 | 1.0032E−01 | −4.4255E−01 | 4.9710E−01 | −3.3147E−01 | 1.4309E−01 | −4.0283E−02 | 7.1243E−03 | −7.1665E−04 | 3.1192E−05 |

In embodiment 8, an effective focal length of the first lens is f1=15.67 mm, an effective focal length of the second lens is f2=10.08 mm, an effective focal length of the third lens is f3=5.41 mm, an effective focal length of the fourth lens is f4=−3.45 mm, an effective focal length of the fifth lens is f5=1.58 mm, an effective focal length of the sixth lens is f6=−1.31 mm, and an effective focal length of the seventh lens is f7=1.62 mm. An effective focal length of the optical imaging system is f=1.9. mm, TTL=4.43 mm, HFOV=52.1°, and ImgH=2.48 mm, where TTL is a distance from a center of the object-side surface S1 of the first lens E1 to the imaging surface S17 on the optical axis, and ImgH is a half of a diagonal length of an effective pixel region on the imaging surface S17, specifically referring to Table 21.

The optical imaging system meets:

f5/f6=−1.21, f4/f=−1.82, f123/f7=1.76, |R2−R6|/R2+R6|=0.25, R11/R12=0.53, R13/R10=−0.63, CTmax/(3×CT-min)=1.74, CT5/(CT6+CT4)=2.43, |SAG52/CT5|=0.56, ImgH/|SAG72×10|=1.41, and DT21/DT71=0.41, specifically referring to Table 22.

Figure 16A:
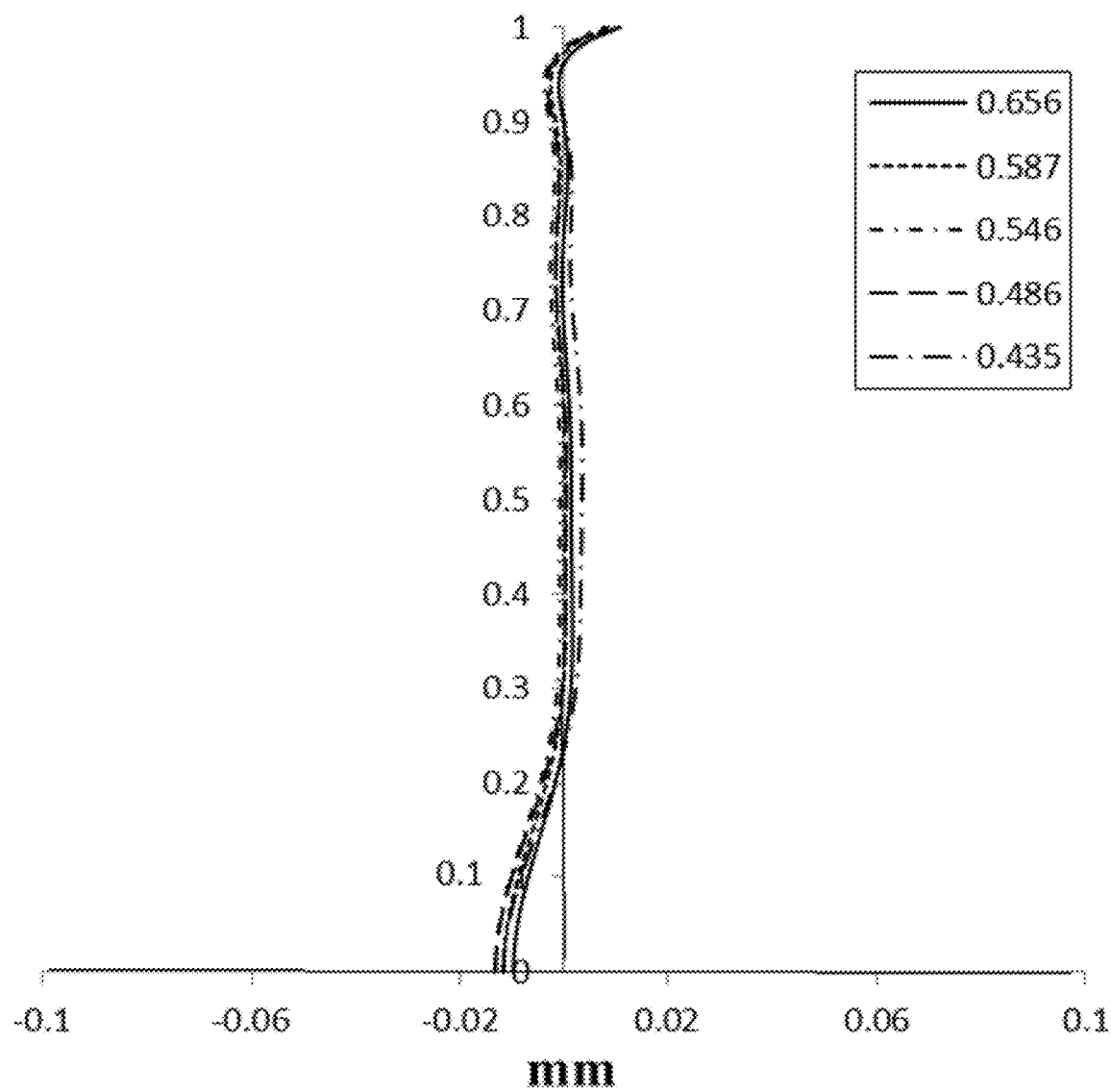
FIG. 16A to FIG. 16D show a longitudinal aberration curve, an astigmatic curve, a distortion curve and a lateral color curve of an optical imaging system of embodiment 8 respectively.
Figure 16B:
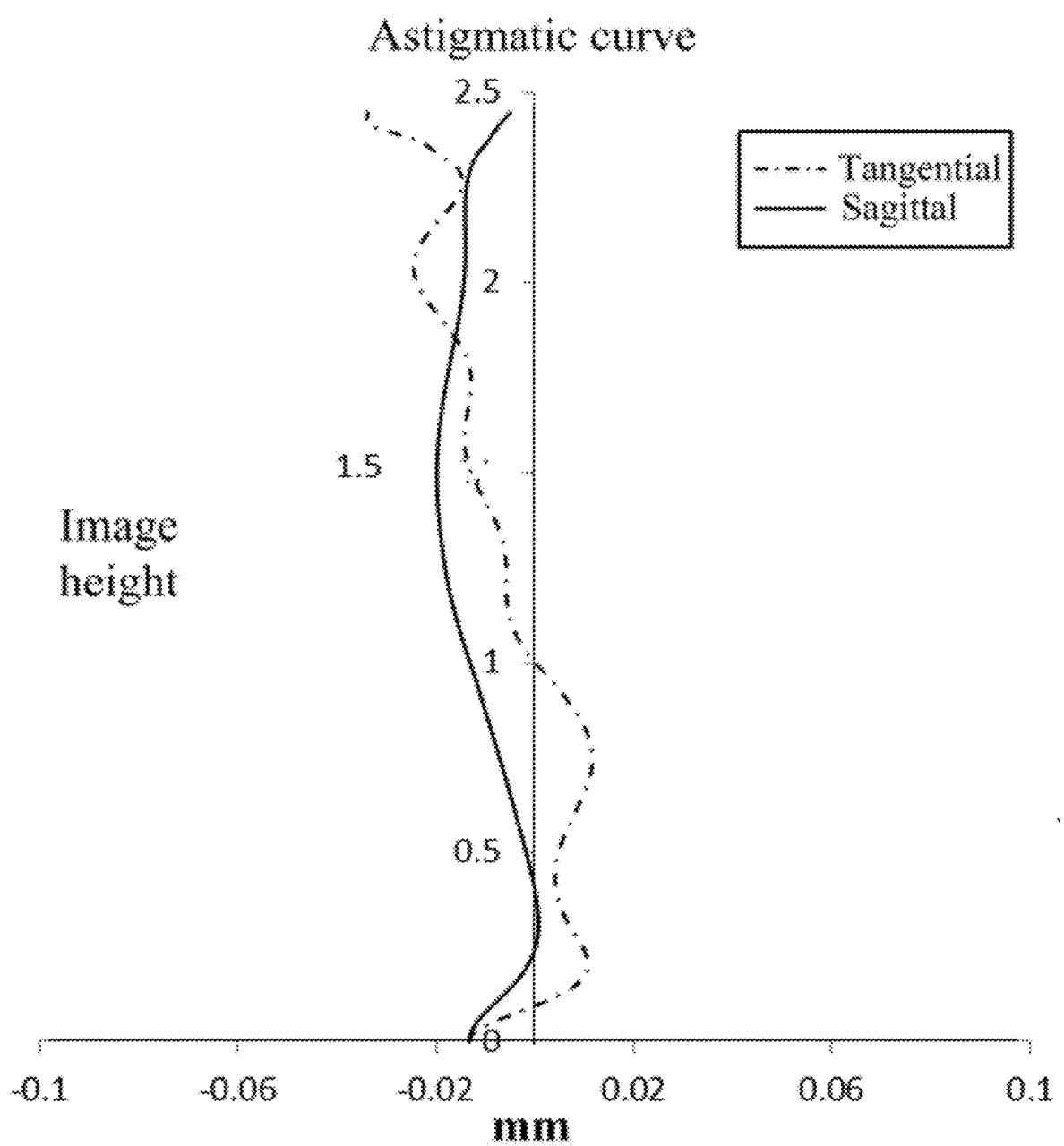
Figure 16C:
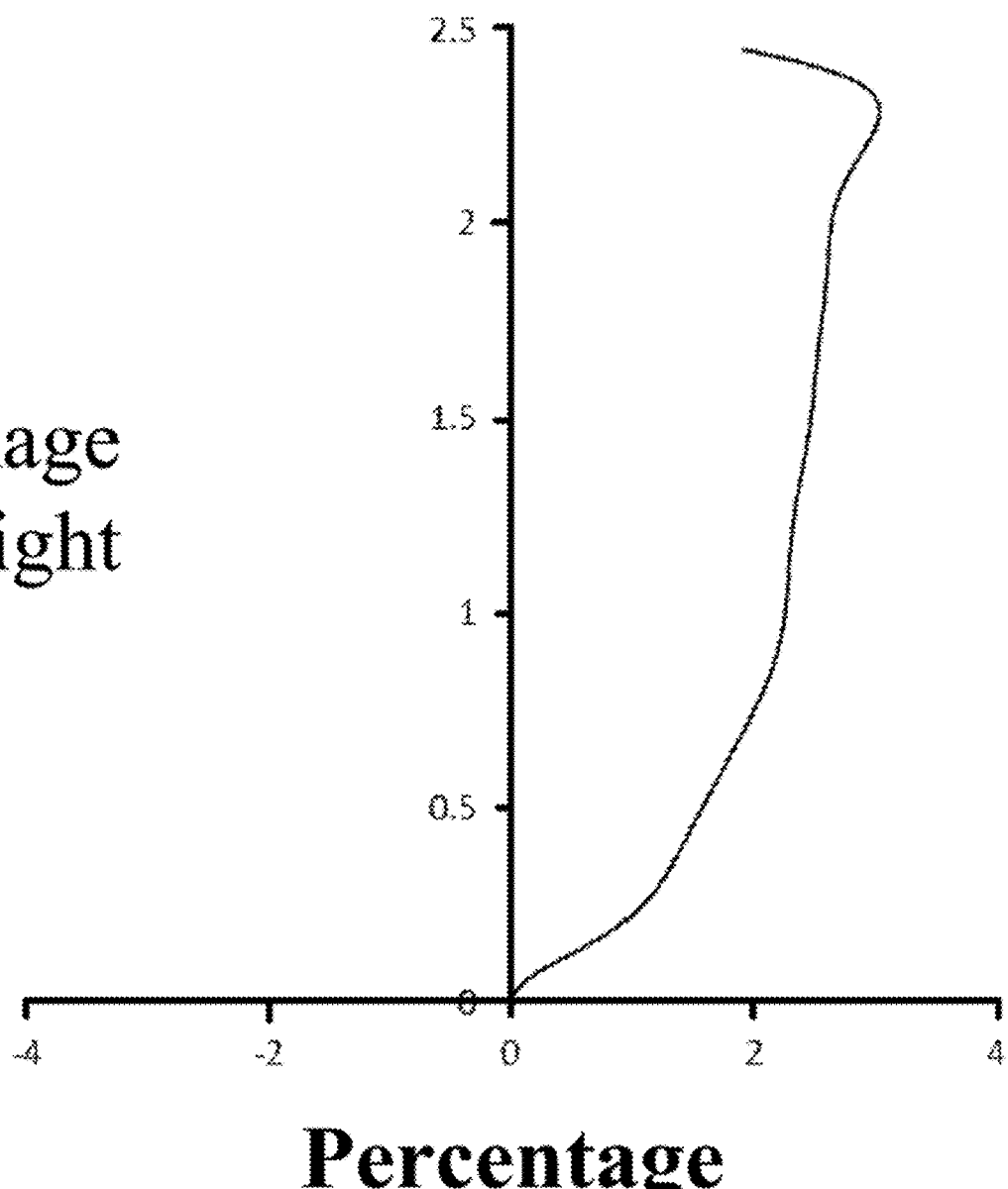
Figure 16D:
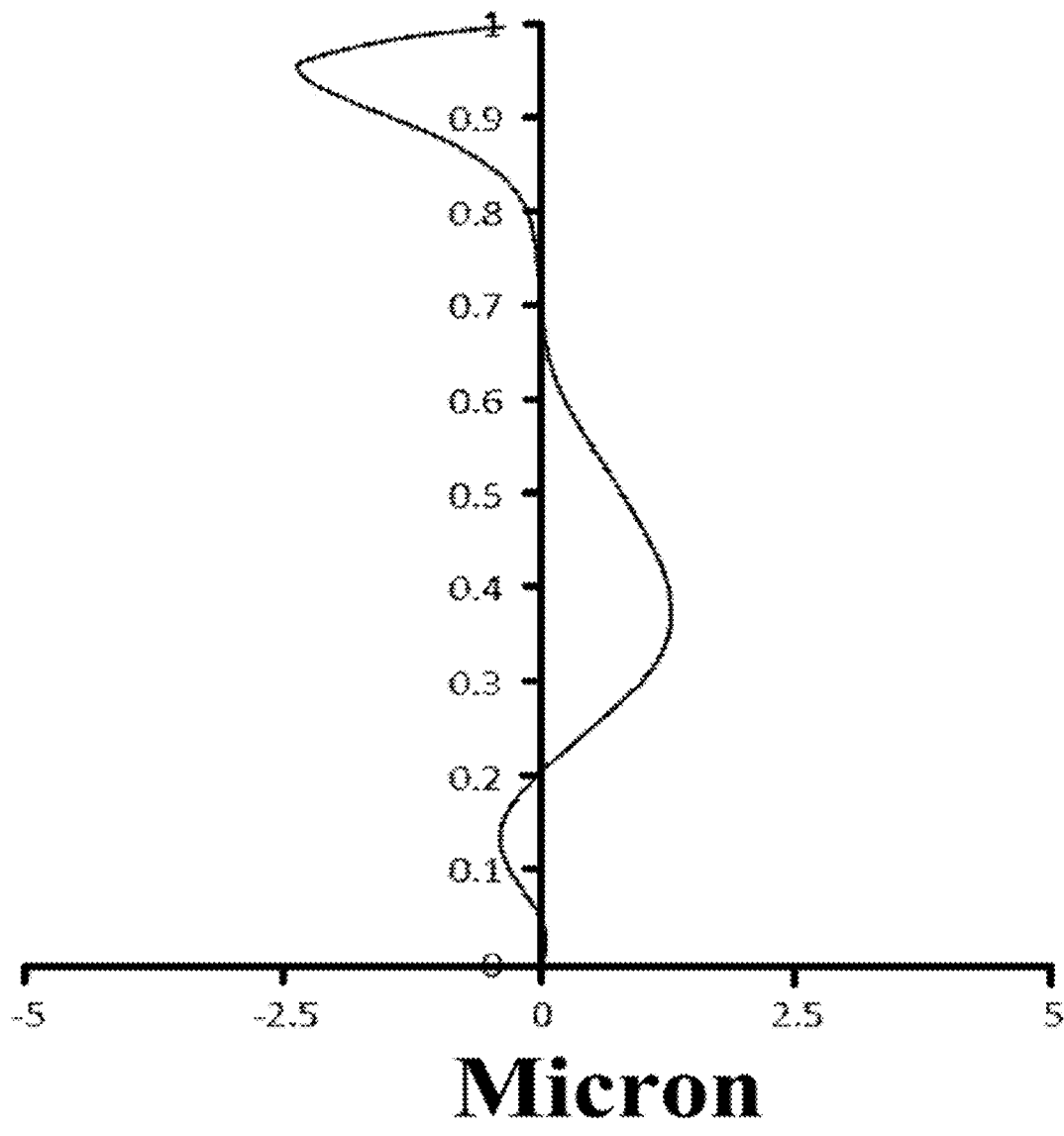

In addition, FIG. 16A shows a longitudinal aberration curve of the optical imaging system of embodiment 8, which indicates deviation of a convergence focal point after light with different wavelengths passes through the system. FIG. 16B shows an astigmatic curve of the optical imaging system of embodiment 8, which indicates a tangential image plane curvature and a sagittal image plane curvature. FIG. 16C shows a distortion curve of the optical imaging system of embodiment 8, which indicates a distortion value under different viewing angles. FIG. 16D shows a lateral color curve of the optical imaging system of embodiment 8, which indicates deviation of different image heights on the imaging surface after the light passes through the system. According to FIG. 16A to FIG. 16D, it can be seen that the optical imaging system provided in embodiment 8 can achieve high imaging quality.

Embodiment 9

Figure 17:
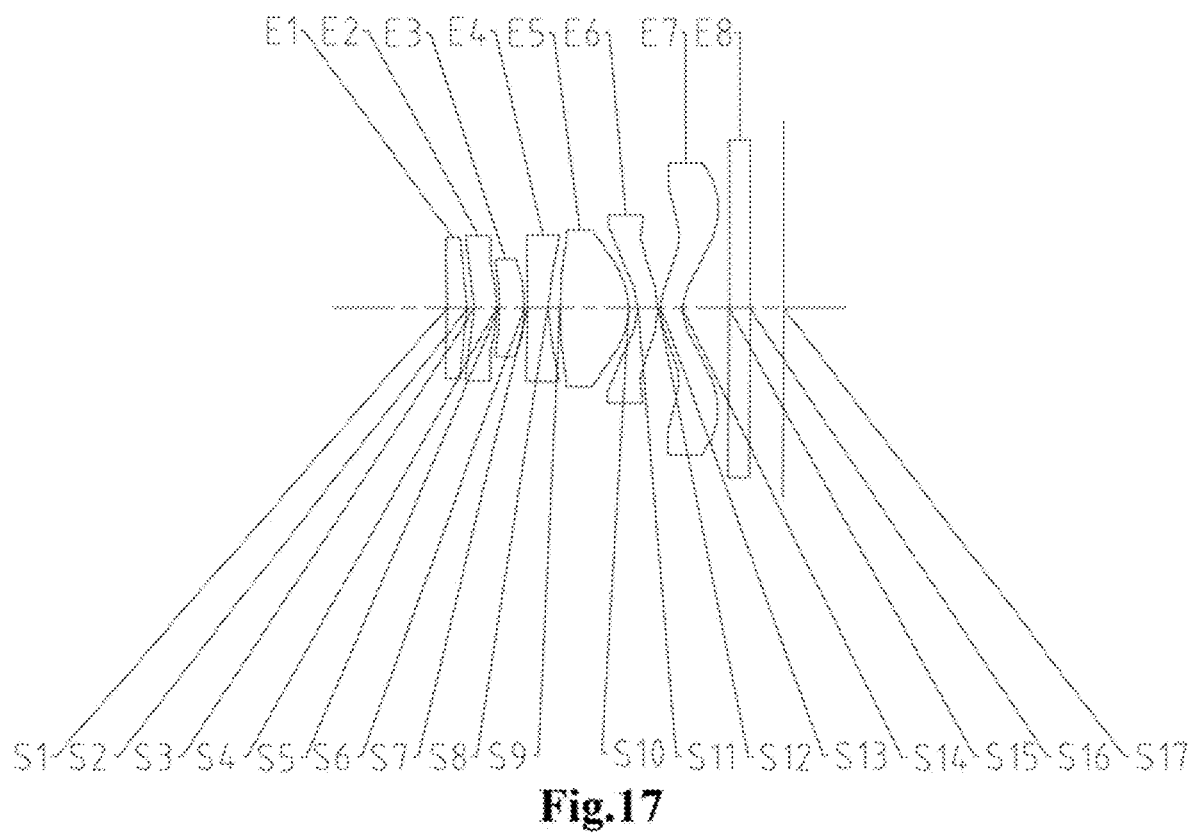
FIG. 17 is a structure diagram of an optical imaging system of embodiment 9 of the disclosure.

As shown in FIG. 17, the optical imaging system includes sequentially in a direction from an object side to an image side along an optical axis: a first lens E1, a second lens E2, a third lens E3, a fourth lens E4, a fifth lens E5, a sixth lens E6, a seventh lens E7, an optical filter E8 and an imaging surface S17.

The first lens has a positive refractive power, an object-side surface of the first lens is a concave surface as well as an aspherical surface, and an image-side surface is a convex surface as well as a spherical surface. The second lens has a positive refractive power, an object-side surface of the second lens is a concave surface as well as a spherical surface, and an image-side surface is a convex surface as well as an aspherical surface. The third lens has a positive refractive power, an object-side surface of the third lens is a concave surface as well as an aspherical surface, and an image-side surface is a convex surface as well as an aspherical surface. The fourth lens has a negative refractive power, an object-side surface of the fourth lens is a concave surface as well as an aspherical surface, and an image-side surface is a concave surface as well as an aspherical surface. The fifth lens has a positive refractive power, an object-side surface of the fifth lens is a convex surface as well as an aspherical surface, and an image-side surface is a convex surface as well as an aspherical surface. The sixth lens has a negative refractive power, an object-side surface of the sixth lens is a concave surface as well as an aspherical surface, and an image-side surface is a convex surface as well as an aspherical surface. The seventh lens has a negative refractive power, an object-side surface of the seventh lens is a convex surface as well as an aspherical surface, and an image-side surface is a concave surface as well as an aspherical surface.

The optical imaging system further includes the optical filter including an object-side surface S15 and an image-side surface S16. Light from an object sequentially penetrates through each of the surfaces S1 to S16 and is finally imaged on the imaging surface S17.

Table 17 shows a surface type, radius of curvature, thickness, material and cone coefficient of each lens of the optical imaging system of embodiment 9. Units of the radius of curvature and the thickness are mm.

TABLE 17

| Surface number | Surface types | Radius of curvature (mm) | Thickness (mm) | Refractive index | Abbe number | Conic coefficient |
|---|---|---|---|---|---|---|
| OBJ | Spherical | Infinity | Infinity | — | — | — |
| S1 | Aspheric | −19.8902 | 0.2053 | 1.55 | 64.1 | 92.6230 |
| S2 | Spherical | −3.2944 | 0.0713 | — | — | — |
| S3 | Spherical | −3.0171 | 0.2196 | 1.55 | 64.1 | — |
| S4(STO) | Aspheric | −1.5907 | 0.0250 | — | — | −3.6654 |
| S5 | Aspheric | −10.4330 | 0.2509 | 1.65 | 23.5 | 99.0000 |
| S6 | Aspheric | −1.8002 | 0.0308 | — | — | 8.4090 |
| S7 | Aspheric | −40.1573 | 0.2000 | 1.65 | 23.5 | −63.7701 |
| S8 | Aspheric | 1.2039 | 0.1200 | — | — | −9.3255 |
| S9 | Aspheric | 4.5865 | 0.6885 | 1.55 | 64.1 | 14.5170 |
| S10 | Aspheric | −0.6964 | 0.0891 | — | — | −1.5622 |
| S11 | Aspheric | −0.5142 | 0.2000 | 1.65 | 23.5 | −3.4661 |
| S12 | Aspheric | −0.7107 | 0.0250 | — | — | −4.1590 |
| S13 | Aspheric | 0.5028 | 0.2113 | 1.55 | 64.1 | −3.1625 |
| S14 | Aspheric | 0.3583 | 0.4639 | — | — | −2.4298 |
| S15 | Spherical | Infinity | 0.2100 | 1.52 | 64.2 | — |
| S16 | Spherical | Infinity | 0.3393 | — | — | — |
| S17 | Spherical | Infinity | — | — | — | — |

In the embodiment, a calculation formula for a surface type x of each aspherical lens is the same as that in embodiment 1.

Table 18 shows high-order coefficients $A_4$, $A_6$, $A_8$, $A_{10}$, $A_{12}$, $A_{14}$, $A_{16}$ and $A_{20}$ applied to the aspherical mirror surfaces S1, S3, S5, S7 and S8 in embodiment 9.

TABLE 18

| Surface number | $A_4$ | $A_6$ | $A_8$ | $A_{10}$ | $A_{12}$ | $A_{14}$ | $A_{15}$ | $A_{18}$ | $A_{20}$ |
|---|---|---|---|---|---|---|---|---|---|
| S1 | −5.8694E−02 | 1.1773E+00 | −1.4764E+01 | 1.1133E+02 | −5.1548E+02 | 1.3545E+03 | −1.7440E+03 | 7.0361E+02 | 0.0000E+00 |
| S4 | 1.9052E+00 | −4.4336E+01 | 5.6754E+02 | −5.3254E+03 | 3.5407E+04 | −1.5417E+05 | 3.8607E+05 | −4.1741E+05 | 0.0000E+00 |
| S5 | 1.5956E+00 | −4.8184E+01 | 6.2904E+02 | −6.6883E+03 | 5.1521E+04 | −2.5607E+05 | 7.1976E+05 | −8.6328E+05 | 0.0000E+00 |
| S6 | 1.9797E+00 | −4.6324E+01 | 4.5280E+02 | −2.6843E+03 | 1.0711E+04 | −2.8446E+04 | 4.5703E+04 | −3.3198E+04 | 0.0000E+00 |
| S7 | 1.5548E+00 | −4.2321E+01 | 4.0825E+02 | −2.1186E+03 | 6.6590E+03 | −1.2838E+04 | 1.4144E+04 | −6.9242E+03 | 0.0000E+00 |
| S8 | 3.7242E−01 | −7.4430E+00 | 5.4946E+01 | −2.2458E+02 | 5.4861E+02 | −7.9827E+02 | 6.3960E+02 | −2.2285E+02 | 0.0000+E00 |
| S9 | 1.8194E−01 | −8.3107E−01 | −6.2191E+00 | 7.1686E+01 | −3.5800E+02 | 1.0634E+03 | −1.8377E+03 | 1.6932E+03 | −6.4457E+02 |
| S10 | −7.0746E−01 | 7.4150E+00 | −3.9247E+01 | 1.4415E+02 | −4.2777E+02 | 9.6750E+02 | −1.4495E+03 | 1.2432E+03 | −4.5688+E02 |
| S11 | −6.4120E−01 | 5.7334E+00 | −1.3567E+01 | −1.8151E+01 | 1.6863E+02 | −3.6910E+02 | 3.6234E+02 | −1.3927E+02 | 0.0000E+00 |
| S12 | 1.4979E−03 | 1.3260E+00 | −2.6726E+00 | −3.1767E+00 | 2.4096E+01 | −4.0760E+01 | 2.9213E+01 | −7.7811E+00 | 0.0000E+00 |
| S13 | −6.6256E−01 | 1.0296E+00 | −3.7783E+00 | 9.9165E+00 | −1.6000E+01 | 1.6096E+01 | −9.7527E+00 | 3.2445E+00 | −4.5554E−01 |
| S14 | −4.7855E−01 | 2.7955E−01 | 6.8084E−02 | −2.3464E−01 | 8.1485E−02 | 9.0983E−02 | −9.7384E−02 | 3.6234E−02 | −4.9936E−03 |

In embodiment 9, an effective focal length of the first lens is f1=7.19 mm, an effective focal length of the second lens is f2=5.84 mm, an effective focal length of the third lens is f3=3.34 mm, an effective focal length of the fourth lens is f4=−1.81 mm, an effective focal length of the fifth lens is f5=1.16 mm, an effective focal length of the sixth lens is f6=−4.80 mm, and an effective focal length of the seventh lens is f7=−4.72 mm. An effective focal length of the optical imaging system is f=1.83 mm, TTL=3.35 mm, HFOV=44.6°, and ImgH=1.86 mm, where TTL is a distance from a center of the object-side surface S1 of the first lens E1 to the imaging surface S17 on the optical axis, and ImgH is a half of a diagonal length of an effective pixel region on the imaging surface S17, specifically referring to Table 21.

The optical imaging system meets:

f5/f6=−0.24, f4/f=−0.99, f123/f7=−0.36, |R2−R6|/R2+R6|=0.29, R11/R12=0.72, R13/R10=−0.72, CTmax/(3×CTmin)=1.15, CT5/(CT6+CT4)=1.72, |SAG52/CT5|=0.52, ImgH/|SAG72×10|=0.93, and DT21/DT71=0.60, specifically referring to Table 22.

Figure 18A:
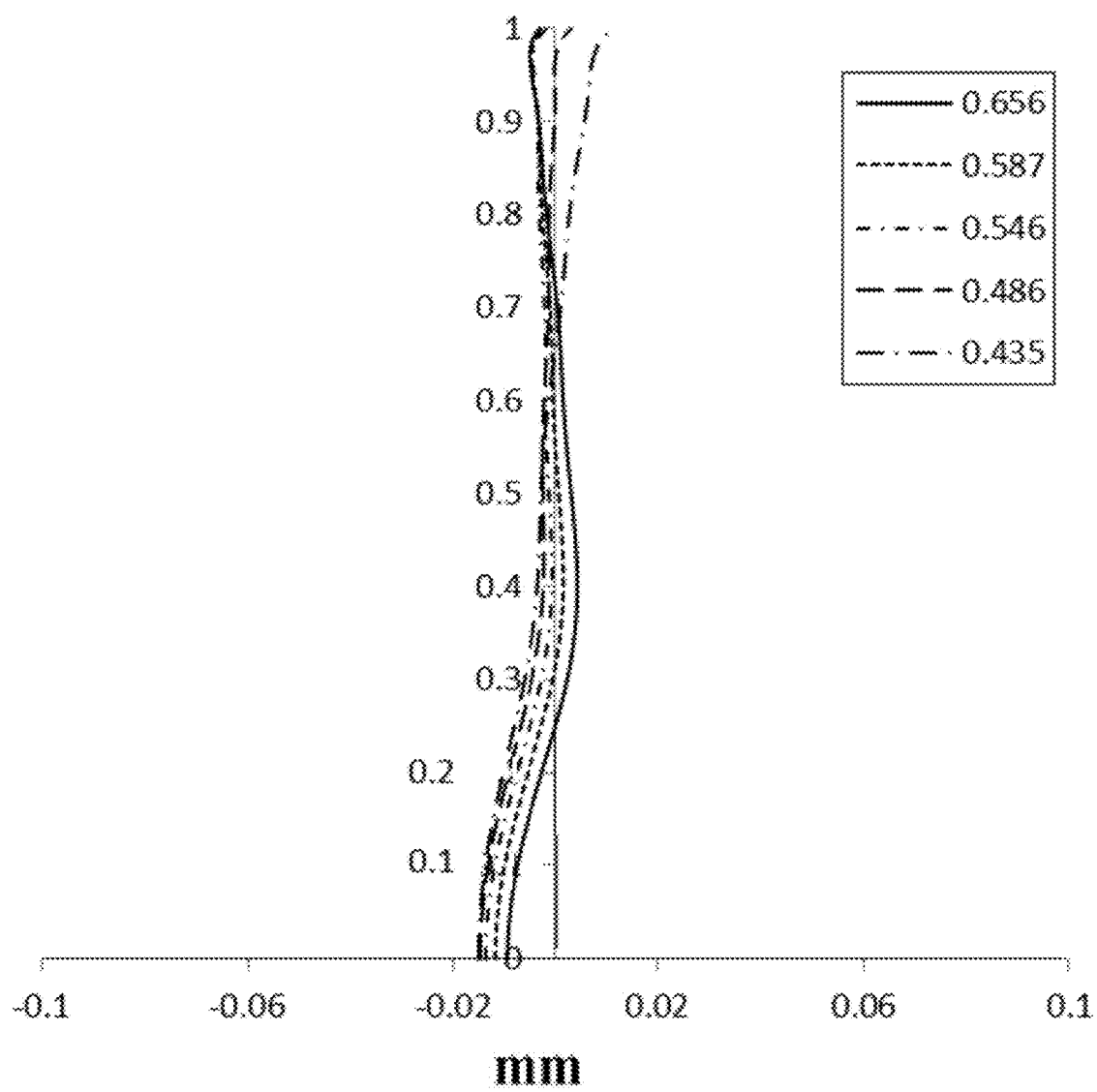
FIG. 18A to FIG. 18D show a longitudinal aberration curve, an astigmatic curve, a distortion curve and a lateral color curve of an optical imaging system of embodiment 9 respectively.
Figure 18B:
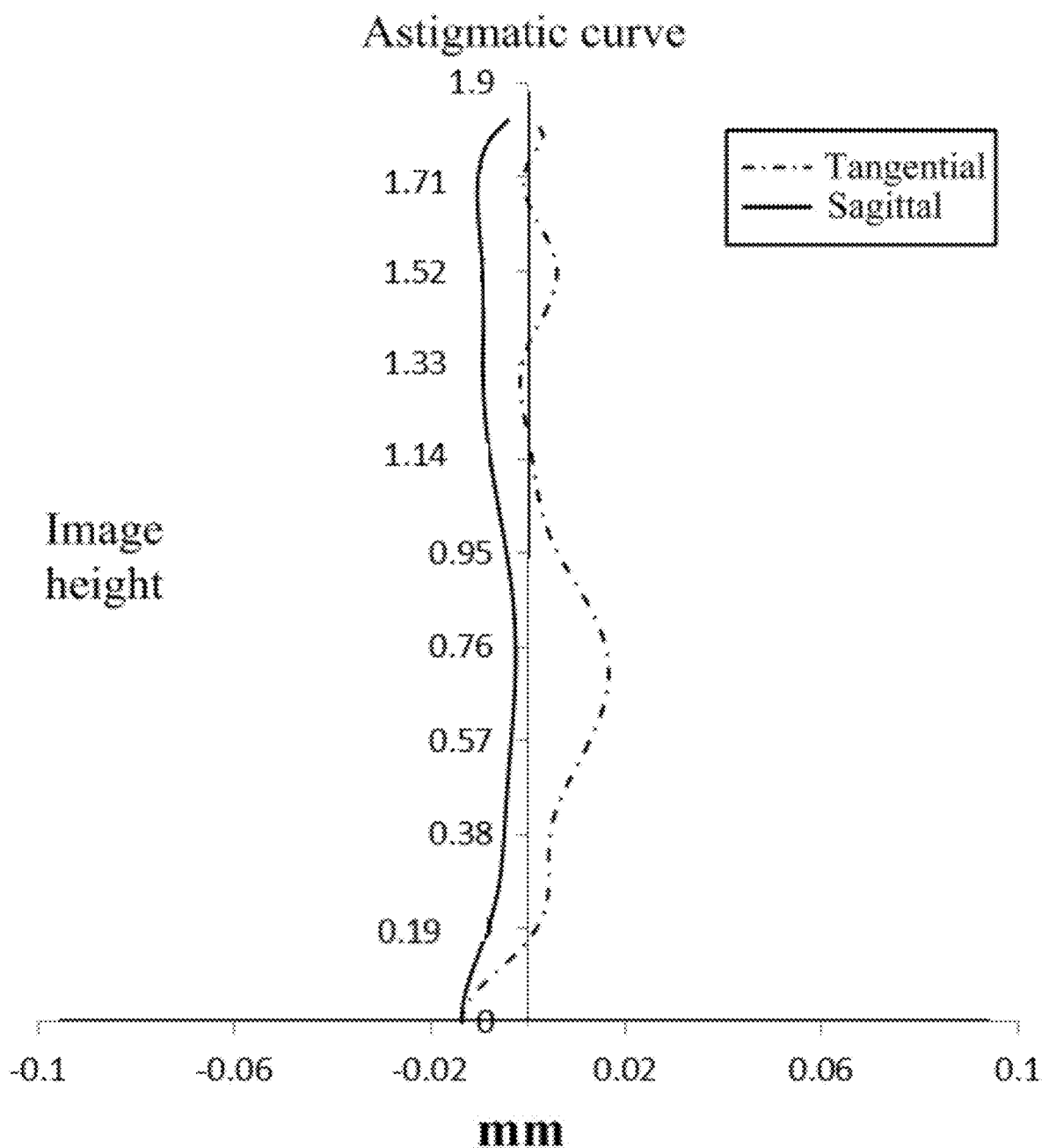
Figure 18C:
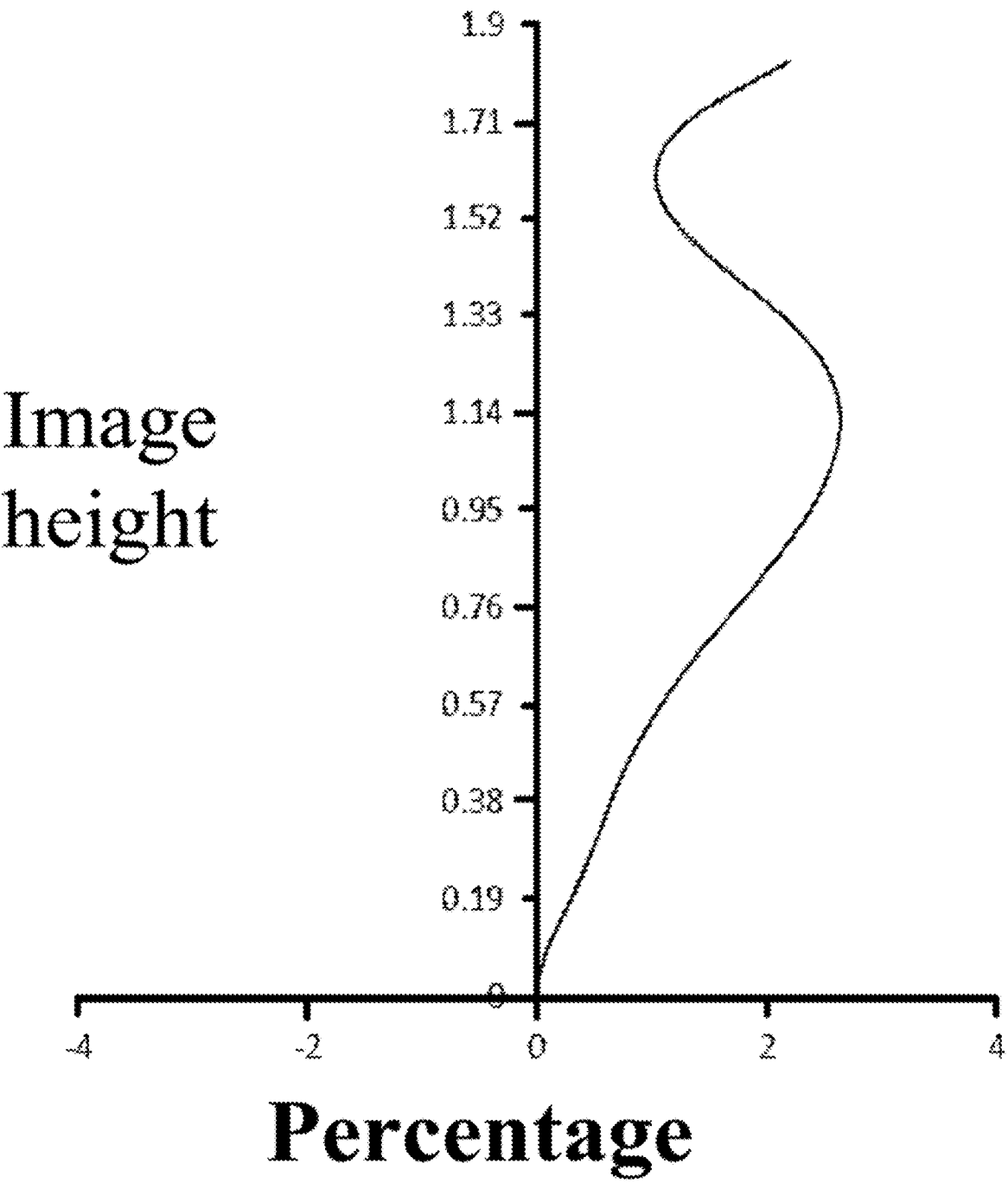
Figure 18D:
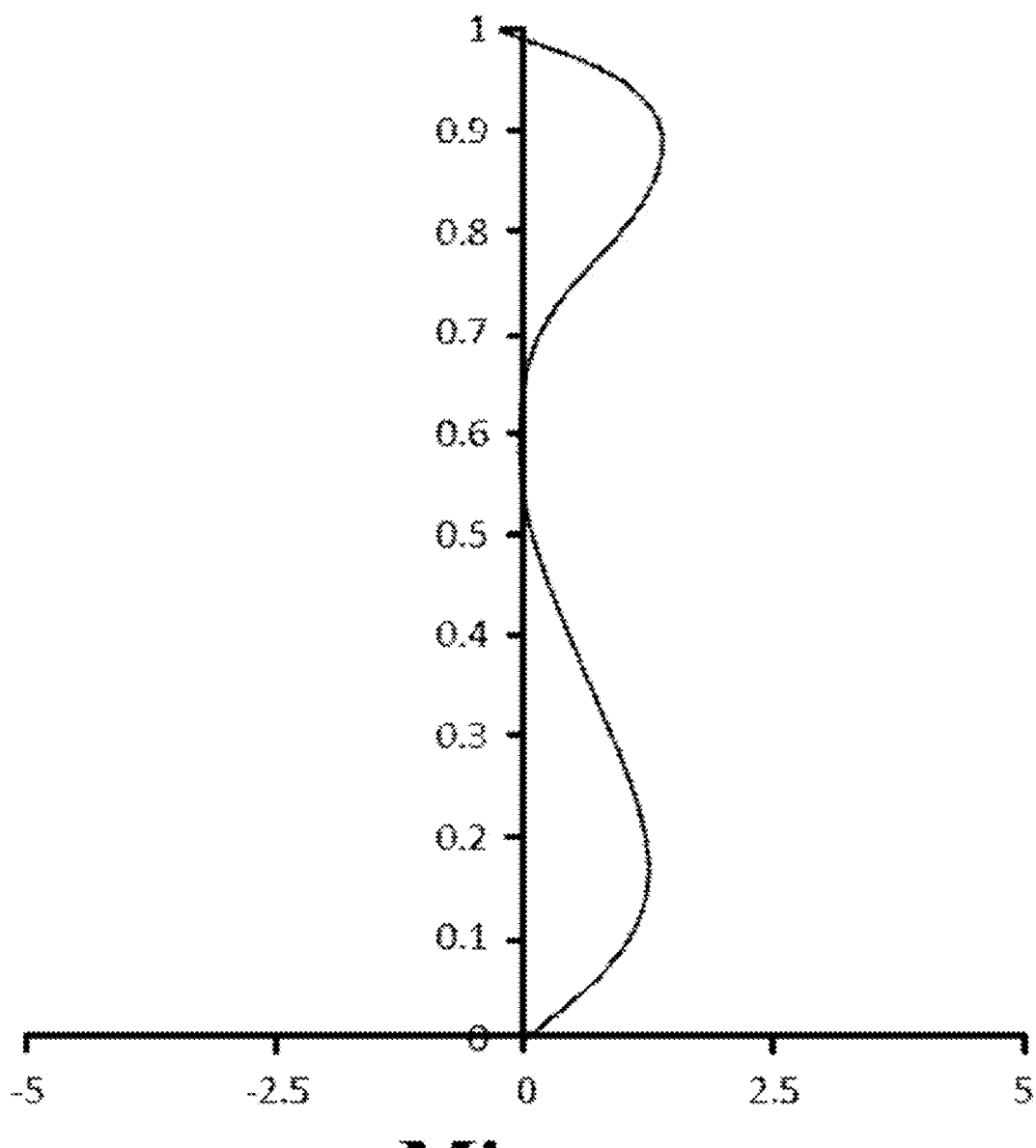

In addition, FIG. 18A shows a longitudinal aberration curve of the optical imaging system of embodiment 9, which indicates deviation of a convergence focal point after light with different wavelengths passes through the system. FIG. 18B shows an astigmatic curve of the optical imaging system of embodiment 9, which indicates a tangential image plane curvature and a sagittal image plane curvature. FIG. 18C shows a distortion curve of the optical imaging system of embodiment 9, which indicates a distortion value under different viewing angles. FIG. 18D shows a lateral color curve of the optical imaging system of embodiment 9, which indicates deviation of different image heights on the imaging surface after the light passes through the system. According to FIG. 18A to FIG. 18D, it can be seen that the optical imaging system provided in embodiment 9 can achieve high imaging quality.

Embodiment 10

Figure 19:
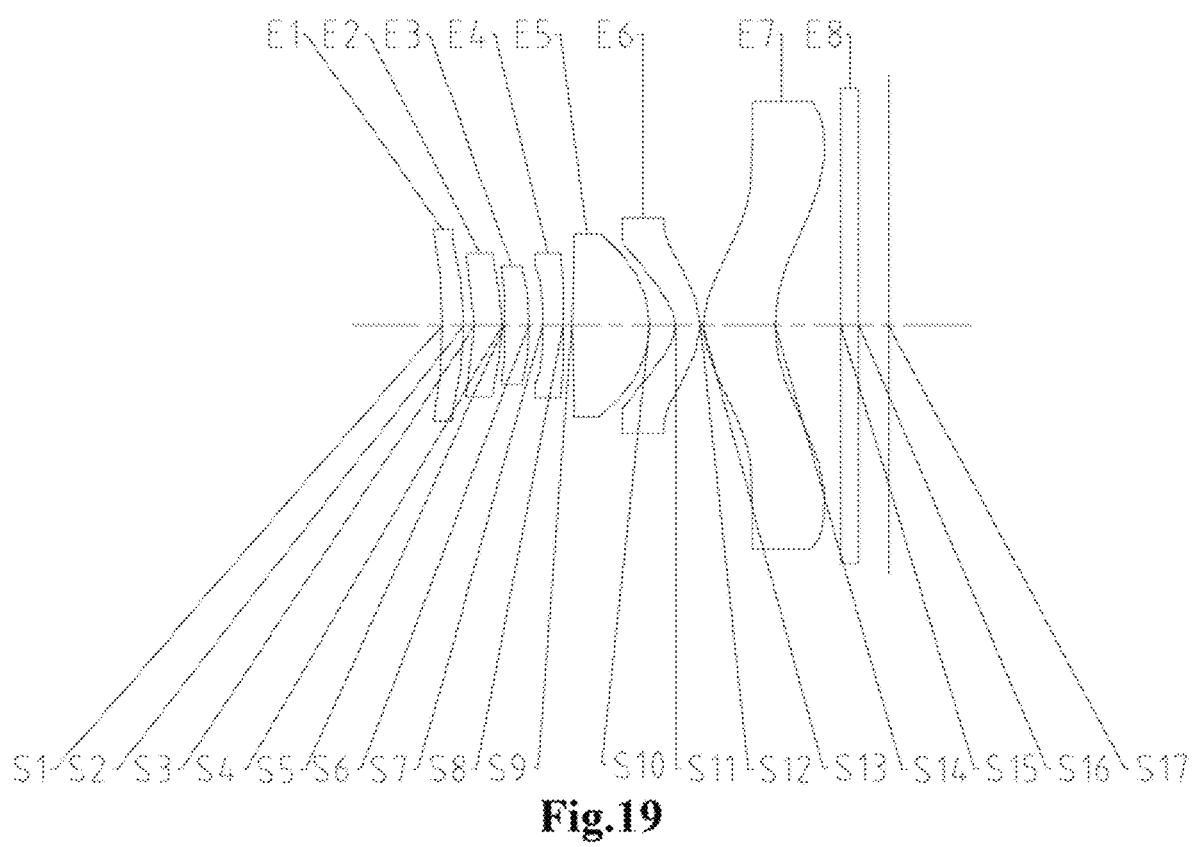
FIG. 19 is a structure diagram of an optical imaging system of embodiment 10 of the disclosure.

As shown in FIG. 19, the optical imaging system includes sequentially in a direction from an object side to an image side along an optical axis: a first lens E1, a second lens E2, a third lens E3, a fourth lens E4, a fifth lens E5, a sixth lens E6, a seventh lens E7, an optical filter E8 and an imaging surface S17.

The first lens has a positive refractive power, an object-side surface of the first lens is a concave surface as well as an aspherical surface, and an image-side surface is a convex surface as well as an aspherical surface. The second lens has a positive refractive power, an object-side surface of the second lens is a concave surface as well as an aspherical surface, and an image-side surface is a convex surface as well as an aspherical surface. The third lens has a positive refractive power, an object-side surface of the third lens is a convex surface as well as an aspherical surface, and an image-side surface is a convex surface as well as an aspherical surface. The fourth lens has a negative refractive power, an object-side surface of the fourth lens is a concave surface as well as an aspherical surface, and an image-side surface is a convex surface as well as an aspherical surface. The fifth lens has a positive refractive power, an object-side surface of the fifth lens is a convex surface as well as an aspherical surface, and an image-side surface is a convex surface as well as an aspherical surface. The sixth lens has a negative refractive power, an object-side surface of the sixth lens is a concave surface as well as an aspherical surface, and an image-side surface is a convex surface as well as an aspherical surface. The seventh lens has a positive refractive power, an object-side surface of the seventh lens is a convex surface as well as an aspherical surface, and an image-side surface is a concave surface as well as an aspherical surface.

The optical imaging system further includes the optical filter including an object-side surface S15 and an image-side surface S16. Light from an object sequentially penetrates through each of the surfaces S1 to S16 and is finally imaged on the imaging surface S17.

Table 19 shows a surface type, radius of curvature, thickness, material and cone coefficient of each lens of the optical imaging system of embodiment 9. Units of the radius of curvature and the thickness are mm.

TABLE 19

| Surface number | Surface types | Radius of curvature (mm) | Thickness (mm) | Materials Refractive index | Abbe number | Conic coefficient |
|---|---|---|---|---|---|---|
| OBJ | Spherical | Infinity | Infinity | — | — | — |
| S1 | Aspheric | −6.6828 | 0.2157 | 1.55 | 64.1 | 42.4477 |
| S2 | Aspheric | −2.7950 | 0.1090 | — | — | −1.6088 |
| S3 | Aspheric | −1.6831 | 0.2737 | 1.55 | 64.1 | −10.3807 |
| S4 | Aspheric | −1.5911 | 0.0250 | — | — | −12.9098 |
| S5 | Aspheric | 14.5808 | 0.2393 | 1.65 | 23.5 | −99.0000 |
| S6(STO) | Aspheric | −8.7984 | 0.1389 | — | — | 99.0000 |
| S7 | Aspheric | −3.9610 | 0.2000 | 1.65 | 23.5 | 37.4121 |
| S8 | Aspheric | −1000.0000 | 0.0867 | — | — | −99.0000 |
| S9 | Aspheric | 14.5960 | 0.7741 | 1.55 | 64.1 | 99.0000 |
| S10 | Aspheric | −1.0117 | 0.2540 | — | — | −0.6124 |
| S11 | Aspheric | −0.3180 | 0.2482 | 1.65 | 23.5 | −2.1331 |
| S12 | Aspheric | −0.6395 | 0.0250 | — | — | −3.3270 |
| S13 | Aspheric | 0.6953 | 0.7184 | 1.55 | 64.1 | −4.1049 |
| S14 | Aspheric | 1.6946 | 0.6483 | — | — | −0.9646 |
| S15 | Spherical | Infinity | 0.1800 | 1.52 | 64.2 | — |
| S16 | Spherical | Infinity | 0.2937 | — | — | — |
| S17 | Spherical | Infinity | — | — | — | — |

In the embodiment, a calculation formula for a surface type x of each aspherical lens is the same as that in embodiment 1.

Table 20 shows high-order coefficients $A_4$, $A_6$, $A_8$, $A_{10}$, $A_{12}$, $A_{14}$, $A_{16}$ and $A_{20}$ applied to the aspherical mirror surfaces S1, S3, S5, S7 and S8 in embodiment 10.

TABLE 20

| Surface number | $A_4$ | $A_5$ | $A_8$ | $A_{10}$ | $A_{12}$ | $A_{14}$ | $A_{16}$ | $A_{18}$ | $A_{20}$ |
|---|---|---|---|---|---|---|---|---|---|
| S1 | 5.3448E−02 | −2.5176E−01 | 5.8411E−01 | −1.4924E+00 | 2.4942E+00 | −1.8088E+00 | 3.3986E−01 | 1.1239E−01 | 0.0000E+00 |
| S2 | 9.7247E−02 | −3.8474E−01 | 5.0162E−01 | −1.3926E−01 | 0.0000E+00 | 0.0000E+00 | 0.0000E+00 | 0.0000E+00 | 0.0000E+00 |
| S3 | 1.7206E−01 | −1.4244E−01 | −3.7498E−02 | 2.6070E+00 | −5.1470E+00 | 3.6715E+00 | 0.0000E+00 | 0.0000E+00 | 0.0000E+00 |
| S4 | 3.9275E−01 | −3.1405E+00 | 1.8089E+01 | −7.8894E+01 | 2.3271E+02 | −4.3183+E02 | 4.5585E+02 | −2.0514E+02 | 0.0000E+00 |
| S5 | −8.3702E−02 | −1.9672E+00 | 2.3452E+00 | 3.3049E+01 | −2.6651E+02 | 9.5430E+02 | −1.6648E+03 | 1.1297E+03 | 0.0000E+00 |
| S6 | −4.1424E−01 | −7.2809E−01 | 1.1102E+01 | −1.1600E+02 | 6.7457E+02 | −2.1589E+03 | 3.6363E+03 | −2.5523E+03 | 0.0000E+00 |
| S7 | 2.7279E−01 | −1.8611E+00 | 3.9312E+00 | −2.4315E+01 | 1.9281E+02 | −8.0591E+02 | 1.7063E+03 | −1.5096E+03 | 0.0000E+00 |
| S8 | 3.3382E−01 | −1.4567E+00 | −1.1578E+00 | 1.7685E+01 | −5.3202E+01 | 8.5317E+01 | −7.4400E+01 | 2.6457E+01 | 0.0000E+00 |
| S9 | 8.8277E−02 | −2.1510E−01 | −2.2850E+00 | 1.3233E+01 | −3.6957E+01 | 6.1938E+01 | −5.9441E+01 | 2.9621E+01 | −5.8839E+01 |
| S10 | −8.6445E−02 | 7.0946E−01 | −6.1670E+00 | 2.4799E+01 | −5.3837E+01 | 6.2907E+01 | −3.3350E+01 | −2.2102E−01 | 5.4680E+00 |
| S11 | 6.1558E−01 | −5.6528E+00 | 2.1971E+01 | −4.6815E+01 | 6.1106E+01 | −4.9572E+01 | 2.3305E+01 | −4.8918E+00 | 0.0000E+00 |
| S12 | 2.8795E−01 | −2.3673E+00 | 7.3095E+00 | −1.2113E+01 | 1.2661E+01 | −8.3978E+00 | 3.2478E+00 | −5.5852E−01 | 0.0000E+00 |

TABLE 20-continued

| Surface number | $A_4$ | $A_5$ | $A_8$ | $A_{10}$ | $A_{12}$ | $A_{14}$ | $A_{16}$ | $A_{18}$ | $A_{20}$ |
|---|---|---|---|---|---|---|---|---|---|
| S13 | 1.8426E−03 | 5.8101E−02 | −2.3923E−01 | 3.0011E−01 | −2.0768E−01 | 8.7075E−02 | −2.1927E−02 | 3.0516E−03 | −1.8059E−04 |
| S14 | 1.5565E−01 | −3.4143E−01 | 2.7939E−01 | −1.3842E−01 | 4.3543E−02 | −8.5849E−03 | 9.9468E−04 | −5.7482E−05 | 9.8673E−07 |

In embodiment 10, an effective focal length of the first lens is f1=8.62 mm, an effective focal length of the second lens is f2=25.96 mm, an effective focal length of the third lens is f3=8.53 mm, an effective focal length of the fourth lens is f4=−6.16 mm, an effective focal length of the fifth lens is f5=1.76 mm, an effective focal length of the sixth lens is f6=−1.40 mm, and an effective focal length of the seventh lens is f7=1.72 mm. An effective focal length of the optical imaging system is f=1.98 mm, TTL=4.43 mm, HFOV=50.6°, and ImgH=2.48 mm, where TTL is a distance from a center of the object-side surface S1 of the first lens E1 to the imaging surface S17 on the optical axis, and ImgH is a half of a diagonal length of an effective pixel region on the imaging surface S17, specifically referring to Table 21.

The optical imaging system meets:
f5/f6=−1.25, f4/f=−3.10, f123/f7=2.18, |R2−R6|/R2+R6|=0.52, R11/R12=0.50, R13/R10=−0.69, CTmax/(3×CTmin)=1.29, CT5/(CT6+CT4)=1.73, |SAG52/CT5|=0.64, ImgH/|SAG72×10|=0.68, and DT21/DT71=0.38, specifically referring to Table 22.

Figure 20A:
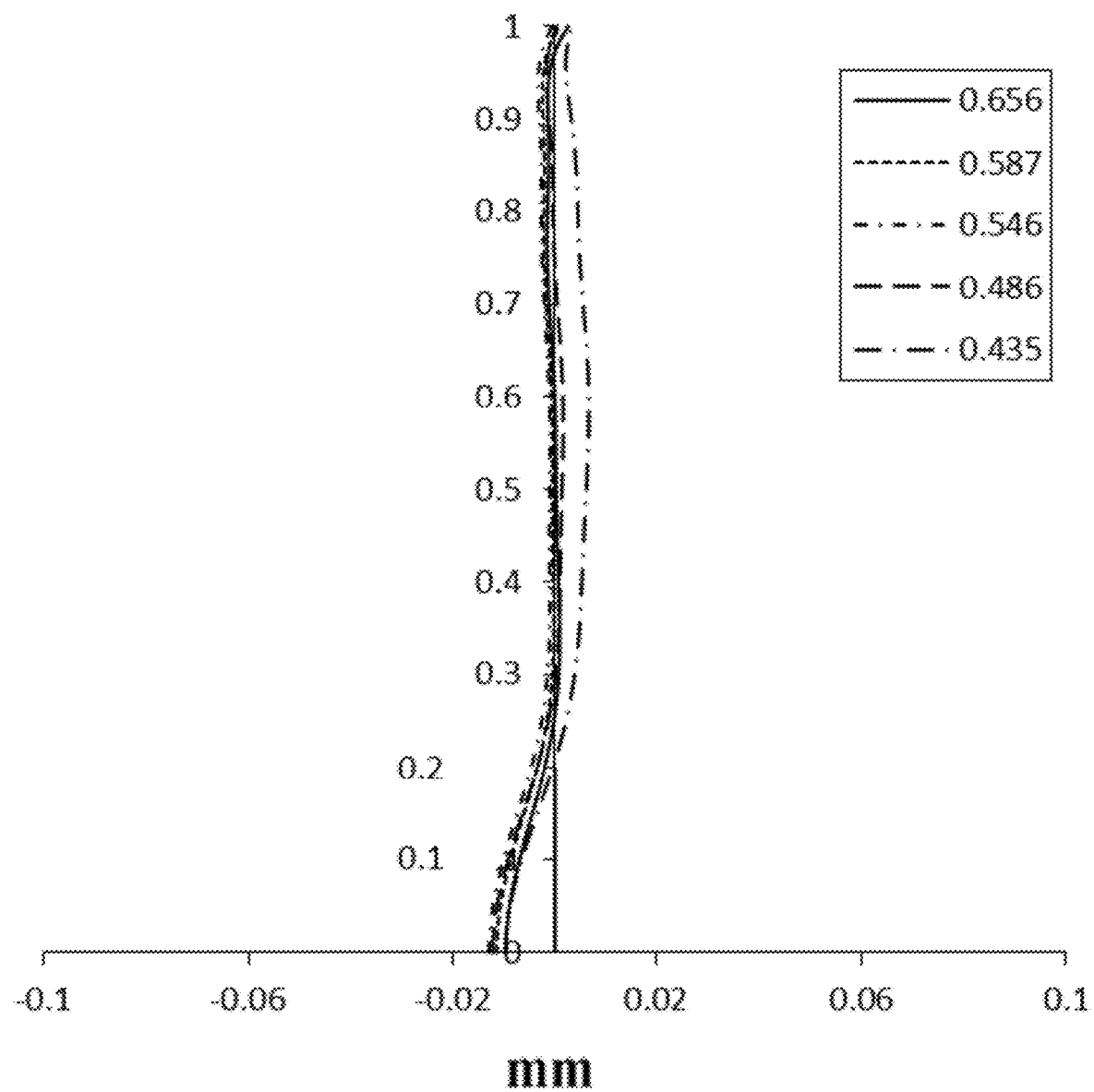
FIG. 20A to FIG. 20D show a longitudinal aberration curve, an astigmatic curve, a distortion curve and a lateral color curve of an optical imaging system of embodiment 10 respectively.
Figure 20B:
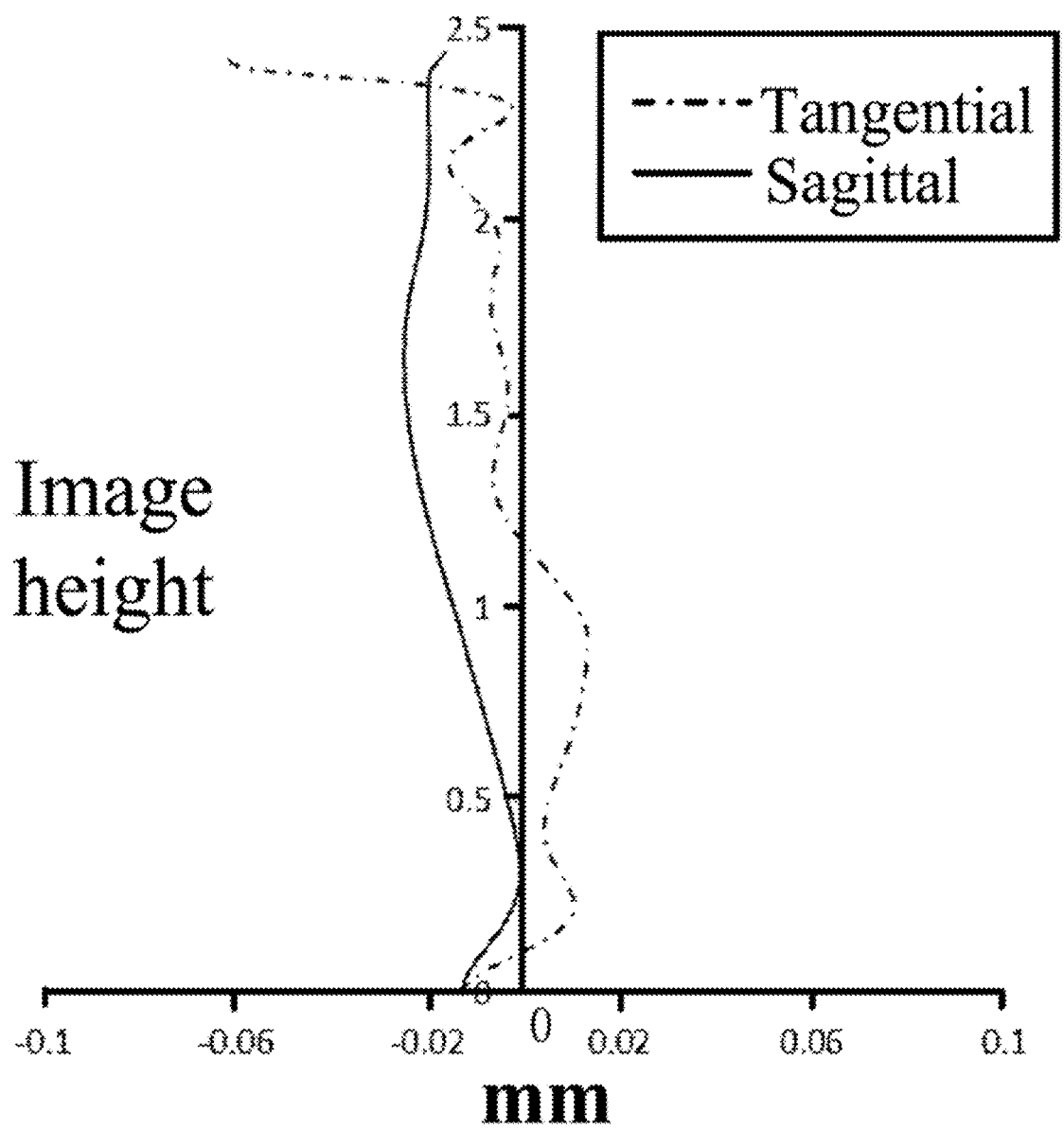
Figure 20C:
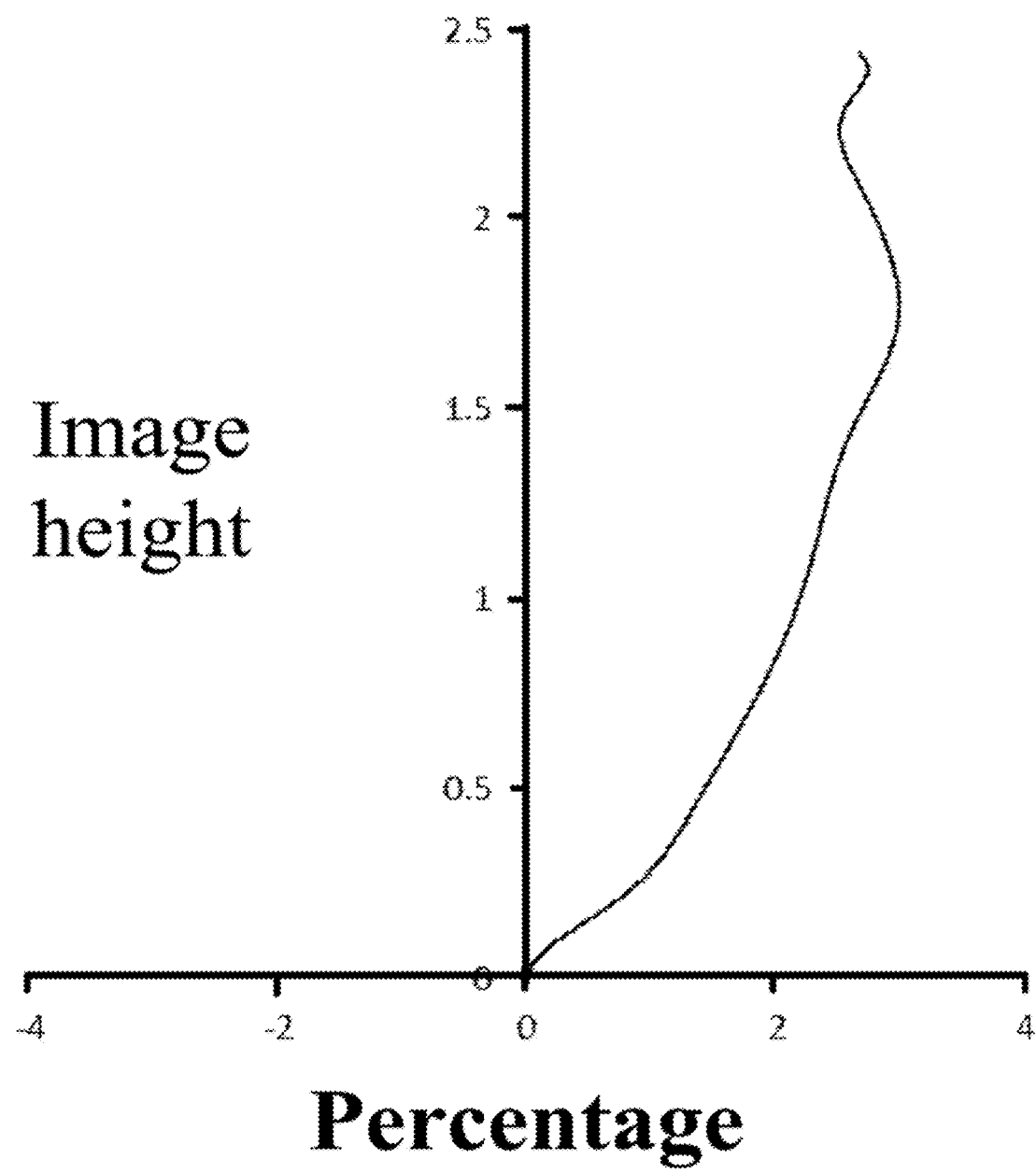
Figure 20D:
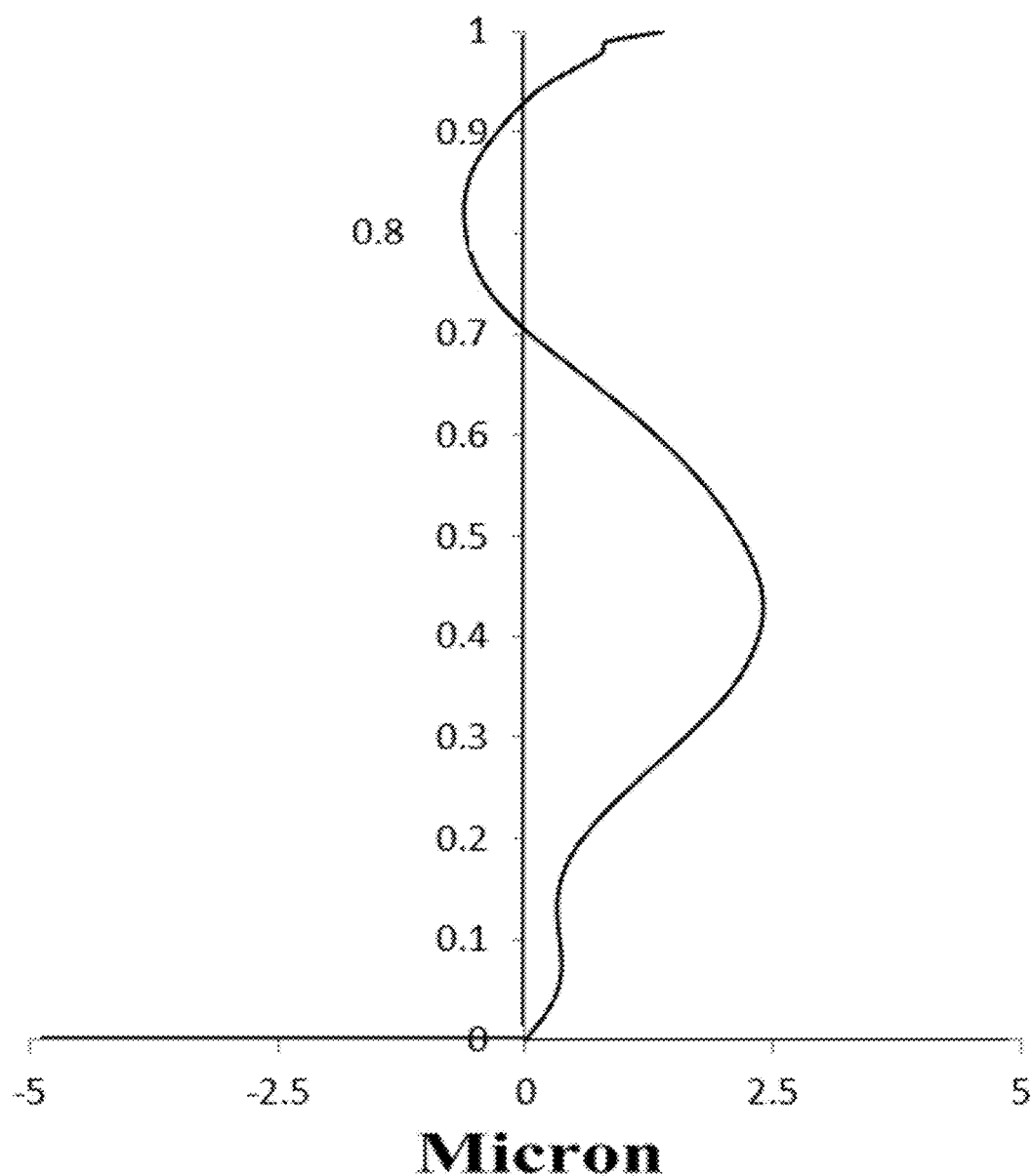

In addition, FIG. 20A shows a longitudinal aberration curve of the optical imaging system of embodiment 10, which indicates deviation of a convergence focal point after light with different wavelengths passes through the system. FIG. 20B shows an astigmatic curve of the optical imaging system of embodiment 10, which indicates a tangential image plane curvature and a sagittal image plane curvature. FIG. 20C shows a distortion curve of the optical imaging system of embodiment 10, which indicates a distortion value under different viewing angles. FIG. 20D shows a lateral color curve of the optical imaging system of embodiment 10, which indicates deviation of different image heights on the imaging surface after the light passes through the system. According to FIG. 20A to FIG. 20D, it can be seen that the optical imaging system provided in embodiment 10 can achieve high imaging quality.

In the optical imaging system of embodiment 1 to 10, specifical numerical values of the effective focal length of each lens, the effective focal length of the system, the TTL, the HFOV and the ImgH refer to Table 21.

TABLE 21

| | Embodiment 1 | Embodiment 2 | Embodiment 3 | Embodiment 4 | Embodiment 5 | Embodiment 6 | Embodiment 7 | Embodiment 8 | Embodiment 9 | Embodiment 10 |
|---|---|---|---|---|---|---|---|---|---|---|
| f1 (mm) | 9.05 | 5.86 | 7.23 | −700.00 | 13.04 | 17.71 | 14.53 | 15.67 | 7.19 | 8.62 |
| f2 (mm) | 2.73 | 5.73 | 5.79 | 7.14 | −200.00 | 12.01 | 10.29 | 10.08 | 5.84 | 25.96 |
| f3 (mm) | 185.27 | 4.68 | 4.14 | 3.58 | 4.56 | 4.20 | 5.54 | 5.41 | 3.34 | 8.53 |
| f4 (mm) | −2.48 | −2.02 | −2.05 | −2.60 | −3.71 | −2.94 | −3.37 | −3.45 | −1.81 | −6.16 |
| f5 (mm) | 1.42 | 1.38 | 1.33 | 1.46 | 1.63 | 1.50 | 1.62 | 1.58 | 1.16 | 1.76 |
| f6 (mm) | −8.32 | −2.23 | −1.88 | −1.54 | −1.09 | −1.44 | −1.34 | −1.31 | −4.80 | −1.40 |
| f7 (mm) | −7.96 | 4.75 | 3.66 | 2.02 | 1.24 | 1.84 | 1.60 | 1.62 | −4.72 | 1.72 |
| f (mm) | 1.83 | 1.83 | 1.84 | 1.84 | 1.84 | 1.87 | 1.90 | 1.90 | 1.83 | 1.98 |
| TTL (mm) | 3.27 | 3.34 | 3.37 | 3.85 | 3.85 | 4.23 | 4.43 | 4.43 | 3.35 | 4.43 |
| HFOV (°) | 45.1 | 45.1 | 44.6 | 49.0 | 49.1 | 51.3 | 52.1 | 52.1 | 44.6 | 50.6 |
| ImgH (mm) | 1.86 | 1.86 | 1.86 | 2.15 | 2.15 | 2.36 | 2.48 | 2.48 | 1.86 | 2.48 |

In the optical imaging system of embodiment 1 to 10, specifical numerical values of f5/f6, f4/f, f123/f7, |R2−R6|/|R2+R6|, R11/R12, R13/R10, CTmax/(3×CTmin), CT5/(CT6+CT4), |SAG52/CT5|, ImgH/|SAG72×10| and DT21/DT71 refer to Table 22.

TABLE 22

|  | Embodiment 1 | Embodiment 2 | Embodiment 3 | Embodiment 4 | Embodiment 5 | Embodiment 6 | Embodiment 7 | Embodiment 8 | Embodiment 9 | Embodiment 10 |
|---|---|---|---|---|---|---|---|---|---|---|
| f5/f6 | −0.17 | −0.62 | −0.71 | −0.95 | −1.49 | −1.04 | −1.21 | −1.21 | −0.24 | −1.25 |
| f4/f | −1.35 | −1.10 | −1.11 | −1.41 | −2.02 | −1.57 | −1.78 | −1.82 | −0.99 | −3.10 |
| f123/f7 | −0.28 | 0.39 | 0.50 | 1.15 | 2.71 | 1.41 | 1.80 | 1.76 | −0.36 | 2.18 |
| [R2 − R6]/[R2 + R6] | 0.64 | 0.14 | 0.20 | 0.09 | 0.93 | 0.20 | 0.26 | 0.25 | 0.29 | 0.52 |
| R11/R12 | 0.80 | 0.62 | 0.59 | 0.53 | 0.45 | 0.51 | 0.54 | 0.53 | 0.72 | 0.50 |
| R13/R10 | −0.65 | −0.58 | −0.63 | −0.62 | −0.64 | −0.65 | −0.60 | −0.63 | −0.72 | −0.69 |
| CTmax/(3 × CTmin) | 1.06 | 1.05 | 1.12 | 1.33 | 1.09 | 1.61 | 1.82 | 1.74 | 1.15 | 1.29 |
| CT5/(CT6 + CT4) | 1.59 | 1.58 | 1.64 | 1.77 | 1.30 | 2.08 | 2.56 | 2.43 | 1.72 | 1.73 |
| |SAG52/CT5| | 0.64 | 0.59 | 0.56 | 0.52 | 0.50 | 0.52 | 0.57 | 0.56 | 0.52 | 0.64 |
| ImgH/|SAG72 × 10| | 0.68 | 1.78 | 1.13 | 1.35 | 1.91 | 0.93 | 1.29 | 1.41 | 0.93 | 0.68 |
| DT21/DT71 | 0.41 | 0.33 | 0.34 | 0.39 | 0.40 | 0.39 | 0.41 | 0.41 | 0.60 | 0.38 |

From the above description, it can be seen that the abovementioned embodiments of the disclosure have the following technical effects.

1) In the optical imaging system of the disclosure, positive and negative refractive power allocation and luminous flux of each lens in the system are reasonably controlled to effectively balance a low-order aberration of the optical imaging system to achieve relatively high imaging quality of an imaging system of the optical imaging system. In addition, HFOV is controlled to be more than or equal to 44° and less than 55°, namely a full field of view is controlled, to effectively control an imaging range of the optical imaging system to further ensure relatively high imaging quality of the optical imaging system.

2) In the optical imaging system of the disclosure, the positive and negative refractive power allocation and luminous flux of each lens in the system are reasonably controlled to effectively balance a low-order aberration of the optical imaging system to achieve relatively high imaging quality of an imaging system of the optical imaging system.

The above is only the preferred embodiment of the disclosure and not intended to limit the disclosure. For those skilled in the art, the disclosure may have various modifications and variations. Any modifications, equivalent replacements, improvements and the like made within the spirit and principle of the disclosure shall fall within the scope of protection of the disclosure.

What is claimed is:

1. An optical imaging system, comprising sequentially from an object side to an image side along an optical axis: a first lens, a second lens, a third lens, a fourth lens, a fifth lens, a sixth lens and a seventh lens, wherein
   the first lens has a refractive power;
   the second lens has a refractive power, an object-side surface of the second lens is a concave surface, and an image-side surface of the second lens is a convex surface;
   the third lens has a refractive power;
   the fourth lens has a negative refractive power;
   the fifth lens has a positive refractive power, and an object-side surface of the fifth lens is a convex surface;
   the sixth lens has a negative refractive power; and
   the seventh lens has a refractive power;
   a radius of curvature of an object-side surface of the sixth lens is R11, a radius of curvature of an image-side surface of the sixth lens is R12, and 0.4<R11/R12<1.

2. The optical imaging system as claimed in claim 1, wherein HFOV is a half of a maximum field of view of the optical imaging system, and 44°≤HFOV<55°.

3. The optical imaging system as claimed in claim 1, wherein an effective focal length of the fifth lens is f5, and an effective focal length of the sixth lens is f6, −1.5<f5/f6<0.

4. The optical imaging system as claimed in claim 1, wherein an effective focal length of the fourth lens is f4, an effective focal length of the optical imaging system is f, and −3.5<f4/f<−0.5.

5. The optical imaging system as claimed in claim 1, wherein an effective focal length of a combination formed by the first lens, the second lens and the third lens is f123, an effective focal length of the seventh lens is f7, and −0.5<f123/f7<3.

6. The optical imaging system as claimed in claim 1, wherein a radius of curvature of an image-side surface of the first lens is R2, a radius of curvature of an image-side surface of the third lens is R6, and 0<|R2−R6|/|R2+R6|<1.

7. The optical imaging system as claimed in claim 1, wherein a radius of curvature of an image-side surface of the fifth lens is R10, a radius of curvature of an object-side surface of the seventh lens is R13, and −1<R13/R10<−0.5.

8. The optical imaging system as claimed in claim 1, wherein a maximum value and a minimum value in center thicknesses of the first lens to the sixth lens are CTmax and CTmin respectively, and 1<CTmax/(3×CTmin)<2.

9. The optical imaging system as claimed in claim 1, wherein a center thicknesses of the fourth lens, a center thicknesses of the fifth lens and a center thicknesses of the sixth lens on the optical axis are CT4, CT5 and CT6 respectively, and 1<CT5/(CT6+CT4)<3.

10. The optical imaging system as claimed in claim 1, wherein an on-axis distance from an intersection point of an image-side surface of the fifth lens and the optical axis to an effective radius vertex of the image-side surface of the fifth lens is SAG52, a center thickness of the fifth lens on the optical axis is CT5, and 0.5≤|SAG52/CT5|<0.8.

11. The optical imaging system as claimed in claim 1, wherein a half of a diagonal length of an effective pixel region on an imaging surface of the optical imaging system is ImgH, an on-axis distance from an intersection point of an image-side surface of the seventh lens and the optical axis to an effective radius vertex of the image-side surface of the seventh lens is SAG72, and 0.5<ImgH/|SAG72×10|<2.

12. The optical imaging system as claimed in claim 1, wherein a maximum effective radius of the object-side surface of the second lens is DT21, a maximum effective radius of an object-side surface of the seventh lens is DT71, and 0.3≤DT21/DT71<0.7.

* * * * *